March 13, 1951

G. F. STARNES 2,545,117

CHECK CONTROLLED PHONOGRAPH RECORD
PLAYING AND SELECTING MECHANISM

Filed March 8, 1949

GEORGE F. STARNES,
INVENTOR.

BY

ATTORNEY.

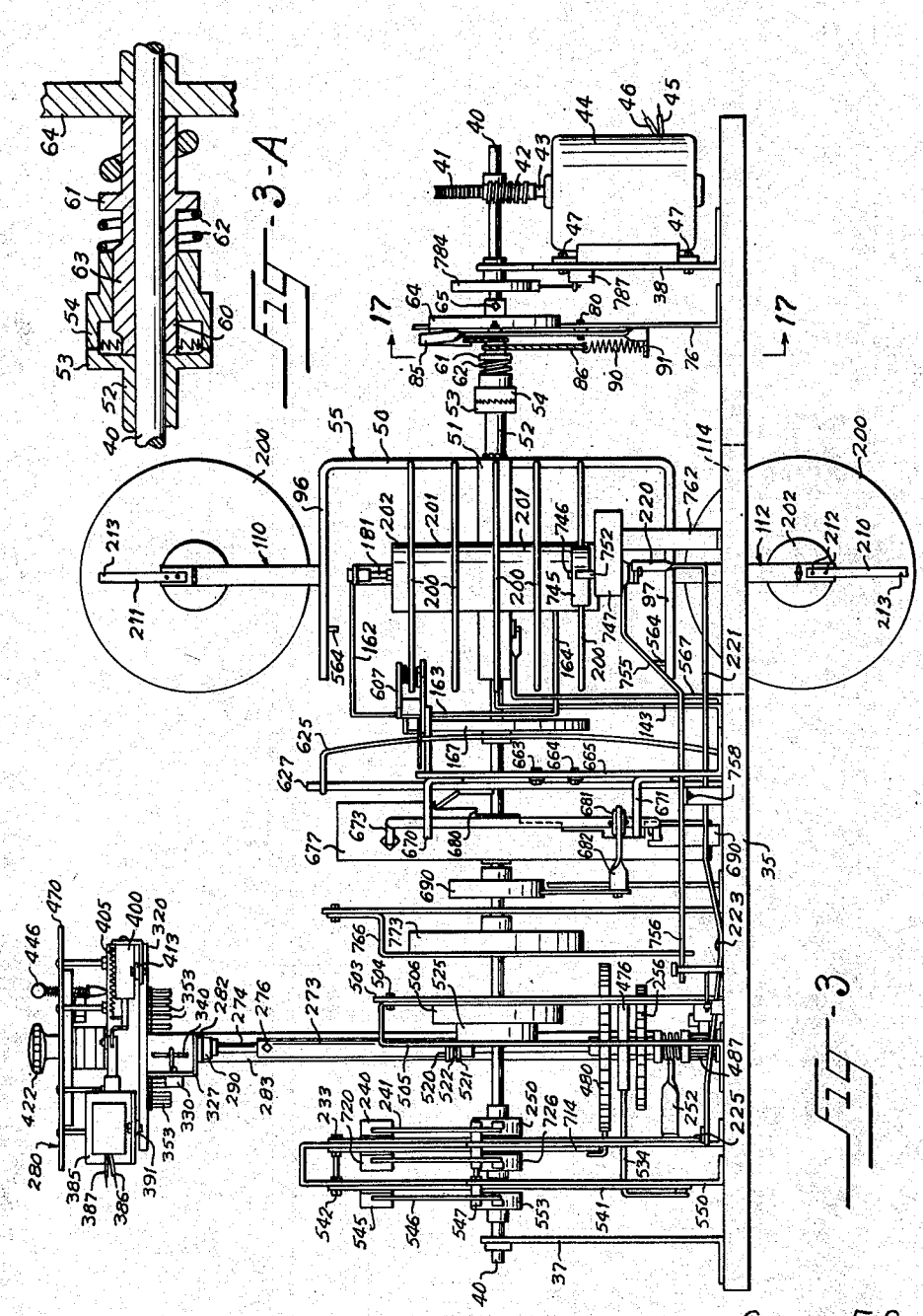

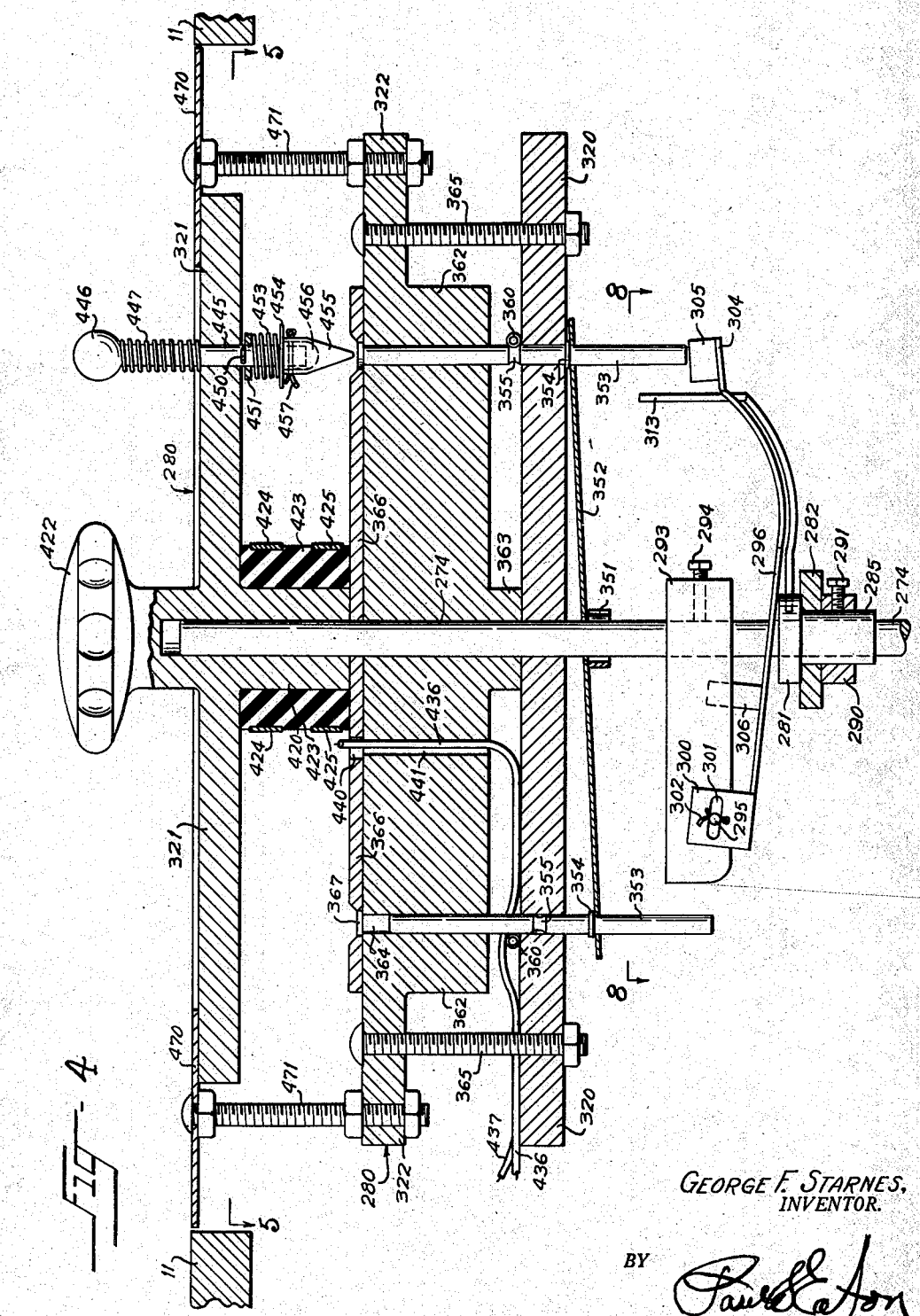

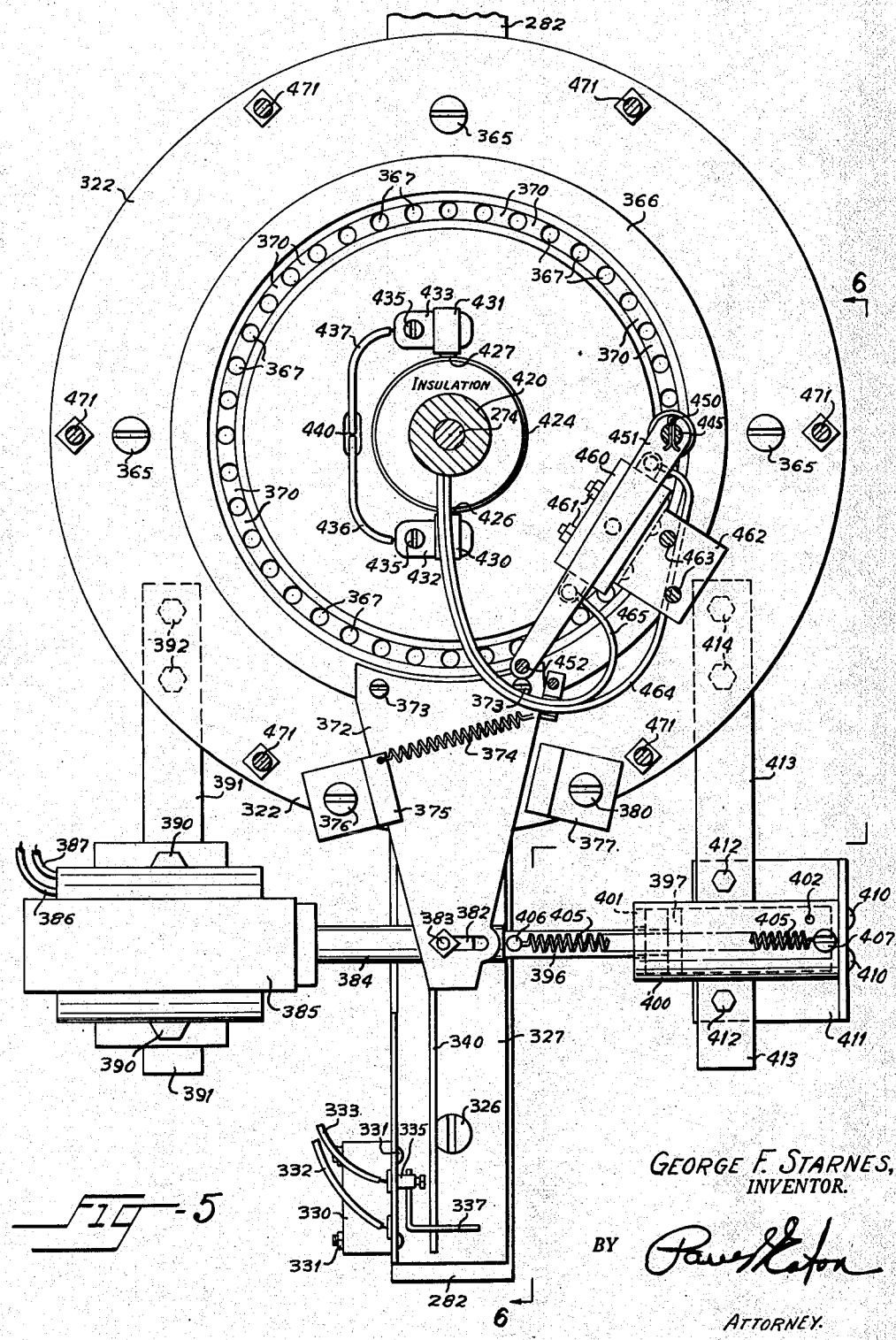

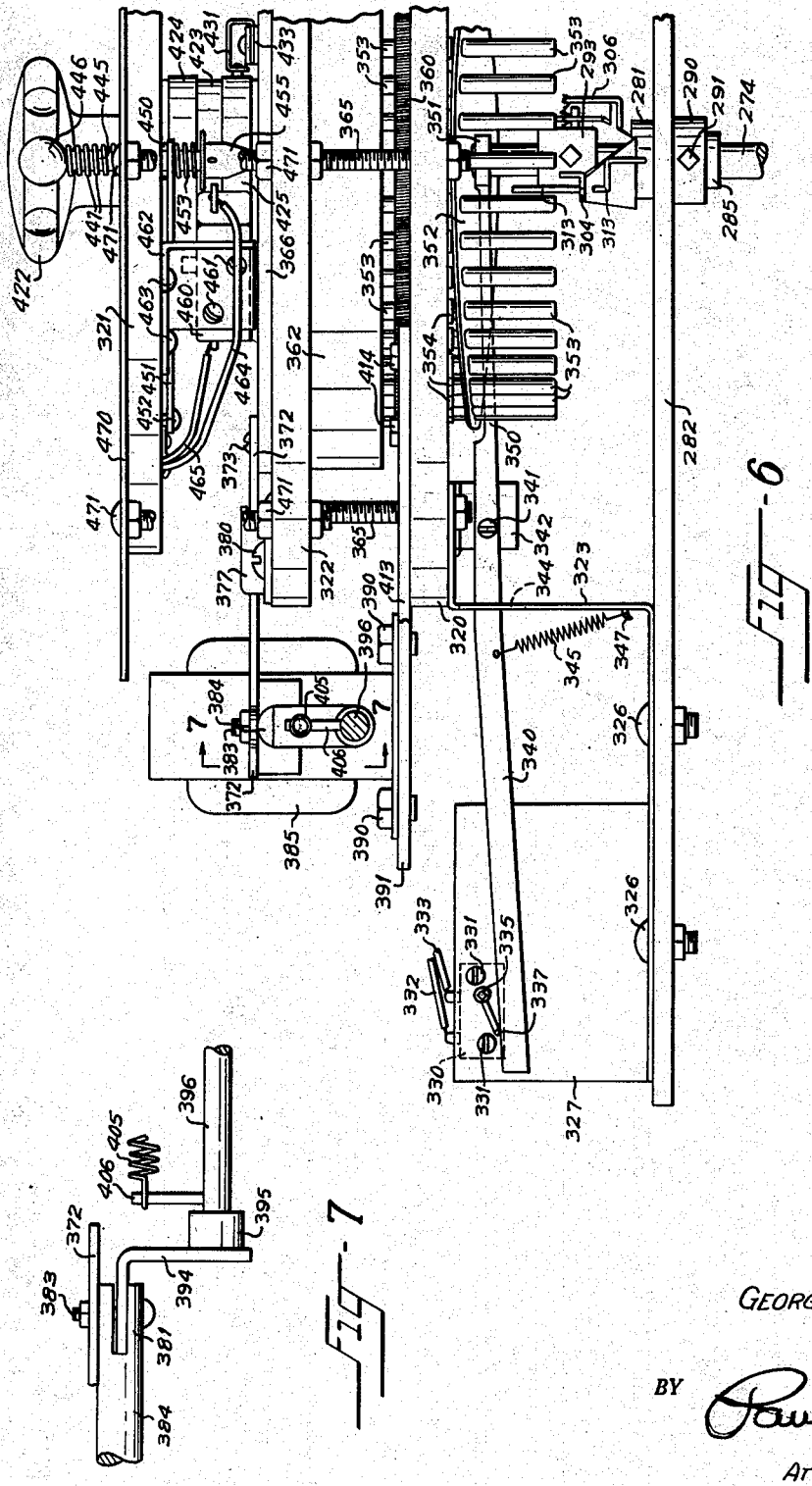

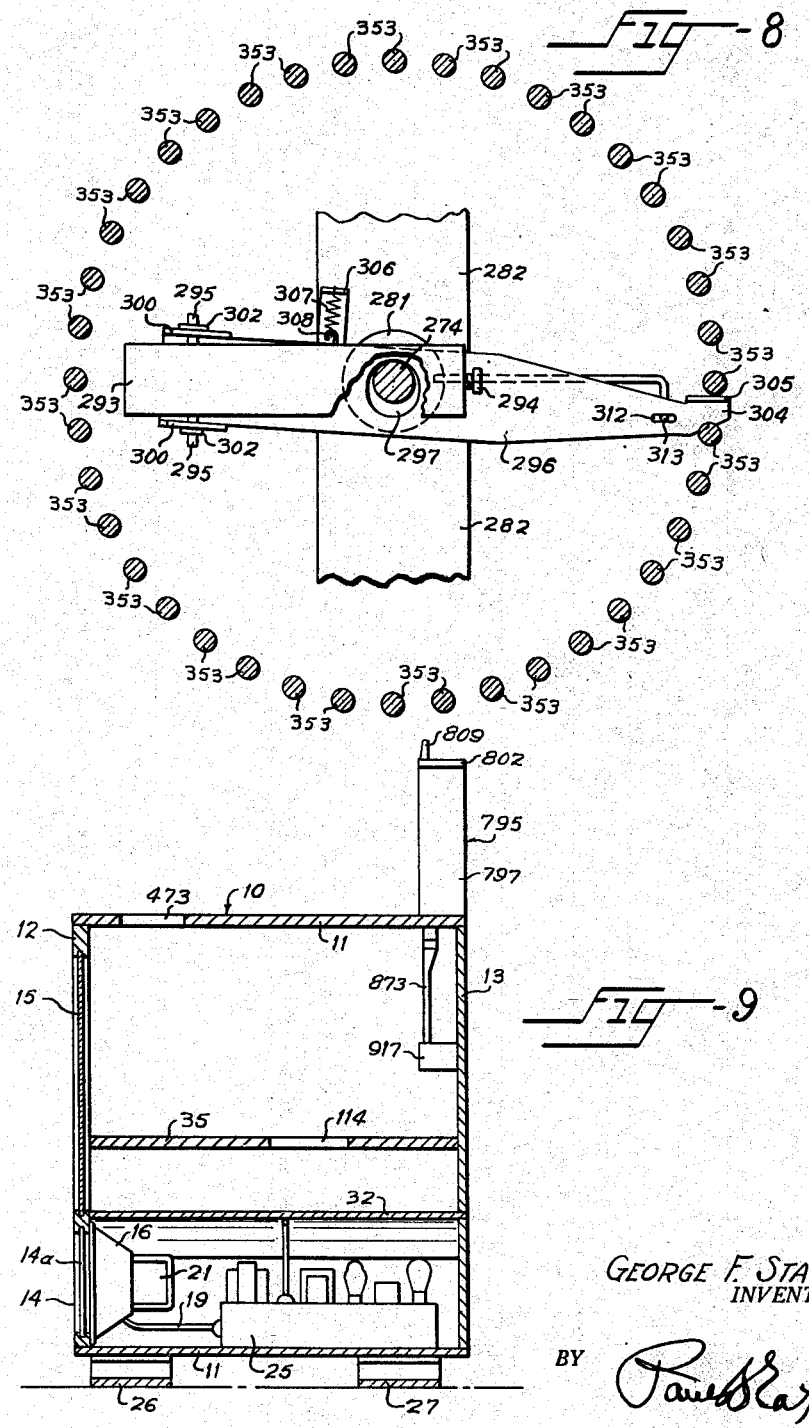

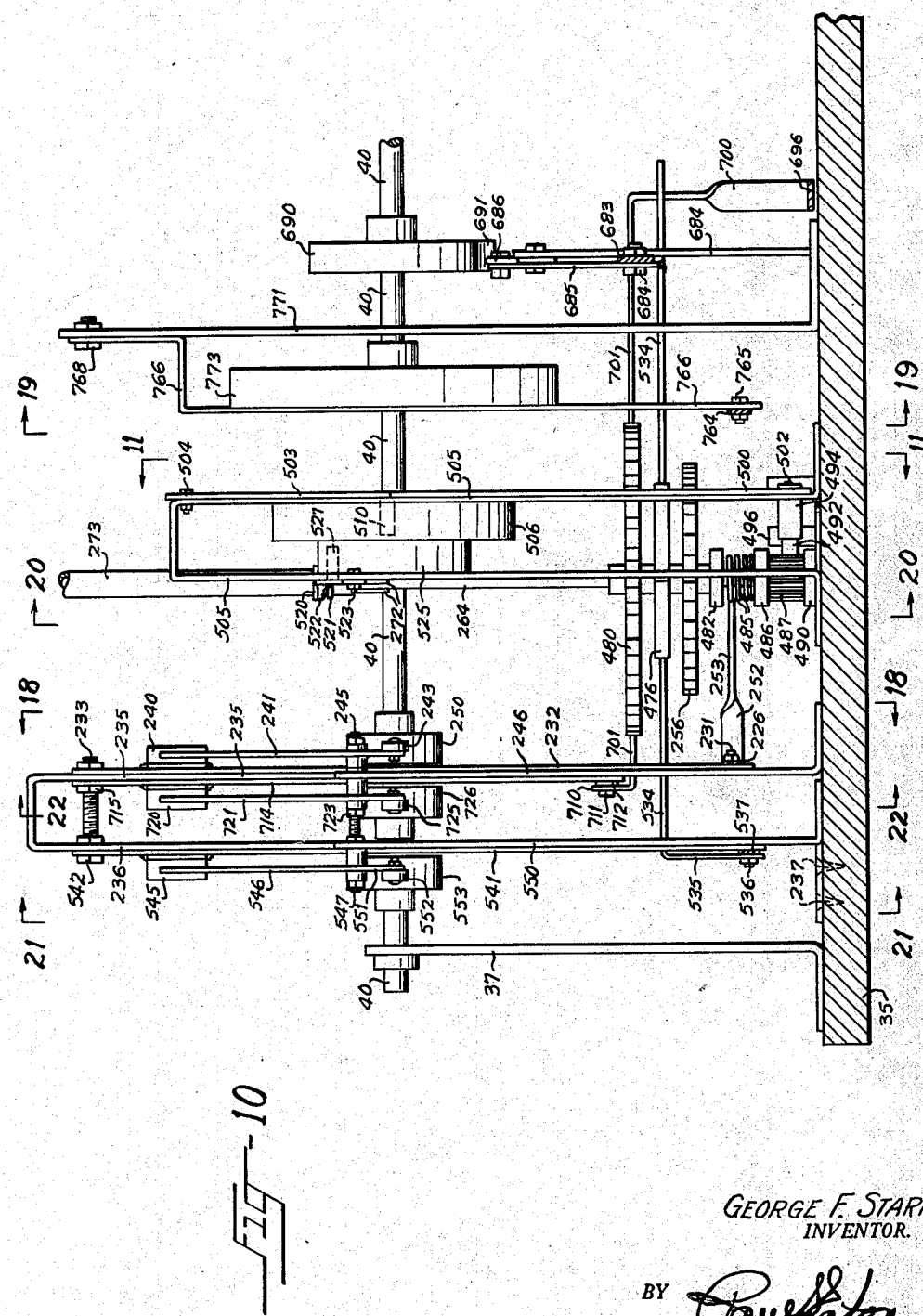

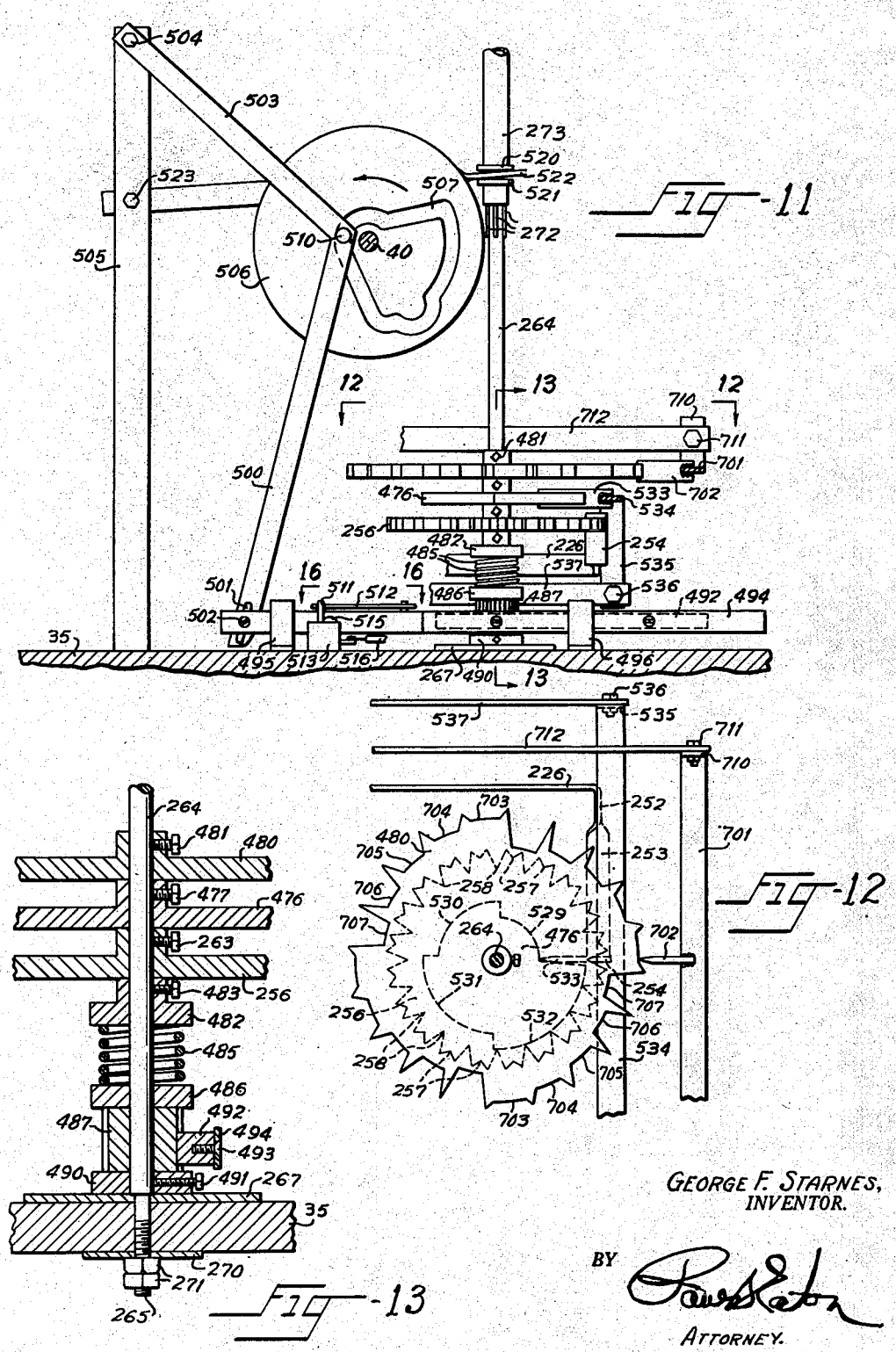

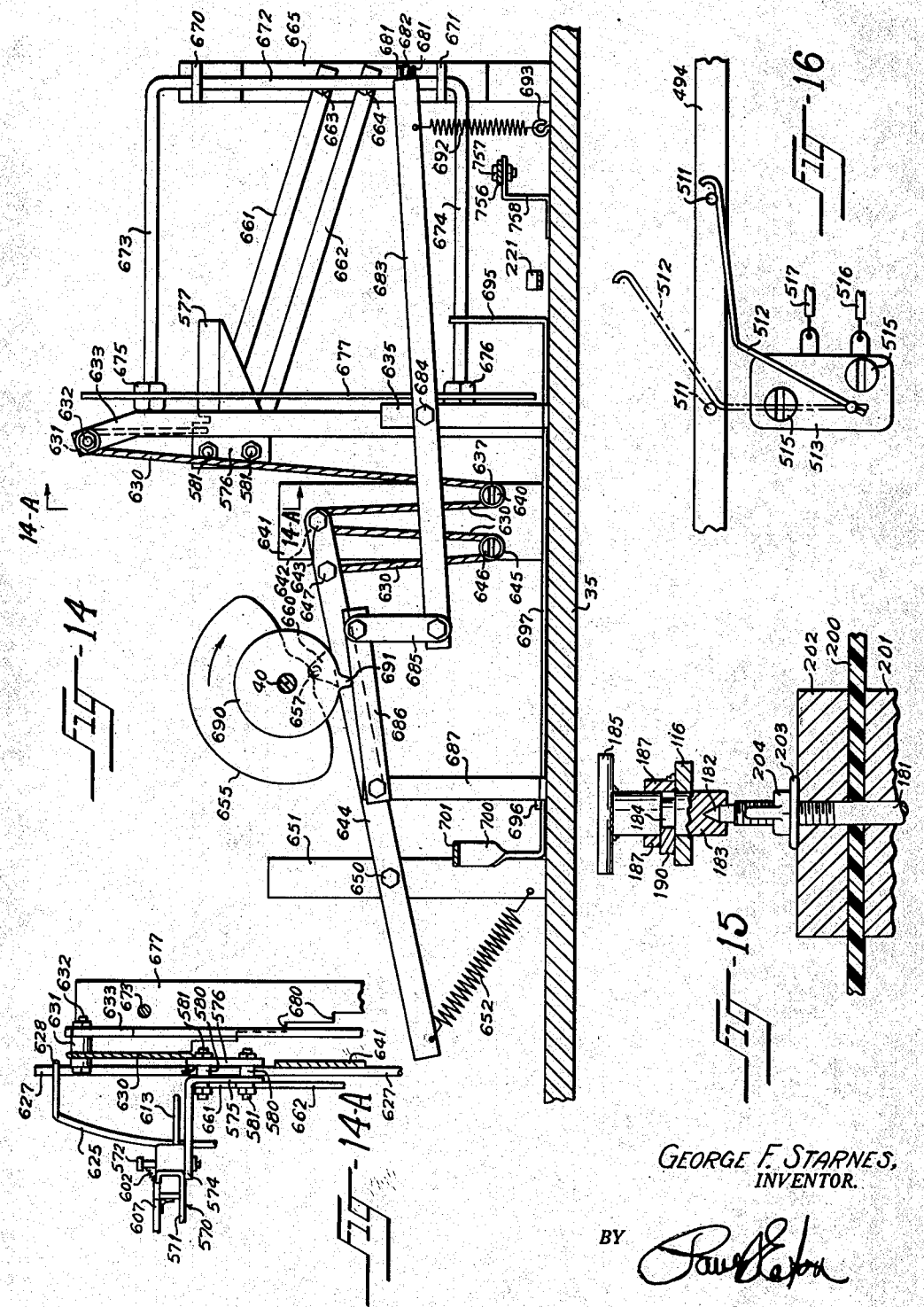

GEORGE F. STARNES,
INVENTOR.

BY
ATTORNEY.

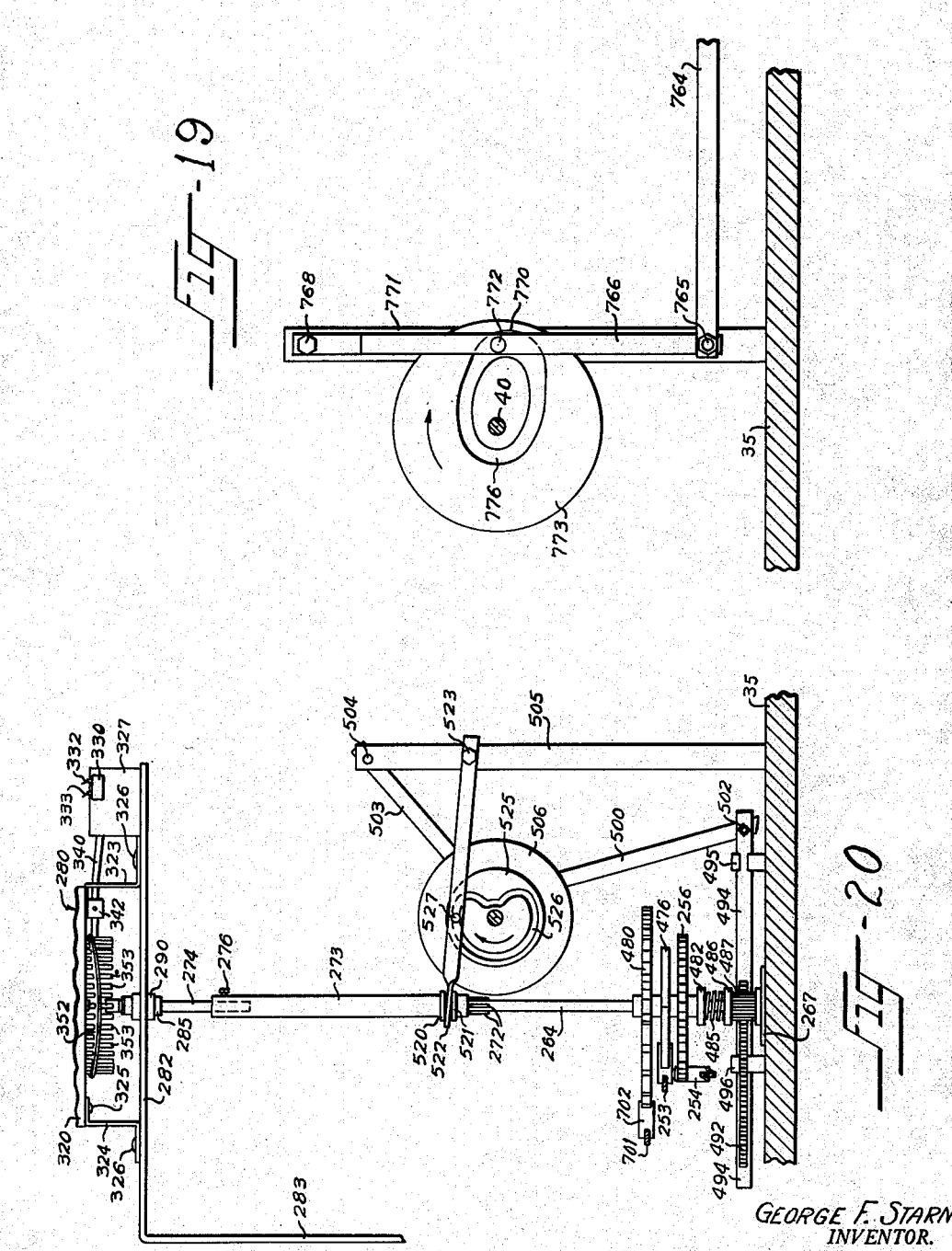

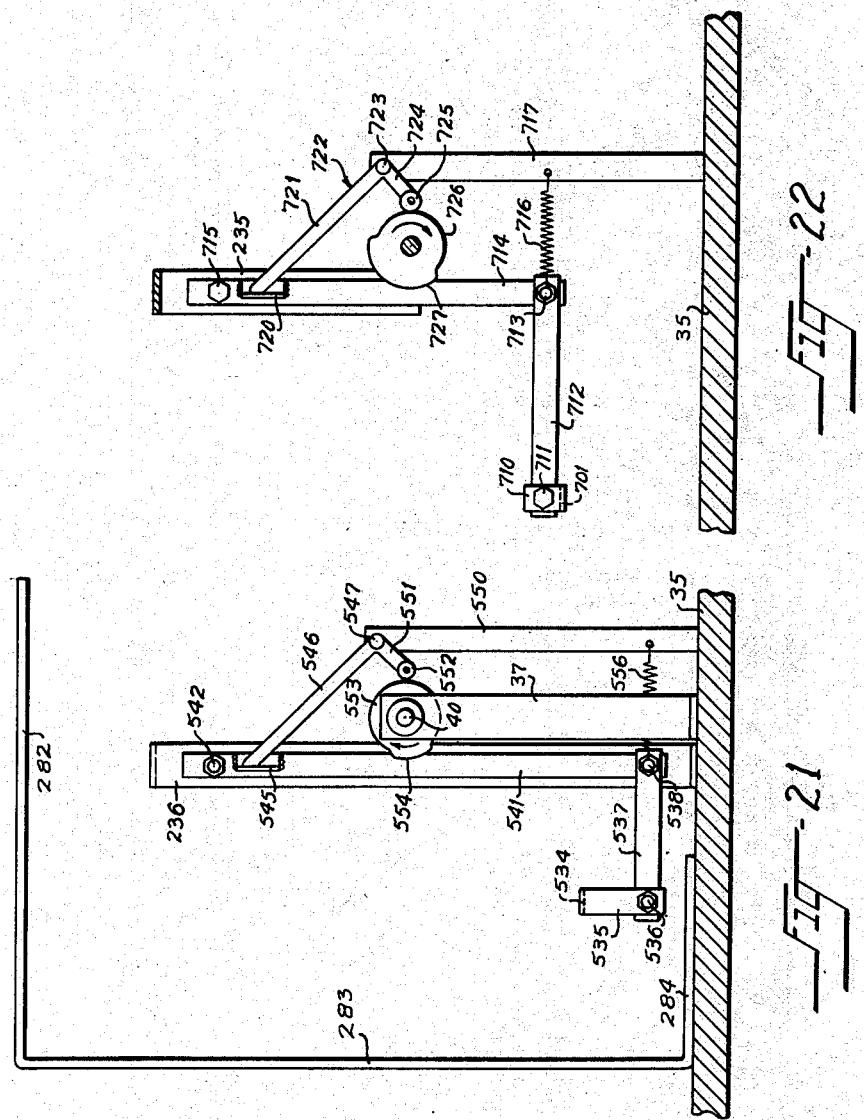

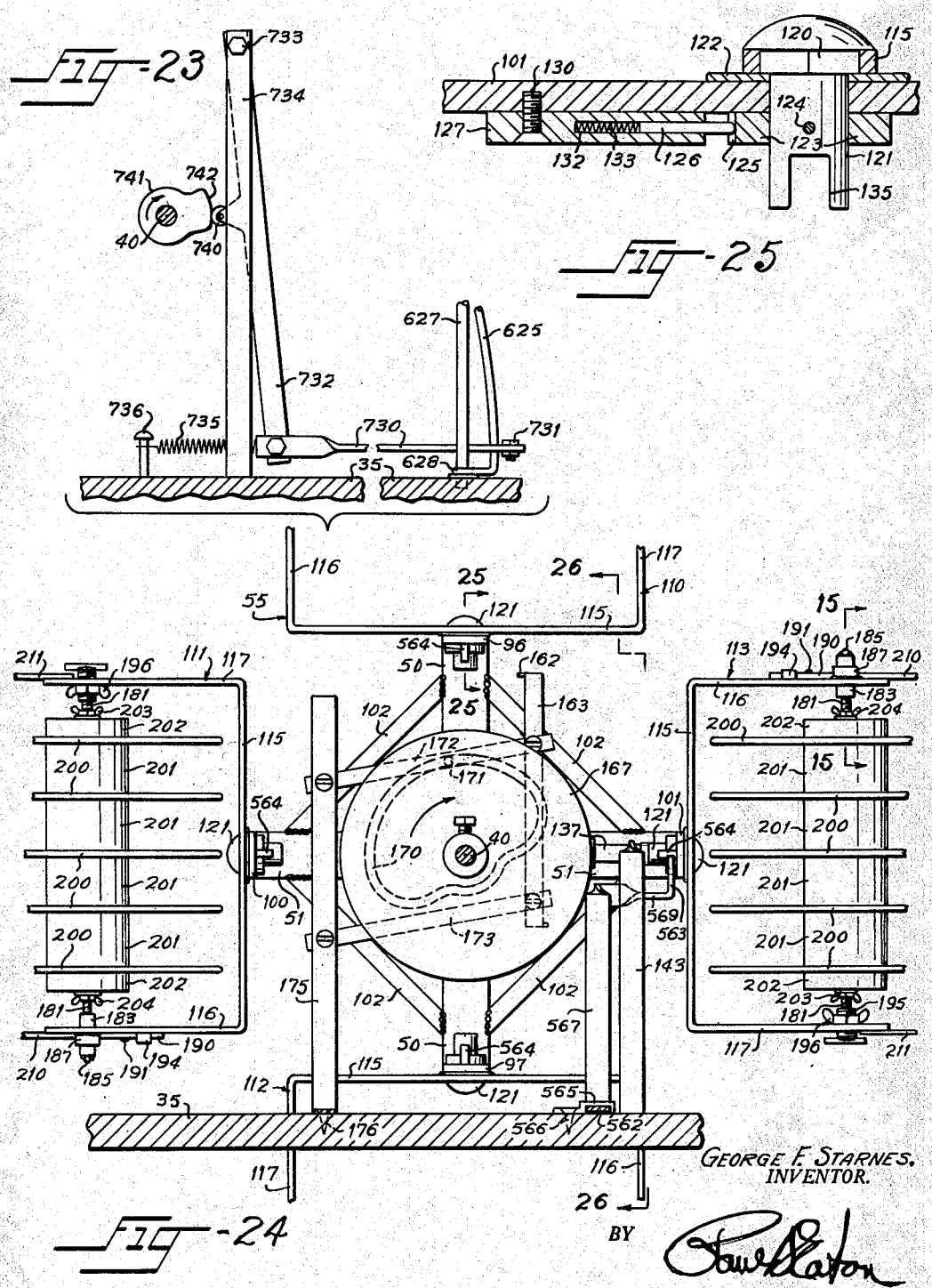

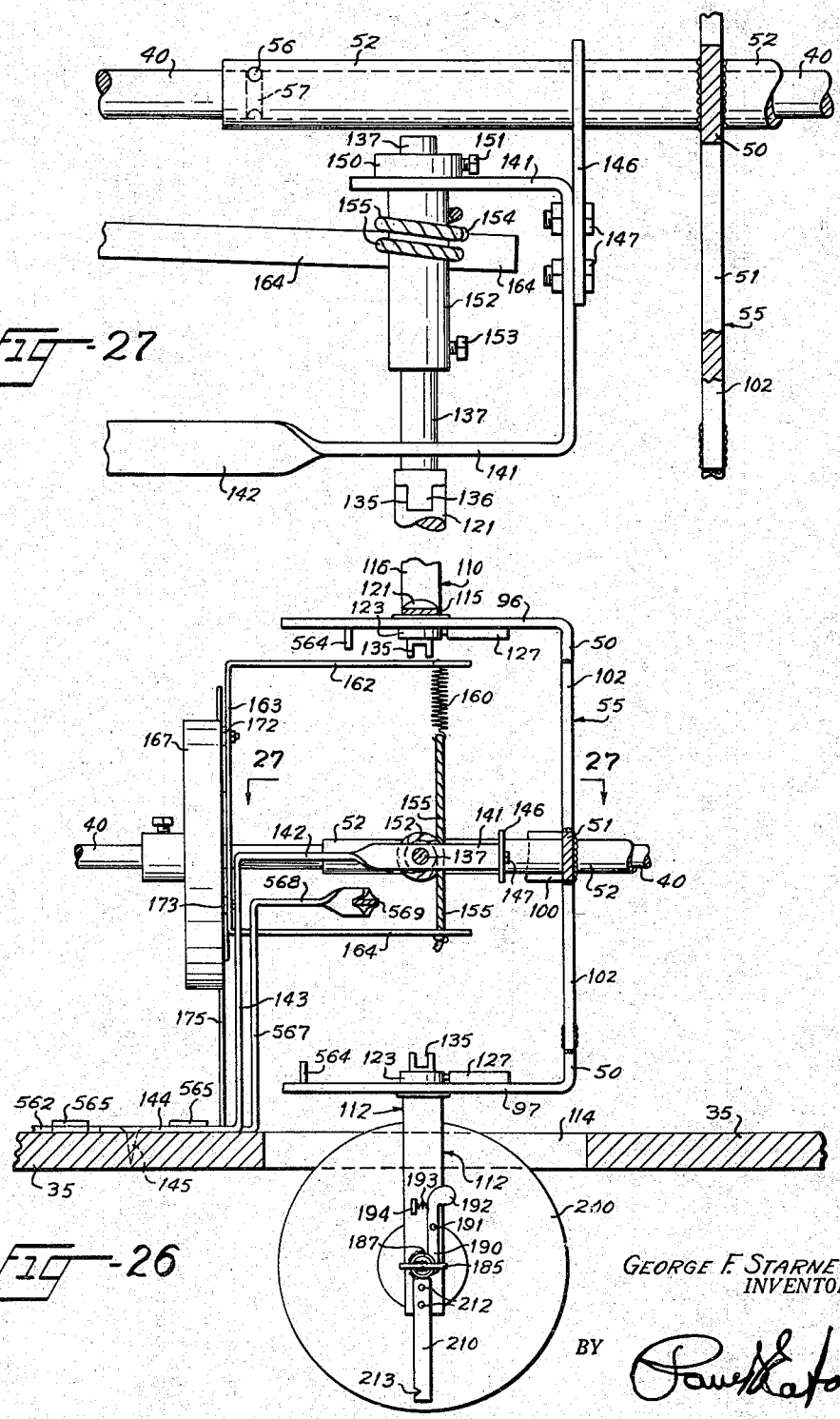

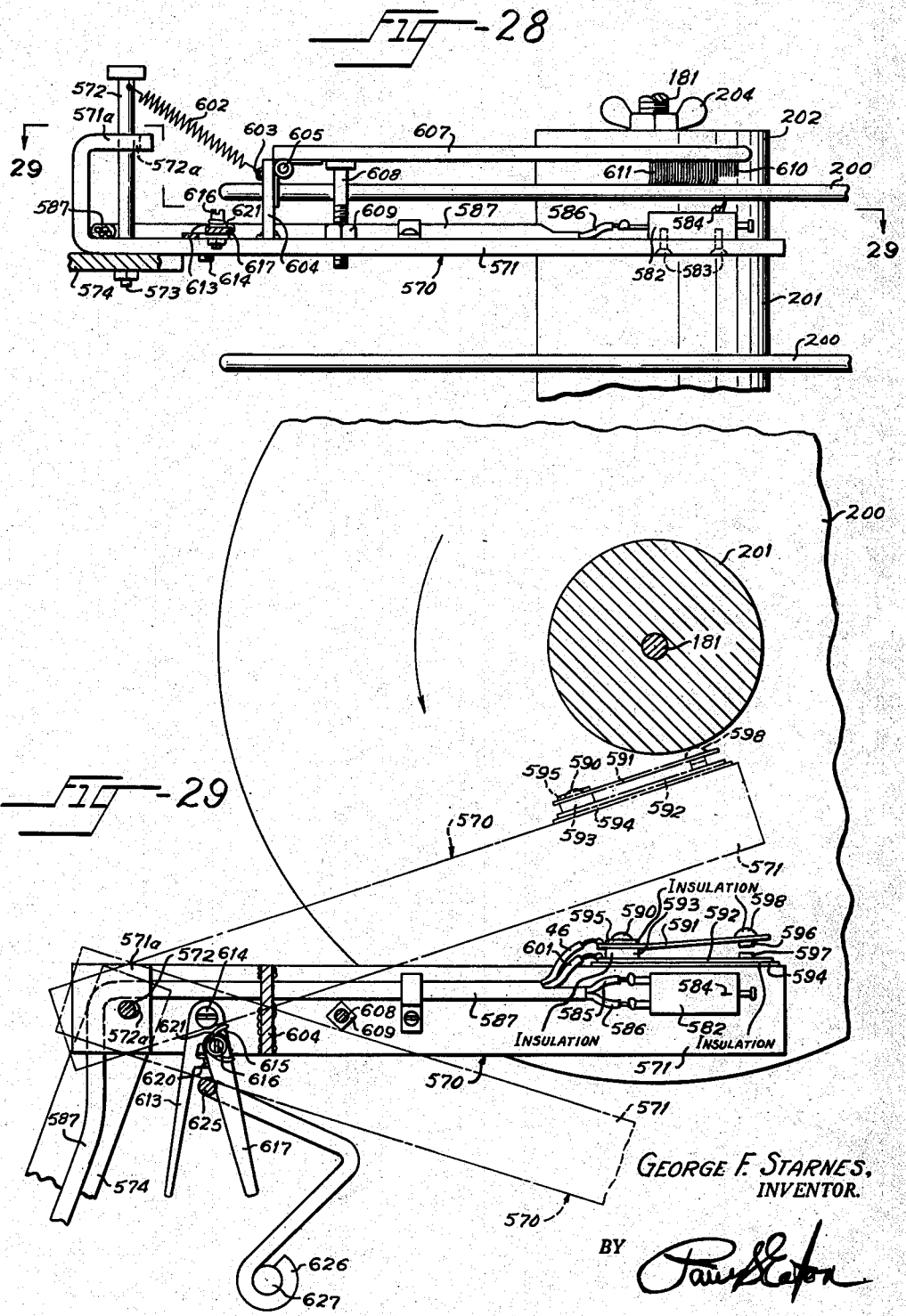

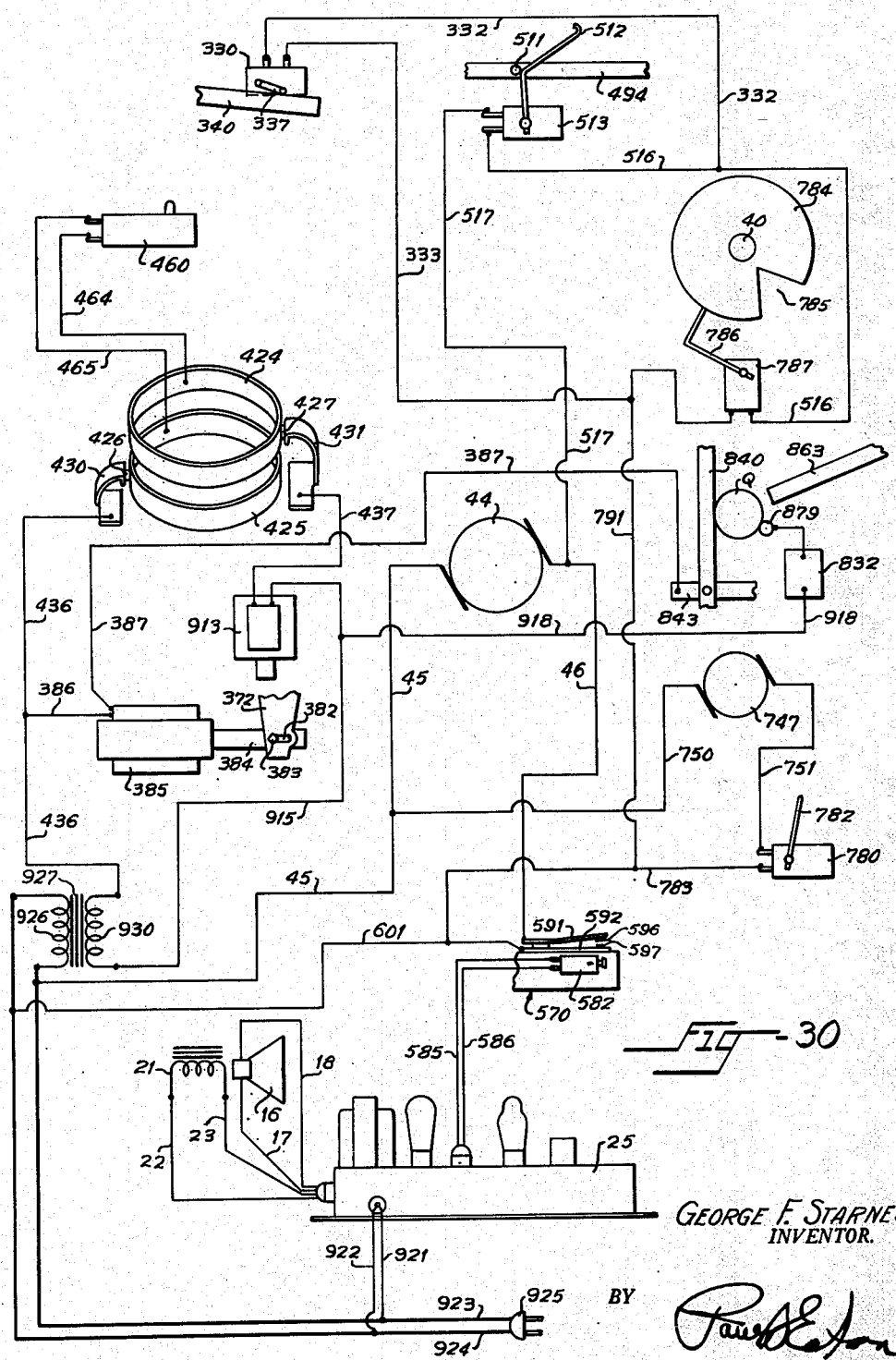

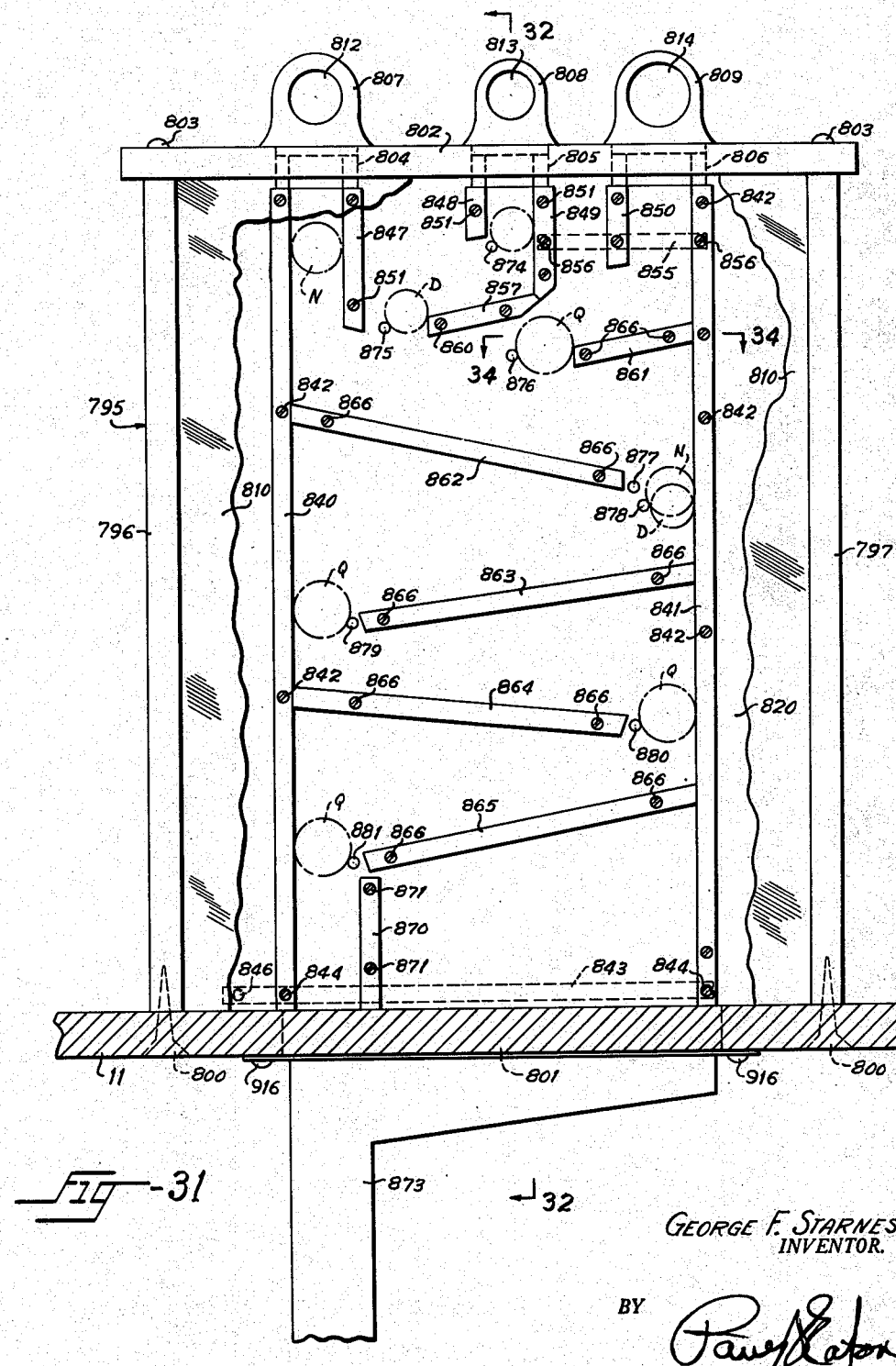

March 13, 1951
G. F. STARNES
2,545,117
CHECK CONTROLLED PHONOGRAPH RECORD
PLAYING AND SELECTING MECHANISM
Filed March 8, 1949
20 Sheets-Sheet 19
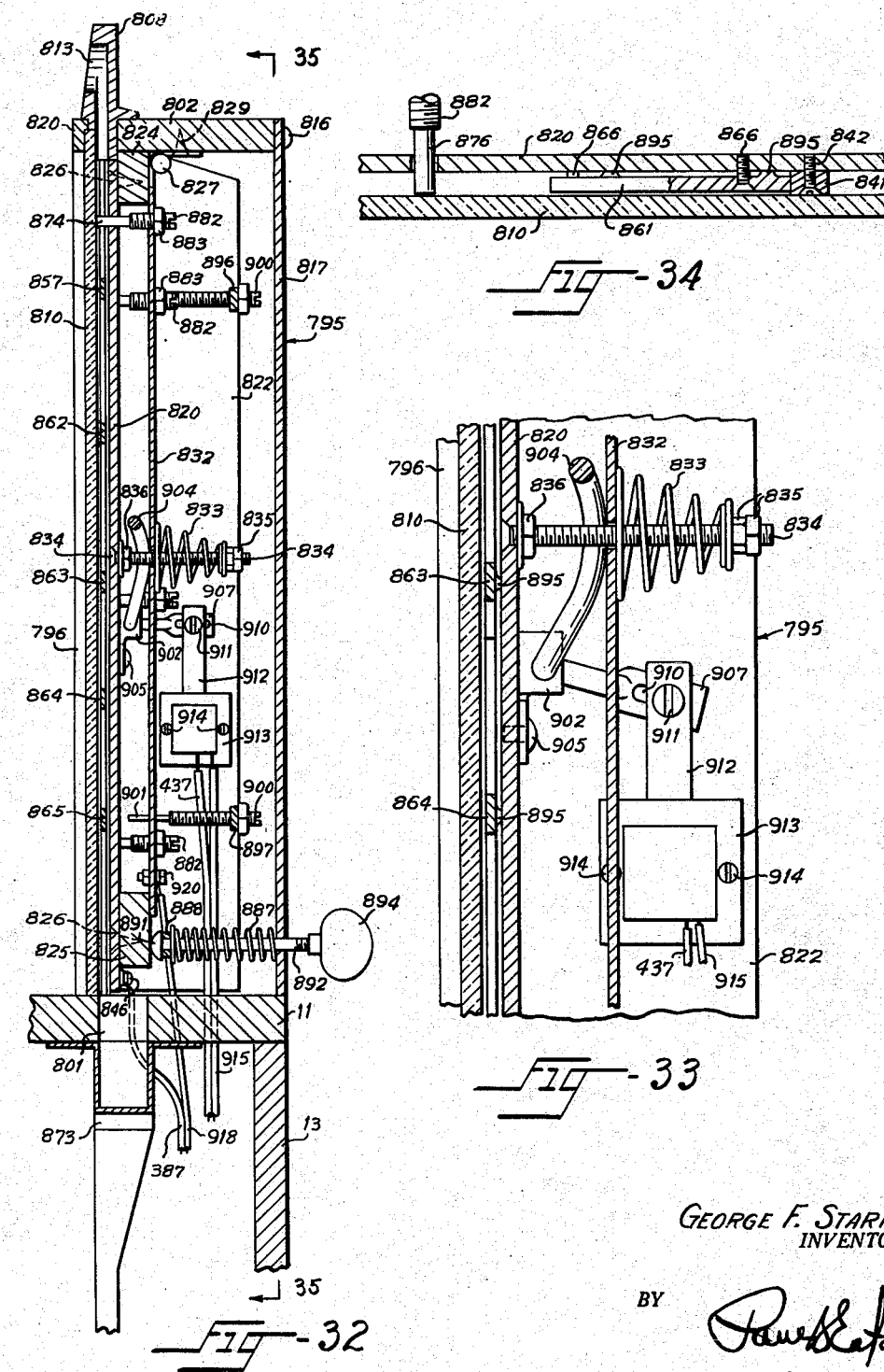
GEORGE F. STARNES,
INVENTOR.
BY
Paul B. Eaton
ATTORNEY.

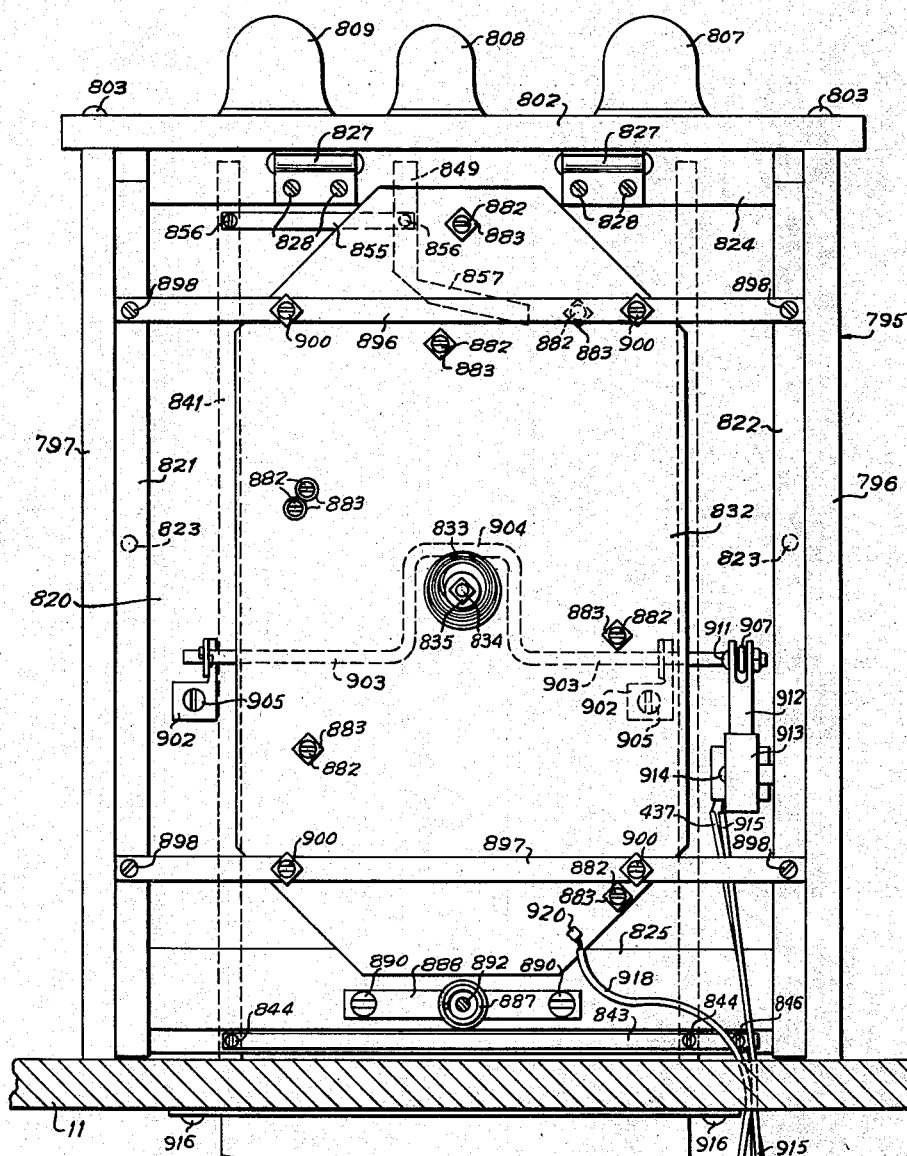

Patented Mar. 13, 1951

2,545,117

UNITED STATES PATENT OFFICE 2,545,117

CHECK CONTROLLED PHONOGRAPH RECORD PLAYING AND SELECTING MECHANISM

George F. Starnes, Hickory, N. C., assignor to Paul B. Eaton, Charlotte, N. C.

Application March 8, 1949, Serial No. 80,309

19 Claims. (Cl. 194—15)

This invention relates to an automatic check controlled phonograph record playing and selecting mechanism of a type such as may be enclosed within a cabinet and having manually operable mechanical selector means controlled from the outside of the cabinet.

This application is a continuation in part of my application for a Check Controlled Phonograph, Serial Number 42,431, filed August 4, 1948.

The primary object of this invention is to provide a phonograph record selector mechanism comprising a rotatable carriage on which a plurality of magazines are mounted, each magazine being oscillatable and having a plurality of disk-shaped or tablet type phonograph records mounted in spaced relation to each other to rotate therewith and to provide a mechanical selector embodying a rotatable disk which is accessible to an operator and having a resilient plunger projecting therefrom. A graduated ring surrounds the rotatable disk, each graduation being indicative of a selection, and by rotating the disk to a position where the resilient plunger will be in alinement with the desired graduation, which denotes a desired selection, the resiliently mounted plunger may then be pressed downwardly, assuming that a check or coin has been inserted in the slot provided for the same in the cabinet which houses the record playing mechanism, and this will complete an electrical circuit to the mechanism, which will automatically position the carriage as well as the individual magazines in such a manner as to play a selected side of a record.

It is another object of this invention to provide a coin receiving apparatus which will cause the mechanical selector mechanism to respond to the action of the resiliently mounted plunger in the rotatable disk heretofore described for playing a desired record, comprising a housing, which would preferably be mounted exteriorly of the cabinet in which the selecting mechanism is disposed, and having variable size coin receiving openings at its upper end and having a window as its front wall so one may observe the travel of the coins into the mechanism.

As the coins pass into the coin receiving apparatus, the transparent window will permit the operator to observe the path of travel of the coin or coins, thus being able to determine the presence of a coin within the coin receiving apparatus, as well as to be able to determine whether or not another selection remains to be played in the selecting mechanism associated with this coin receiving apparatus.

Now, as the coin moves through the apparatus, by gravity, the coin will engage certain pins projected into its path and will complete a circuit between the pins and other parts of the apparatus which will in turn complete a circuit to the selecting mechanism and the first of said pins, which is projected into the path of the coin, will then move out of its path, permitting the coin to pass thereby to the next projecting pin it its path of travel, or if there is no other pin in its path of travel, the coin will then pass into a suitable coin box.

It is still another object of this invention to provide a phonograph record player and selector having one or more oscillatable magazines therein each having a rotatable shaft therein on which a plurality of tablet type records are fixedly secured on the shaft in spaced relation to each other and to provide means whereby a tone arm may be swung into the space between two records and its needle may be brought into engagement with the lower surface of one of the phonograph records, and to provide arresting means which will restrict upward vertical movement of the tone arm at a desired elevation for engaging a particular selected record.

Some of the objects of the invention having been stated, other objects will appear as the description proceeds, when taken in connection with the accompanying drawings, in which—

Figure 3 is an elevation of the right-hand side of Figure 2;

Figure 3A is an enlarged vertical sectional view taken substantially along the line 3A—3A in Figure 2;

Figure 4 is an enlarged vertical sectional view through the mechanical selector and is taken substantially along the line 4—4 in Figure 2;

Figure 5 is a top plan view of the mechanical selector with parts in section and is taken substantially along the line 5—5 in Figure 4, but is shown at a slightly reduced scale;

Figure 6 is an elevation, with parts in section, looking from the right-hand side of Figure 5 and is taken substantially along the line 6—6 in Figure 5;

Figure 7 is an elevation with parts broken away and is taken substantially along the line 7—7 in Figure 6;

Figure 8 is a sectional plan view taken substantially along the line 8—8 in Figure 4;

Figure 9 is a vertical sectional view on a slightly reduced scale and is taken substantially along the line 9—9 in Figure 1, but omitting the record playing and selecting mechanism;

Figure 10 is an enlarged elevation with parts in section and is taken substantially along the line 10—10 in Figure 2 and showing the parts which are disposed below the parts shown in Figure 4 and being an enlargement of the lower left-hand corner of Figure 3;

Figure 11 is an elevation with parts in section and is taken substantially along the line 11—11 in Figure 10;

Figure 12 is a top plan view with parts in section and is taken substantially along the line 12—12 in Figure 11;

Figure 13 is an enlarged vertical sectional view taken substantially along the line 13—13 in Figure 11;

Figure 14 is an enlarged elevation with parts in section and is taken substantially along the line 14—14 in Figure 2;

Figure 14A is an elevation being taken substantially along the line 14A—14A in Figure 14;

Figure 15 is an enlarged vertical sectional view being taken substintially along the lines 15—15 in Figures 2 and 24 and showing the upper bearing for one of the rotatable magazine shafts;

Figure 16 is an enlarged schematic top plan view and is taken substantially along the line 16—16 in Figure 11 and showing one of the means for breaking the circuit to the cam shaft motor;

Figure 19 is a schematic elevation on a reduced scale and is taken substantially along the line 19—19 in Figure 10 and showing means for moving the friction driving wheel away from a record;

Figure 20 is an elevation with parts in section and is shown on a reduced scale and is taken substantially along the line 20—20 in Figure 10, but showing a part of the selecting mechanism at the upper portion thereof which is not shown in Figure 10 and showing means for cancelling a selection and moving the selector to another selection;

Figure 21 is a schematic elevation with parts in section and is shown on a reduced scale and is taken substantially along the line 21—21 in Figure 10 and showing means for releasing the magazine carriage for rotation;

Figure 22 is a schematic elevation with parts in section and being shown on a reduced scale and is taken substantially along the line 22—22 in Figure 10 and showing means for controlling the elevation at which the tone arm will stop;

Figure 23 is an enlarged schematic elevation with parts in section and being taken substantially along the line 23—23 in Figure 2 and showing a part of the means for moving the tone arm in between a pair of records.

Figure 24 is an enlarged elevation with parts in section and being taken substantially along the line 24—24 in Figure 2 and showing means for oscillating a magazine;

Figure 25 is a vertical sectional view taken substantially along the line 25—25 in Figure 24 and showing means for locking a magazine against rotation during rotation of the carriage;

Figure 26 is an elevation with parts in section and being taken substantially along the line 26—26 in Figure 24;

Figure 27 is an enlarged top plan view with parts in section and being taken substantially along the line 27—27 in Figure 26;

Figure 28 is an enlarged elevation of the tone arm with parts in section and being taken substantially along the line 28—28 in Figure 2;

Figure 29 is a top plan view of the structure shown in Figure 28 and is taken substantially along the line 29—29 in Figure 28;

Figure 30 is an electrical diagram showing the various associated electrical and mechanical parts schematically;

Figure 31 is an enlarged elevation of the check or coin receiving apparatus which is mounted on top of the cabinet in Figure 1;

Figure 32 is a vertical sectional view through the coin receiving apparatus and is taken along the line 32—32 in Figure 31;

Figure 33 is an enlarged vertical sectional view showing the central portion of Figure 32 but with parts in a different position;

Figure 34 is an enlarged sectional plan view and is taken substantially along the line 34—34 in Figure 31;

Figure 35 is an elevation taken substantially along the line 35—35 in Figure 32 being a rear elevation of Figure 31 with the back cover removed.

Figure 1:
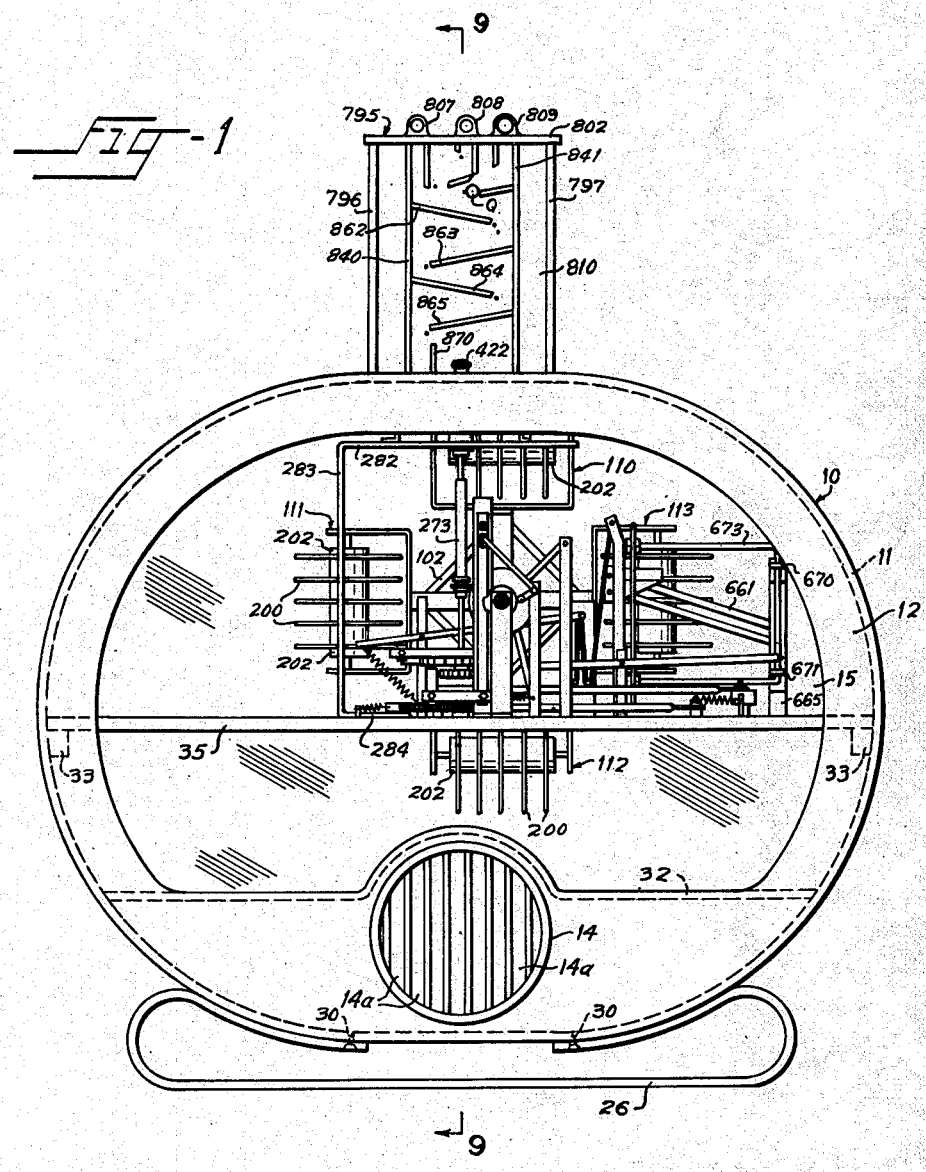
Figure 1 is a front elevation of a cabinet having a window at its front through which the phonograph record selective apparatus may be observed and showing the coin receiving apparatus mounted on the top of the cabinet.

Referring more specifically to the drawings, the numeral 10 broadly designates a suitable cabinet (Figures 1 and 9) for housing this record selective apparatus and this cabinet has a continuous elliptical shaped wall 11 which forms the top and bottom and sides of the cabinet. This cabinet 10 is also provided with a front panel 12 and a rear panel 13. The front panel 12 is elliptical and its upper portion has fixed therein a transparent plate 15 and also has an opening 14 with suitable slots 14a forming a grillwork therein, the transparent plate 15 is provided to enable one to view the operation of the apparatus disposed within the cabinet 10 and the opening 14 is provided for emission of sound from a speaker 16 suitably secured to the inner surface of the front panel 12, adjacent the opening 14, and having a cable 19 containing electric wires 17 and 18 extending from the same. An inductor or reactor being a necessary part of a dynamic speaker, an inductance coil 21 (Figure 30) has electric wires 22 and 23 extending from the same. The wires 17, 18, 22 and 23 extend through cable 19 to a suitable amplifying unit 25 mounted on the bottom portion of the continuous wall 11 of the cabinet 10.

The cabinet 10 is supported on suitable curved leg members 26 and 27 secured as by screws 30 to the lower portion of the continuous wall 11. The cabinet 10 is provided with a substantially horizontal partition 32 which is formed to pass over the dynamic speaker 16, thus dividing the cabinet into an upper chamber and a lower chamber. The lower chamber houses the dynamic speaker 16 and the amplifier 25 and the upper chamber houses the phonograph record selecting and playing apparatus to be presently described. Suitably secured to opposite sides of the continuous wall 11 (Figure 1) are horizontal support bars 33 which slidably support a plate 35 removably secured to the bars 33 and this plate 35 supports the phonograph record playing and selecting apparatus to be presently described.

Secured to the plate 35, as by screws 36, are upstanding angle plates 37 and 38 (Figures 2 and 3) in which a forwardly and rearwardly extending cam shaft 40 is rotatably mounted. This cam shaft 40 has a worm gear 41 fixedly mounted on its righthand end in Figure 3 and at its rearmost end in Figure 2 which meshes with a worm 42 fixedly secured on a shaft 43 of an electric motor 44 secured as by bolts 47, to the upstanding angle plate 38. The electric motor 44 has electric wires 45 and 46 extending from the same, which are a part of the electrical circuit to be later described.

Cross bars 50 and 51 are a part of a magazine carriage 55 and are welded at their juncture to a tubular member 52 which is rotatably mounted on the cam shaft 40. This tubular member 52 extends outwardly at one side of the carriage 55 and has a fixed clutch member 53 integral therewith, and the fixed clutch member 53 cooperates with a slidable clutch member 54 to be presently described.

The tubular member 52 is prevented from having endwise movement on the shaft 40 by a pin 56 which is secured in off center relation in the tubular member 52 and the shaft 40 has an annular groove 57 therein which is engaged by the pin 56 as it fixedly penetrates the tubular member 52 and thus permits rotation of the tubular member 52 relative to the cam shaft 40, but prevents endwise movement of the same.

Figure 2:
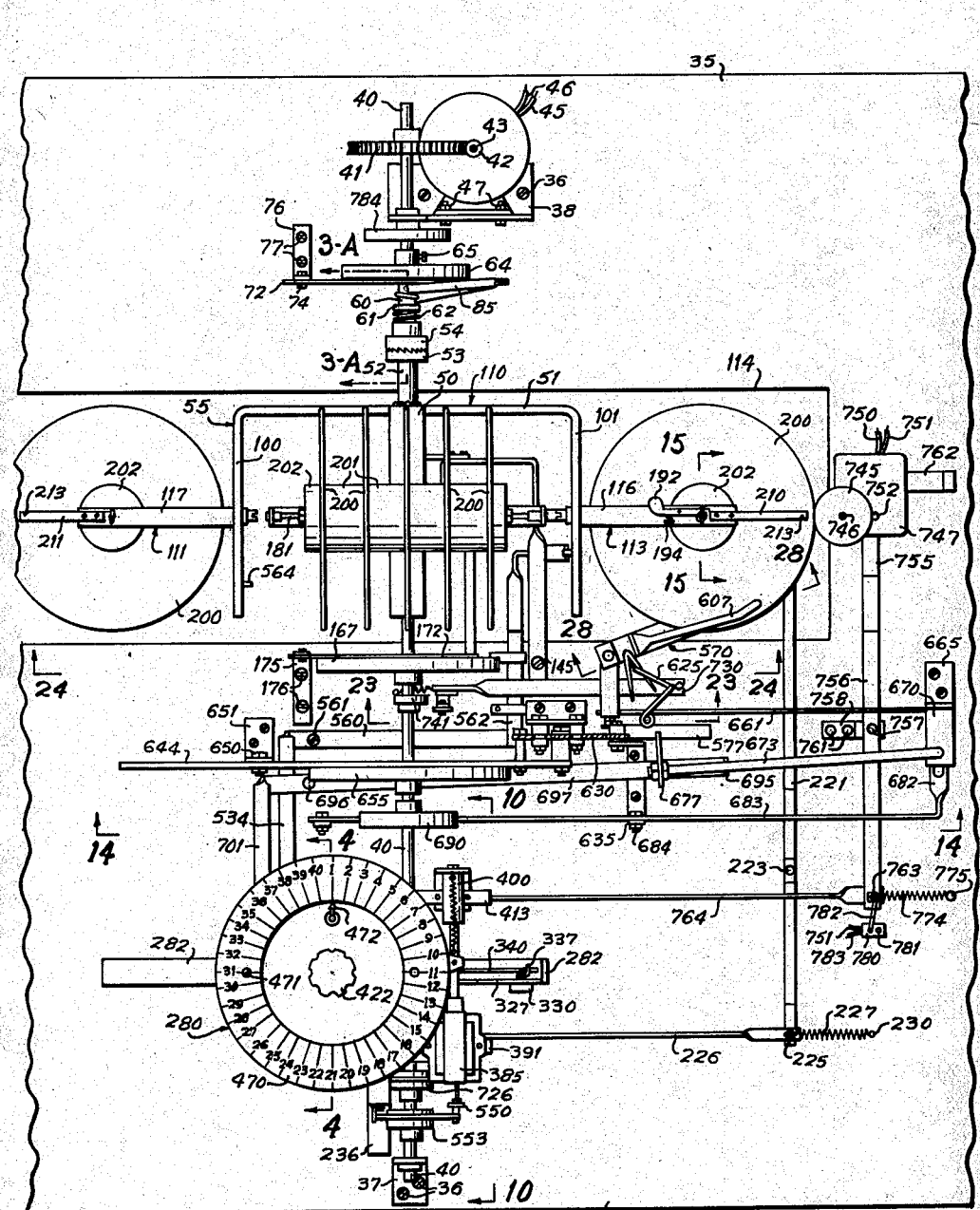
Figure 2 is a top plan view of the phonograph record selecting apparatus, showing the same removed from the cabinet.
Figure 17:
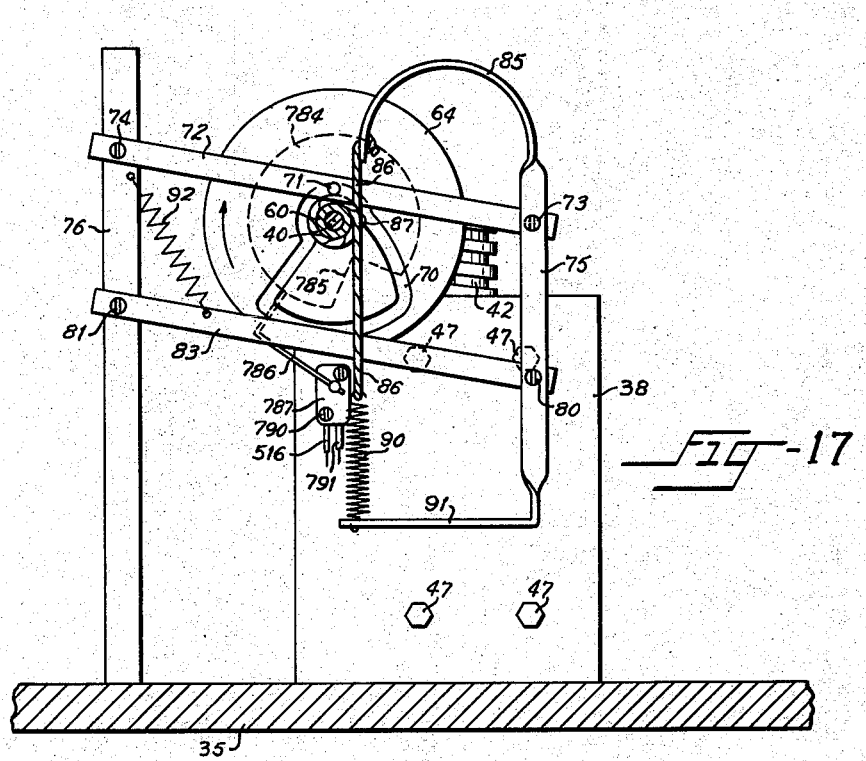
Figure 17 is an enlarged elevation with parts in section and is taken substantially along the line 17—17 in Figure 3 and showing another means for breaking the circuit to the cam shaft motor and also means for rotating the magazine carriage.

The slidable clutch member 54 is mounted for longitudinal sliding movement on a tubular shaft 60 having a fixed collar 61 intermediate its ends, which engages one end of a compression spring 62, the other end of which engages the clutch member 54 thus normally urging the clutch member 54 into engagement with the fixed clutch member 53 (Figures 2, 3 and 17).

The clutch member 54 is slidably keyed as at 63 to the tubular shaft 60 which is rotatably mounted on the shaft 40 and is prevented from having endwise movement on the shaft 40 by a carriage rotation cam wheel 64 at its right-hand end in Figure 3A, and its left-hand end in Figure 3A engages the right-hand surface of the clutch member 53. The carriage rotation cam wheel 64 is fixedly secured, as by a set screw 65, to the shaft 40 and has an irregular groove 70 in its left-hand face in Figure 3, as shown in Figure 17, which is engaged by a cam follower 71 (Figure 17) secured intermediate the ends of a bar 72, the opposite ends of which are oscillatably connected as at 73 and 74 to a vertically disposed bar 75 and a standard 76, respectively. The standard 76 has a laterally bent portion at its lower end (Figure 2) which is secured as by screws 77 to the plate 35.

Disposed below the bar 72 and being oscillatably connected at each end thereof to the bar 75 and the standard 76 as at 80 and 81, respectively, is a parallel bar 83 and it is thus seen that as the cam follower 71 rides in the groove 70 of the cam wheel 64, the bars 72 and 83 will cause the bar 75 to move vertically and to retain substantially the same attitude throughout its range of vertical movement. The bar 75 (Figure 17) has an upwardly, inwardly and downwardly, semi-circular bent portion 85, at its upper end, to the free end of which a cable or rope 86 is connected.

The cable 86 extends downwardly and passes around the tubular shaft 60 and is secured to the same as by a screw 87. The cable then extends downwardly and has the upper end of a tension spring 90 connected to the lower end thereof, the other end of which is connected to a horizontally bent leg 91 extending from the vertically disposed bar 75. Due to the irregular shape of the groove 70 in the face of the cam wheel 64, a tension spring 92 is connected at opposite ends thereof to the vertically disposed standard 76 and the parallel bar 83 to thus normally urge the cam follower 71 upwardly in Figure 17. The purpose of the function of the clutch members 53 and 54 will be later described.

The cross bar 50 (Figures 2, 24, and 26) of the magazine carriage 55 has right-angularly bent arms 96 and 97 at opposite ends thereof and the cross bar 51 has similar right-angularly bent arms 100 and 101 at opposite ends thereof. The cross bars 50 and 51 are held in perpendicular relation to each other by diagonal brace bars 102 which are welded at each end thereof to the bars 50 and 51 (Figure 24). The right-angularly bent arms 96, 100, 97 and 101 have magazines broadly designated at 110, 111, 112 and 113, respectively, connected thereto by means to be presently described. These magazines 110, 111, 112 and 113 are substantially the same as those of my said co-pending application. However, they are mounted differently and are moved into position in a different manner.

It will be noted that the base plate 35 has an opening 114 therein (Figures 2 and 9) through which the magazine racks 110 to 113, inclusive, pass upon rotation of the magazine carriage 55. All of the magazines 110 to 113, inclusive, being identical, will bear the same reference characters, and a detailed description will be given of the magazine 113, it being understood that identical parts will be included in each of the other magazines 110, 111 and 112.

Each of the magazines 110, 111, 112, and 113 comprises a substantially U-shaped strap iron member 115, having outwardly extending arms 116 and 117 integral therewith. The medial portion of the strap iron member 115 has a square hole therein which is penetrated by a square portion 120 of a stub shaft 121 (Figure 25). The stub shaft 121 is rotatably mounted in the right-angularly bent arm 101 of the cross bar 51 of the magazine rack. A suitable washer 122 is provided between the strap iron member 115 of the magazine 113 and the arm 101 of the magazine carriage 55 and serves as a thrust bearing member for rotation of the magazine rack 113 relative to the arm 101. The stub shaft 121 has a collar 123 secured thereto, as by a tapered pin 124, and this collar 123 has a notch 125 in its periphery which is adapted to be intermittently engaged by a plunger 126 mounted for sliding movement in a block 127 secured as by a screw 130 to the arm 101. The block 127 has a bore 132 therein in which a compression spring 133 is disposed and this spring 133 normally urges the plunger 126 into engagement with the periphery, or with the notch 125, of the collar 123, thus serving to hold the stub shaft 121 in a proper position for alinement with parts to be presently described.

The stub shaft 121 has a slot 135 in its inner end and this is adapted to engage a restricted flattened portion 136 (Figure 27) of a shaft 137. This shaft 121 and the means for imparting rotation thereto is substantially the same as that of my said co-pending application. The remaining parts, other than the magazines 110, 111, 112 and 113, are peculiar to this application only. The shaft 137 is rotatably mounted in interconnected parallel bent portions 140 and 141 of a bracket 142 which, in Figure 26, extends downwardly as at 143 and has a laterally bent portion 144 at the lower end thereof which is penetrated and secured by screws 145 to the plate 35.

Referring to Figure 27, it may be observed that the bracket 142 has a bar 146 secured thereto, as by bolts 147, and this bar 146 extends upwardly and is loosely mounted on the tubular sleeve 52 of the magazine carriage 55 to lend rigidity to the arms 140 and 141 of the bracket 142. The shaft 137 has a collar 150 secured thereto as by a set screw 151 which prevents endwise movement of the shaft 137 in the parallel bent portions 140 and 141 of the bracket 142. A sleeve 152 is fixedly secured as by a set screw 153 on the shaft 137 and has secured thereto, as by a set screw 154, the intermediate portion of a cable 155 which surrounds the sleeve 152 and then extends upwardly and downwardly from the same in Figure 26. The upper end of the cable 155 has the lower end of a tension spring 160 connected thereto, the upper end of which is connected to a horizontally disposed bar 162 integral with a vertically disposed bar 163. The lower end of the vertically disposed bar 163, in Figure 26, has a laterally bent portion 164 integral therewith, to which the lower end of the cable 155 is connected.

Now, referring to Figure 24, there may be observed a face cam wheel 167 fixedly mounted on the shaft 40 and having an irregular groove 170 in one side thereof which is adapted to be engaged by a cam follower 171, projecting from a parallel arm 172, there being a second parallel arm 173 disposed below the same in Figure 24. The parallel arms 172 and 173 are oscillatably connected at opposite ends thereof to the vertically disposed bar 163 and a vertically disposed standard 175, the lower end of which is bent laterally and secured as by screws 176 (Figure 2) to the plate 35.

It is thus seen that as the shaft 40 causes the cam wheel 167 to rotate in a clockwise direction in Figure 24, the vertically disposed bar 163 will be caused to move in a vertical plane in such a manner as to transmit rotation to the shaft 137 through the medium of the cable 155, which will, in turn, transmit oscillatory motion to the particular magazine whose shaft 121 is meshing with shaft 137.

Again referring to the magazines (Figures 1, 2, 3, 15 and 24), each of the magazines 110 to 113, inclusive, has a shaft 181 extending between the arms 116 and 117 in parallel relation to the strap iron bar 115. This shaft 181 is restricted and pointed at each end thereof, as at 182, the upper end of the shaft 181 in Figure 15 being rotatably mounted in a bearing member 183 slidably mounted in the bar 116 and having an annular grove 184 therein. The upper end of the bearing member 183 has a transverse pin 185 welded thereto which is adapted to be grasped by the operator of the machine for removing the shaft and associated parts from the associated magazine as will be presently described.

It will be noted in Figures 15 and 24 that the arm 116 of the magazine is provided with a sleeve 187 which is secured to the same as by welding and is provided to lend rigidity to the bearing member 183. The angularly grooved portion 184 of the bearing member 183 is adapted to be engaged by one end of a locking arm 190 which slidably penetrates one side of the sleeve 187. The arm 190 is pivotally secured as at 191 to the arm 116 and has a handle portion 192 at its free end (Figure 26). This free end of the locking arm 190 is engaged by one end of a compression spring 193, the other end of which engages a block 194 welded to the arm 116 to thus normally urge the locking arm 190 into engagement with the annularly grooved portion 184 of the bearing member 183.

It is manifest that when it is desired to remove the shaft 181 from the associated magazine, it is merely necessary to move the lever or locking arm 190 in a counterclockwise direction in Figure 26 to thus remove the same from engagement with the annular groove 184 in the bearing member 183 and to thereby permit the bearing member 183 to be moved upwardly away from the upper end of the shaft 181 in Figure 15.

The lower end of the shaft 181 is identical to the upper end of the shaft 181 as observed in Figure 15 but is mounted in a bearing member 195 (Figure 24) threadably mounted in the arm 117 of the associated magazine, and a locking thumb nut 196 is threadably mounted thereon to lock the bearing member 195 in adjusted position relative to the arm 117 to permit free rotation of the shaft 181.

The shaft 181 is adapted to slidably receive a plurality of tablet type records 200 which are held in spaced relation to each other by suitable spacers 201 slidably mounted on the shaft 181 and the endmost records 200 are held against the endmost spacers 201 by similar spacers 202, the remote ends of which are engaged by washers 203 which are, in turn, engaged by lock thumb nuts 204 and when tightened will serve to hold the records 200 and spacers 201 and 202 in fixed relation to the shaft 181.

The arms 116 and 117 of each of the magazines 110, 111, 112 and 113 have rigid fingers 210 and 211, respectively, secured to the same as by screws 212. The rigid finger 210 is substantially longer than the rigid finger 211 and each of the fingers is provided with a notch 213 adjacent its free end (Figures 1, 2 and 3).

The notch 213 in each of the fingers 210 and 211 of any one of the magazines 110 to 113, inclusive, when positioned adjacent the tone arm to be later described, is adapted to be independently engaged by an upwardly projecting finger 220, for the purpose of determining whether or not the magazine will be oscillated 180 degrees to thereby determine which side of the selected phonograph record 200 shall be engaged by the needle of the tone arm to be later described. This finger 220 (Figures 2 and 3) extend downwardly and has a horizontally disposed strap iron lever arm 221 integral therewith which is oscillatably secured intermediate its ends, as at 223, to the plate 35.

Figure 18:
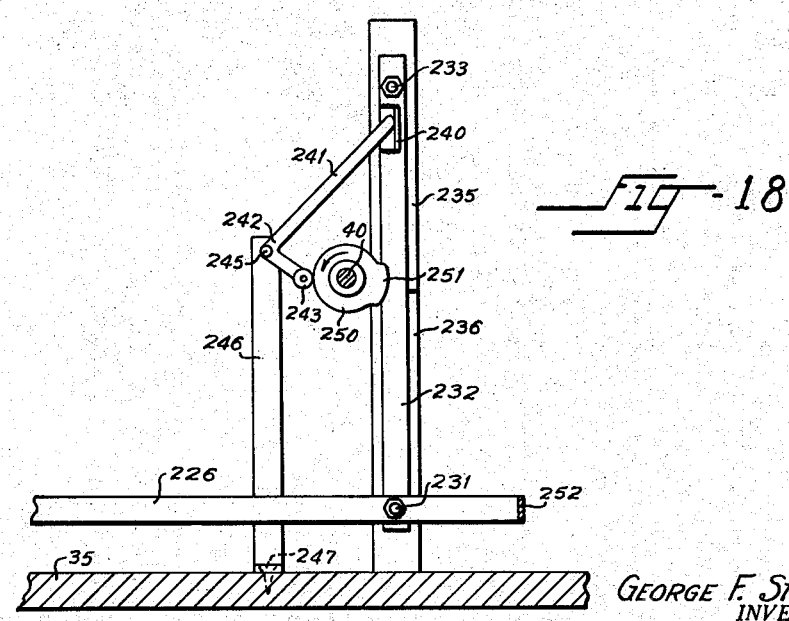
Figure 18 is a schematic elevation on a reduced scale and is taken substantially along the line 18—18 in Figure 10 and showing means for preventing oscillation of a magazine.

The end of the strap iron lever arm 221 remote from the finger 220 in Figures 2 and 3 is pivotally connected as at 225 to one end of a bar 226. A tension spring 227 is connected to the pivot screw 225 at the juncture of the strap iron member 221 and the bar 226, the other end being connected as at 230 to the plate 35 to normally urge the member 221 and the bar 226 from left to right at their juncture in Figure 2. The bar 226 is pivotally connected a substantial distance from its left-hand end in Figure 2, and from its right-hand end in Figure 18, as at 231 to the lower end, in Figure 18, of a bar 232, the upper end of which is pivotally secured as at 233 to a vertical leg 235 of an inverted U-shaped bracket 236, the left-hand leg, in Figure 10, of which is substantially longer than the vertical leg 235 and is bent laterally at its lower end and is secured as by screws 237 to the plate 35.

Welded adjacent the pivot point 233 of the bar 232 is an angle clip 240 (Figures 10 and 18), which bears against the end of an arm 241 of a bell crank 242, the short leg of which has a cam follower 243 rotatably mounted on the free end thereof. The bell crank 242 is oscillatably secured as at 245 to the upper end of a standard 246, the lower end of which is bent laterally and secured, as by screws 247, to the base plate 35. The cam follower 243 engages the peripheral surface of a cam wheel 250 fixedly mounted on the longitudinally extending shaft 40 and having a lobe 251 integral therewith.

The bar 226 is bent at right angles forming a portion 252 which is bent spirally thus forming a flattened portion 253 at its free end, and this portion 253 is bent upwardly at its free end, thus forming a vertically disposed finger 254 which is adapted to engage at times the periphery of a cog or cam wheel 256 (Figures 11 and 12) having alternately spaced shallow notches 257 cut in the periphery thereof, there being deep notches 258 cut in the cog wheel 256 between each of the shallow notches 257. The deep notches 258, when engaged by finger 254, are provided to cause finger 220 (Figure 2) to be disposed in the path of finger 211 as oscillation is imparted to the positioned magazine 113 in the manner heretofore described, to thus cause the sides of the records 200 nearest arm 117 to face downwardly for engagement by the tone arm to be later described. The notches 257, when engaged by finger 254, are provided to cause finger 220 to be disposed in the path of finger 210 as oscillation is imparted to the positioned magazine, to thus cause the sides of the records 209 nearest arm 116 to face downwardly for engagement by the tone arm to be later described.

The cog wheel 256 is fixedly mounted, as by a set screw 263 (Figure 11), on a vertically disposed shaft or spindle 264. The spindle 264 extends upwardly and downwardly from the cog wheel 256 and its lower end is restricted as at 265 (Figure 13) and this restricted portion is rotatably mounted in the plate 35 and also slidably penetrates a thrust washer 267, prior to its penetrating the plate 35. The lower end of the restricted portion 265 has a thrust washer 270 thereon which is held for rotational movement against the lower surface of the plate 35 by lock nuts 271, threadably mounted on the lower end of the restricted portion 265 of the spindle 264.

The shaft 264 is splined, as at 272 at its upper end in Figure 11 and a mating tubular shaft 273 is telescopically mounted on the upper end thereof. The upper end of the tubular shaft 273 in Figure 20 has the lower end of a vertically disposed selector shaft 274 adjustably secured therein as by a set screw 276.

The selector shaft 274 is a part of the mechanical selector unit shown in detail in Figure 4 and broadly designated at 280. This shaft 274 is rotatably mounted in a shouldered bushing 281 slidably mounted in a horizontally disposed strap iron bar 282 which is bent downwardly as at 283 in Figures 1 and 20, the lower end of the downwardly bent portion 283 being bent inwardly as at 284 (Figure 1) and being suitably secured to the horizontally disposed plate 35. The bushing 281 has a restricted portion 285, which slidably penetrates the arm 282 and has a suitable collar 290 secured thereon as by a set screw 291.

A block 293 is adjustably secured as by a set screw 294 on the shaft 274 in spaced relation above the bushing 281 in Figure 4 and extends outwardly and has a pin 295 secured therein as by a pressed fit and extending outwardly from each side thereof in Figure 8. Engaging the upper surface of the bushing 281 in Figure 4 is a rotor 296 having a slot 297 therein which is loosely penetrated by the vertically disposed shaft 274. The rotor 296 has upwardly extending ears 300, at its left-hand end in Figures 4 and 8, having slots 301 therein which are slidably penetrated by the pin 295. The pin 295 has cotter pins 302 on opposite ends thereof to confine the rotor 296 on the pin 295.

The free end of the rotor 296 (Figure 4) is curved upwardly and has a flattened portion 304 at its free end and also has an upturned lip 305 integral with the portion 304 and disposed at the trailing side of the portion 304 as the rotor 296 rotates in a clockwise direction in Figure 8, by means to be later described.

The rotor 296 has an outwardly extending and upwardly bent spring perch 306, disposed between the shaft 274 and the pin 295, to which one end of a tension spring 307 (Figure 8) is connected, the other end of which is connected to a spring perch 308, secured to the block 293. The rotor 296 has a radially extending slot 312 adjacent its flattened free end 304 which is slidably penetrated by a vertically disposed pin 313, which curves inwardly in Figures 4 and 8 and is secured in the shouldered bushing 281 as by a pressed fit. This vertically disposed pin 313 serves as a guiding pin for vertical movement of the free end of the rotor 296 in cancelling-out a selector pin as will be later described.

The mechanical selector unit 280, in Figures 3 to 6 inclusive, includes a support disk 320, an upper selector disk 321, and an intermediate selector pin disk 322. The support disk 320 is supported on brackets 323 and 324 secured to the lower surface thereof as by screws 325. The brackets 323 and 324 are secured to the horizontally disposed strap iron bar 282 (Figure 20) as by screws 326.

Referring to Figure 6, it may be observed that the bracket 323 has an upwardly extending plate portion 327 integral therewith on which a suitable switch 330 is secured as by screws 331. The switch 330 has electric wires 332 and 333 extending therefrom which are a part of the electrical circuit to be later described in detail.

The housing of the switch 330, in Figures 5 and 6, has a rotatable stub shaft 335 projecting outwardly therefrom and penetrating the vertically disposed plate portion 327 of the bracket 323. This stub shaft 335 has a feeler finger 337 suitably secured therein and projecting outwardly therefrom and which is normally urged downwardly by conventional spring means, not shown, associated with the switch 330. This feeler finger 337 is engaged by a control lever 340 oscillatably mounted intermediate its ends as at 341 on an angle clip 342 suitably secured, as by welding to the bracket 323 (Figure 6).

It will be noted that the bracket 323 has an elongated lot 344 therein which is loosely penetrated by the control lever 340. The lever 340 also has one end of a tension spring 345 connected thereto adjacent the bracket 323 and extending downwardly therefrom, the lower end of which is connected to a suitable spring perch 347 projecting from the bracket 323. The control arm 340 has a restricted portion 350, the right-hand end in Figure 6 of which is hook-shaped as at 351, the hook-shaped portion 351 loosely surrounding the vertically disposed selector shaft 274 (Figures 4 and 6).

The hooked portion 351 of the control lever 340 is normally urged upwardly against a disk 352 loosely mounted on the shaft 274 and is slidably penetrated by the lower portions of a plurality of equally spaced vertically disposed selector pins 353 arranged in a circle, said circle being concentric with the vertically disposed selector shaft 274. Each of the pins 353 has a collar 354 integral therewith disposed a substantial distance from the lower end thereof (Figure 4) and against which the disk 352 is lightly and normally urged by the tension spring 345 in Figure 6. The support disk 320 is also slidably penetrated by the pins 353 and each pin 353 has an annular groove 355 disposed above its collar 354 which is normally engaged by a continuous coiled spring 360 which completely surrounds and engages all of the pins 353 and when any of the pins 353 are in a lowered position, the spring 360 frictionally holds the pins 353 in this position until they are again moved upwardly in a manner to be later described.

The selector pin disk 322 has a thickened central portion 362 and a central boss 363 on its lower surface. This boss 363 engages the top surface of the support disk 320 and the disk 320 is held in fixed relation to the selector pin disk 322 by suitable bolts 365. The thickened portion 362 of the disk 322 has a plurality of equally spaced and circularly arranged bores 364 therein in which the upper portions of the pins 353 have vertical sliding movement.

Referring to Figures 4 and 5 it may be observed that the upper surface of the disk 322 has a safety disk 366 mounted for rotatable movement thereon around the shaft 274 and which is provided with a plurality of bores 367 arranged in a circle and which coincide at times with the bores 364.

The safety disk 366 is also provided with imperforate areas between each of the bores 367, which upon partial rotation of the disk 366, by means to be later described, will cover the upper ends of the bores 364 in the disk 322 in which the vertically disposed pins 353 are mounted. The purpose of the safety disk 366 is to prevent the lower end of a selector plunger, to be later described, from engaging the upper ends of the selector pins 353 in the event that a coin or check has not been inserted in the coin receiving mechanism, to be later described.

A horizontally disposed plate member 372 is secured to the safety disk 366 by any suitable means such as screws 373 (Figures 5 and 6) and this plate 372 has one end of a shock absorbing tension spring 374 connected thereto, the other end of which is connected to an angle clip 375 secured as by a screw 376 to the disk 322. The tension spring 374 thus normally urges the safety disk 366 in a clockwise direction in Figure 5 and urges the plate 372 towards the angle clip 375.

It will be noted in Figure 5 that the angle clip 375 when engaged by the plate 372 will aline the bores 367 in the safety disk 366 with bores 364 in the selector pin disk 322. An angle clip 377, secured as by a screw 380, to the plate or disk 322, is provided to serve as a stop for the safety disk 366 when partially rotated, by means to be presently described, in such a manner as to cause the imperforate areas 370 to cover the upper ends of the pins 353, and at which time the plate 372 will engage the angle clip 377.

The free end of the plate 372 in Figures 5, 6 and 7 has a slot 382 therein, loosely penetrated by a screw 383 which also slidably penetrates a forked portion 381 of a solenoid plunger 384 extending from a solenoid 385 having electric wires 386 and 387 extending therefrom which form a part of the electrical circuit to be later described. The solenoid 385 is secured, as by screws 390, to a bar 391 which extends upwardly in Figure 5 and is secured, as by screws 392, to the upper surface of the support plate 320 in Figure 6.

The forked free end 381 of the solenoid plunger 384 in Figure 7, which is penetrated by the bolt 383, is loosely penetrated by an angle bracket 394 which is also penetrated by the bolt 383. The angle bracket 394 has a boss 395 which has one end of a shaft 396 secured therein, as by a pressed fit. The shaft 396 is, in reality, a piston rod and has a piston 397 on its right-hand end in Figure 5 mounted for horizontal sliding movement in a cylinder 400. The cylinder 400 is closed at its right-hand end and its left hand end in Figure 5 has a disk 401 secured therein, as by a pressed fit, and which is loosely penetrated by the piston rod 396. The cylinder 400 has a small bore 402 in the right-hand end thereof which communicates with the interior of the cylinder 400 and is provided to permit air to escape from the cylinder 400 as the piston is urged from left to right in Figure 5 by a tension spring 405. The left-hand end of the spring 405, in Figure 5, is connected to a spring perch 406 projecting upwardly from the piston rod 396 (Figure 7) and the right-hand end of which is connected to a spring perch 407 connected to the right-hand end of the cylinder 400 in Figure 5. The cylinder 400 is secured, as by screws 410 to an angle clip 411 secured as by screws 412 to a bar 413. The bar 413 is secured as by screws 414 to the upper surface of the support disk 320.

When a coin is inserted in the coin receiving apparatus, to be later described, a circuit is completed to the solenoid coil 385 to thereby cause the plunger 384 to move from right to left in Figure 5, thus moving the safety disk 366 in a clockwise direction to where the bores 367 will be in alinement with the bores 364 in the disk 322 as shown in Figures 4 and 5. Now, as soon as the circuit to the solenoid coil 385 is automatically broken, in a manner to be later described, the solenoid plunger 384 will be released and the tension spring 405 will urge the plunger 384 from left to right in Figure 5. The piston 397 and its associated cylinder 400 will serve as a cushion or shock absorber to prevent the screw 383 in Figure 5 from engaging the right-hand end of the slot 382 too abruptly, which may cause breakage of some of the parts, and particularly to prevent the edges of the bores 367 in the safety disk 366 from engaging the lower end of a plunger, to be later described and shown in Figure 4, from being engaged too abruptly by the edges of the bores 367 which might mar the surface of the lower end of the said plunger thus reducing its efficiency of operation. The tension spring 374 also assists the shock absorbing piston 397 in overcoming the tendency of the tension spring 405 to pull the solenoid plunger 384 and associated parts from left to right too quickly when released.

The selector disk 321 has a boss 420 projecting downwardly therefrom in Figure 4 and in which the upper portion of the selector shaft 274 has vertical sliding and rotational movement. This boss 420 rotatably engages the upper surface of the safety disk 366. The selector disk 321 also has a control knob 422 projecting upwardly therefrom which is adapted to be grasped by the hand of an operator for rotating the disk 321 in determining a selection to be played as will be later described.

The boss 420 of the disk 321 has an insulation member 423 molded integral therewith (Figures 4 and 5), the periphery of which has spaced conductor bands 424 and 425 molded integral therewith. The conductor bands 424 and 425 are engaged by brushes 426 and 427, respectively, Figures 5 and 6, projecting from conductible leaf spring members 430 and 431, respectively. The lower portions of these leaf spring members 430 and 431 are clamped between insulation members 432 and 433, respectively, which are secured to the upper surface of the safety disk 366 as by screws 435. The screws 435 also serve to clampingly secure the ends of electric wires 436 and 437, respectively, between the insulation disks and the lower portions of the leaf spring members 430 and 431, thus permitting a circuit to be established between the brushes 427 and the electric wires 436 and 437.

The safety disk 366 has a slot 440 therein and the thickened portion 362 of the disk 322 has a coinciding bore 441 therein and the electric wires 436 and 437 pass through the slot 440 and the bore 441 and then extend outwardly and form a part of the electrical circuit to be later described. It will be noted that the slot 440 in the plate 366 is elongated to permit the safety disk 366 to be oscillated about its axis in the manner previously described.

A selector plunger 445 is mounted for vertical sliding movement in and penetrates the selector disk 321. This selector plunger 445 is disposed a distance from the center of the disk 321 equal to the radius of the circle defined by the centers of the selector pins 353. The plunger 445 has a spherical knob 446 at its upper end which is engaged by a compression spring 447 which surrounds the plunger 445 and engages the upper surface of the disk 321 to thus normally urge the plunger 445 upwardly.

The selector plunger 445 is penetrated by a cotter pin 450 which normally bears against the lower surface of the selector disk 321. An arm 451 (Figures 4, 5 and 6) is slidably penetrated by the plunger 445 and is urged against the cotter pin 450 by a compression spring 453, the lower surface of which engages a washer 454 which bears against a pointed pilot 455. The arm 451 extends to the left in Figure 6 and is loosely mounted on a pin 452 projecting from the lower surface of the selector disk 321.

The pilot 455 has a bore 456 therein of substantially larger diameter than the outside diameter of the lower end of the plunger 445 on which the pilot 455 is universally mounted, and the pilot 455 is secured to the lower end of the plunger 445 by a cotter pin 457 which loosely penetrates the lower end of the plunger 445. It will be noted that, due to the manner in which the pilot 455 is mounted on the lower end of the plunger 445, the pilot 455 may swivel about the lower end of the plunger 445, the compression spring 453 normally holding the pilot 455 in alinement with the plunger 445, the purpose of which will be later described.

The plunger 445 is adapted to be moved downwardly by an operator and as this plunger is moved downwardly, the free end of the arm 451 will also move downwardly and will engage, intermediate its ends, a plunger of a switch 460. This switch 460 is secured, as by screws 461, to an angle clip 462 secured, as by screws 463, to the bottom of the selector disk 321 in Figure 6. The switch 460 has electric wires 464 and 465 extending therefrom the other ends of which are connected to the conductor bands 424 and 425, respectively (Figure 30). The purpose of the switch 460 is to automatically release a coin from certain restricting members in the coin receiving mechanism, to be later described, whenever the plunger 445 is moved downwardly.

A graduated annular plate 470 (Figures 2, 4 and 6) surrounds and extends over the selector disk 321 and is secured in spaced relation to the disk 322 by bolts 471. It will be noted in Figure 2, that this graduated annular plate 470 is provided with a number of graduations equal to the number of selections that there are recorded on the phonograph records mounted in the magazines 119 to 143 inclusive, which in this instance is forty graduations. An indicating pointer 472 may be stamped, marked, engraved, or applied to the upper surface of the disk 321, in any suitable manner, adjacent the selector plunger 445 so that an operator may aline this indicating pointer 472 with the desired graduation in the graduated annular plate 470 before depressing the plunger 445 in selecting a desired record.

The upper portion of the continuous wall 11 of the cabinet 10 has an opening 473 therein which is of a slightly larger diameter than the diameter of the graduated annular plate 470 and it will be noted in Figure 4 that this graduated annular plate 470 is disposed flush with the top surface of the continuous wall 11 and within the opening 473.

It has already been stated how the magazine selector shaft 274 is connected to the vertically disposed shaft 264 by means of the tubular shaft 273 and that the shaft 264 has the cog wheel 256 thereon for determining which side of a record is to be presented for engagement by the tone arm. Now, there is disposed above the cog wheel 256 in Figure 11 a magazine selecting cam wheel 476 which is secured to the spindle 264 as by a set screw 477 and disposed above the cam wheel 476 in Figure 11 is a record selecting cam wheel 480 which determines the elevation at which the tone arm, to be later described, is arrested in its upward vertical movement for engaging a selected record. The record selecting cam 480 is also secured, as by a set screw 481, to the spindle 264.

Mounted on the vertically disposed spindle 264 and disposed below the cog wheel 256 in Figures 11 and 13 is a collar 482 secured thereon as by a set screw 483, the purpose of this collar 482 being to impart rotation to the spindle 264 and associated parts through the medium of a compression spring 485, the upper end of which engages the lower surface of the collar 482 and the lower end of which engages a disk 486 rotatably mounted on the spindle 264 and being integral with a pinion 487 also rotatably mounted on the shaft 264. A collar 490 is also fixedly mounted on the spindle 264, as by a set screw 491 and this collar 490 also serves to assist in imparting rotation to the spindle 264 through the pressure of the compression spring 485 urging the pinion 487 against the collar 490 and this collar 490 also serves as a support bearing for the lower end of the spindle 264. The pinion 487 is engaged by a rack 492 secured, as by screws 493, to a bar 494 mounted for horizontal sliding movement in guide blocks 495 and 496 (Figures 11, 13 and 20) suitably secured to the base plate 35.

The left-hand end of the bar 494 in Figure 11 is slidably engaged by the lower end of a bar 500 having a slot 501 therein which is slidably penetrated by a pin 502 projecting from the bar 494 to thus permit relative movement between the bar 500 and the bar 494. The bar 500 extends upwardly and has an upwardly and outwardly extending portion 503 integral therewith which is pivotally connected as at 504 to the upper end of a standard 505, the lower end of which is suitably secured to the base plate 35. A face cam wheel 506 is fixedly mounted on the cam shaft 40 adjacent the juncture of the arm 500 and the upwardly and outwardly projecting portion 503 and has an irregular groove 507 in one side thereof. This groove 507 is adapted to be engaged by a cam follower 510, projecting from the arm 500 at its juncture with the portion 503. It is thus seen that as the cam wheel 506 rotates in a counterclockwise direction in Figure 11, the arm 500 will be caused to move in a clockwise direction which will, in turn cause the arm 494 to move from right to left in Figure 11, thereby imparting rotation to the spindle 264 in a clockwise direction in Figure 12. This will also impart rotation to the cam wheels 256, 476 and 480 in the event that rotation of these cams and the spindle 264 is not restricted, by means to be later described, and in which instance, the pinion 487 would merely rotate about the shaft 264 and the compression spring 485 in Figure 13 would not have sufficient pressure to overcome the restricting elements associated with the cam wheels 256, 476 and 480 which will be later described.

Referring to Figures 11 and 16, it may be observed that when the arm 494 is in the position shown in Figure 11, or in the solid line position shown in Figure 16, a pin 511 projecting from the bar 494 engages a lever 512 to hold a switch 513 in closed position. On the other hand, when the arm 495 is moved to the left-hand end of its limit of travel in Figure 11, the lever arm 512 will assume the position shown in Figure 16 against the pin 511, which will cause the switch 513 to be opened. The switch 513 is secured, as by screws 515, to the base plate 35 and has electric wires 516 and 517 extending therefrom which are connected to the electrical circuit to be later described.

Attention is called to the fact that when rotation is imparted to the spindle 264, in the manner previously described, rotation will also be imparted to the rotor 296 (Figure 4). In the event that one of the selector pins 353 has been moved downwardly by the plunger 445, the lower end of the pin 353 will be in the path of the lip 305 at the free end of the rotor 296 and will thus be engaged by the rotor 296 and will prevent further rotation of the spindle 264 for the remainder of its revolution in this same direction.

In a cycle of the operation of this selector mechanism 280, after the lip portion 305 of the rotor 296 has engaged the lower end of any one of the pins 353, there will be a short pause in movement of the rotor and then the associated pin 353 will have to be moved upwardly to its cancelled position, that is; with the upper end of the pin 353 flush with the upper surface of the disk 322 in Figure 4. The lip portion 305 and the flat portion 304 of the rotor 296 are moved upwardly by means of the tubular shaft 273 (which is connected to the lower end of the selector shaft 274) being moved downwardly by means to be presently described.

This downward movement of the selector shaft 274 will cause the block 293 in Figure 4 to move downwardly towards the upper end of the bushing 281 and will thus cause the rotor 296 to move about its pivot point 295, thus causing the flattened portion 304 to move upwardly, which will, in turn, move the associated selector pin 353 to its cancelled position with the upper end of the same flush with the upper surface of the disk 322.

Referring to Figures 11 and 20, it may be observed that the lower portion of the shaft 273 has collars 520 and 521 integral therewith between which the free end of a forked lever 522 extends and the other end of the forked lever 522 is pivotally connected as at 523 a substantial distance downwardly from the upper end of the standard 505, heretofore described. Integral with the cam wheel 506 is a cam wheel 525 (Figure 20) having an irregular groove 526 in one side thereof which is adapted to receive a cam follower 527 projecting from an intermediate portion of the forked lever 522. It is thus seen, by referring to Figure 20, that the shaft 274 is held in a raised position by the forked lever 522 engaging the collar 520 on the shaft 273 during the greater part of the revolution of the cam wheel 525 and, as the cam wheel 525 rotates in such a manner as to cause the cam follower 527 to move into the low point of the cam 525, the shafts 273 and 274 will be caused to move downwardly very suddenly and will again be moved upwardly very suddenly, thus causing the free end of the rotor 296 to move upwardly, in the manner heretofore described, to move the associated selector pin 353 upwardly to where the upper end of the same is flush with the upper surface of the disk 322.

In order that a clear understanding may be had of the means of positioning the magazines 110 to 113, inclusive, adjacent the tone arm, to be later described, the operation of the means for transmitting rotation to the magazine carriage 55 will now be given.

It has already been stated how rotation is transmitted to the cam shaft 40 in a clockwise direction in Figures 17 and 24. During the time that the tone arm, to be later described, is in engagement with and playing any one of the records 200 in a selected magazine, the parts for transmitting rotation to the magazine carriage will be in substantially the position shown in Figure 17, and during this time the cam shaft 40 will be stationary as well as the magazine carriage 55. After the tone arm, to be later described, has played the entire surface of the associated phonograph record, it will be automatically moved out of the path of travel of the record and prior to its being moved out of the path of travel of the record rotation will be imparted to the cam shaft 40, by means to be later described.

Upon rotation being transmitted to the cam shaft 40, the cam wheel 64 will move in a clockwise direction in Figure 17 thus causing the cam follower 71 to follow the irregularly shaped groove 70 in the face of the cam wheel 64 and it will be noted that as the cam wheel 64 moves to where the cam follower 71 will be required to move, very suddenly, from the low to the high point of the groove 70 in the cam wheel 64, the tension spring 92 will urge the parallel bar 83 upwardly and will cause the cam follower 71 in the parallel bar 72 to also be moved upwardly. This will cause rotation to be transmitted to the tubular shaft 60 in a counterclockwise direction in Figure 17 and, in this instance, the spring loaded clutch member 54 will be caused to rotate in such a manner that its upper portion will move away from the observer in Figure 3. Now, due to the manner in which the teeth are cut on the proximate surfaces of the clutch members 53 and 54, the clutch member 54 will merely rotate against but out of engagement with the clutch member 53 while the magazine carriage as well as its associated clutch member 53 will remain stationary due to its weight bearing against the upper surface of the shaft 40.

As the cable 86 reaches the limit of its upward movement, that is; the cam follower 71 has moved to the high point of the groove 70 in the cam wheel 64, it will remain in this position for a predetermined length of time and will then again be moved towards the low point of the groove 70 in the cam wheel 64, and in so doing, will cause the arms 72 and 73 to move downwardly at their right-hand ends in Figure 17 which will, in turn, cause the cable 86 to be pulled downwardly by the spring 90 connected to the arm 91 which will transmit rotation to the tubular shaft 60 in a clockwise direction in Figure 17. The clutch member 54 in Figures 2 and 3 will then be rotated in such a manner as to transmit rotation to the clutch member 53 on the tubular shaft 52, which is an integral part of the magazine carriage 55 and will thus transmit rotation to the same.

It having been stated how rotation is transmitted to the magazine carriage 55 on the cam shaft 40, the magazine selecting cam 476 is provided, at the lower portion of the spindle 264, to determine which of the magazines 110 to 113, inclusive, shall be positioned for engagement by the tone arm to be later described. The magazine selecting cam 476 is provided with stepped arcuate surfaces 529 to 532 inclusive, each of which is of a different radius in relation to the center of the magazine selecting cam 476 and these surfaces, when properly positioned by the selecting means, heretofore described, will be engagd by a finger 533, projecting from and welded to a bar 534 (Figure 12).

Referring to Figures 10, 11, 12 and 21 it may be observed that the bar 534 is bent downwardly forming a vertical portion 535, the lower end of which is fixedly secured, as by a bolt 536, to a link 537 (Figure 21). The link 537 is pivotally connected as at 538 to the lower end of a link 541, the upper end of which is oscillatably mounted as at 542 on the bracket 236 (Figures 10 and 21). The link 541 has an angle clip 545 welded thereto, which is adapted to be engaged by the free end of a bell crank arm 546 oscillatably connected, as at 547, to the upper end of a standard 550 suitably secured to the base plate 35.

The bell crank also has an arm 551 having a cam follower 552 rotatably mounted on the lower end thereof, in Figures 10 and 21. This cam follower 552 is adapted to engage the periphery of a cam wheel 553. The cam wheel 553 is fixedly mounted on the cam shaft 40 and has a lobe 554 integral therewith.

It is thus seen that upon rotation of the cam wheel 553, when the lobe 554 engages the cam follower 552, the arm 546 of the bell crank in Figure 21 will be caused to move in a counterclockwise direction, thereby causing the link 541 to move in a clockwise direction at its lower end. This, in turn, will cause the finger 533 integral with the bar 534 (Figure 12) to move out of the path of travel of the magazine selector cam 476.

Now, when the raised portion 554 of the cam wheel 553 moves out of engagement with the cam follower 552, a tension spring 556 connected to the lower end of the link 541 at one end and being connected to the standard 550 at its other end, will urge the finger 533 integral with the bar 534 into engagement with any one of the surfaces 529 to 532 of the magazine selector cam 476, depending upon which of the surfaces is presented in alinement with the finger 533. Obviously, the cam follower 552 would not be urged against the main portion of the cam wheel 553 by the tension spring 556 in the event that the finger 533 engaged the arcuate surfaces 530, 531 or 532 inasmuch as the finger 533 would prevent the link 541 from moving in a counterclockwise direction in Figure 21 far enough to move the cam follower 552 into engagement with the low point of the cam wheel 553.

Referring to Figure 2, it may be observed that the bar 534 extends upwardly from beneath the mechanical selector unit 289 and is bent spirally away from the observer in Figure 2 and has a right angular bar 560 integral therewith which is pivotally secured adjacent its left-hand end in Figure 2 as at 561 to the base 35. The right-hand end of the right-angular bar 560 is pivotally connected to a rearwardly extending bar 562. Referring to Figure 26, it may be observed that the bar 562 is slidably mounted in guide blocks 565, secured to the base plate 35 as by screws 566, and has an upwardly projecting portion 567 (Figures 24 and 26), a laterally extending portion 568 and an outwardly projecting portion 569 having an upwardly bent finger 563 at its right-hand end in Figure 24.

The free end of the finger 563 is adapted to engage any one of four pins 564 projecting from the magazines 110 to 113 inclusive, there being one of these pins 564 in each of the arms 96, 97, 100 and 101. The pins 564 in the arms 96, 97, 100 and 101 are spaced apart from each other in a plane parallel to the axis of the magazine carriage 55 and it is thus seen that due to the different radii of the arcuate surfaces 529 to 532, inclusive, the movement of the bar 534 will be such as to cause the right-angular bar 560 to transmit motion to the bar 562 and its associated ear 563 in such a manner that the ear 563 will be positioned at various points along the path of travel of the arms 96, 97, 100 and 101 of the magazine carriage 55 and, after any one of the pins 564 engages the ear 563, rotation of the magazine carriage will be restricted, thus positioning a selected magazine adjacent the tone arm to be later described.

Obviously, upon one of the pins 564 engaging the ear 563, the tubular shaft 60 (Figure 17) will stop its rotation simultaneously, thus preventing the cable 86 from being pulled downwardly in Figure 17. However, the tension spring 90 (Figure 17) would permit the cam follower 71 to continue its cycle of operation although the magazine carriage 55 would be restricted from completing a revolution.

*Tone arm*

Referring to Figures 2, 3, 28 and 29, there may be observed a tone arm broadly designated at 570 and which comprises a bar 571 which is bent upwardly at its left-hand end in Figure 28 and has a reversely bent portion 571a having a slot 572a therein which is loosely penetrated by a pin 572, the lower end of which has a restricted threaded portion 573 integral therewith which penetrates a bar 574.

The bar 574 has a downwardly projecting leg 575 integral therewith (Figure 14A) which is secured to a plate 576 having an angularly disposed bent portion 577 integral therewith which is adapted to engage a stepped tone arm control plate, to be later described. This plate 576 is held in spaced relation to the vertical leg 575 of the bar 574 by spacers 580 surrounding bolts 581 which secure the plate 576 to the leg 575.

The free end of the bar 571 of the tone arm 570 (Figures 28 and 29) has a suitable crystal or tone transmitter 582 secured thereto, as by screws 583 (Figure 28). This crystal 582 has a conventional playing needle 584 projecting upwardly therefrom in Figure 28. The crystal 582 has electric wires 585 and 586 which extend through a cable 587 (a part of which is suitably secured to the arm 571) to the amplifier 25 (Figure 30). The bar 571 of the tone arm 570 also has secured to the free end thereof and to its upper surface in Figure 29, as by a screw 590, a leaf spring contact bar 591 and a rigid contact bar 592 which are insulated from each other by an insulation member 593 (Figure 29) and the rigid bar 592 is insulated from the bar 571 by an insulation member 594, the screw 590 being insulated from the leaf spring member 591 and the rigid member 592 by an insulation member 595. An insulation block 598 is suitably connected to the free end of leaf spring member 591.

The contact bars 591 and 592 have suitable contact points 596 and 597, respectively, projecting from the proximate surfaces thereof and which are adapted to intermittently engage each other, as will be later described. The contact bars 591 and 592 also have the electric wire 46 and an electric wire 601 connected thereto, respectively, extending therefrom and through the cable 587 (Figure 29) to other parts of the electrical system to be later described.

The reversely bent portion 571a is provided with the slot 572a, as has been previously described, so as to allow the free end of the bar 571 of the tone arm 570 to resiliently engage the lower surface of the selected tablet-type record 200 thereby permitting the use of warped records. A tension spring 602 is connected at its left-hand end in Figure 28 to the upper end of the pin 572, the lower end being connected to a suitable spring perch 603 projecting from a vertically disposed plate 604 welded to and projecting upwardly from the bar 571 in Figure 28. This vertically disposed plate 604 also has hingedly secured thereto, as at 605, a bar 607 having short and long bristles 610 and 611, respectively embedded therein and projecting downwardly therefrom. The bar 607 normally rests on the upper end of an adjustment screw 608, the lower end of which threadably penetrates the bar 571 of the tone arm 570 and is locked in adjusted position by a lock nut 609.

The purpose of the long bristles 611 is to wipe dust from the upper surface of the record 200 as it is being played and the purpose of the short bristles 610, which incidentally, are of a substantially stiffer material than the bristles 611, is to serve as a stop engaging the peripheral edge of the selected record 200 as the arm 570 is moved at its free end in such a manner as to place the needle 484 in a position in alinement with the edge of the record and until such time as the needle 584 is moved upwardly and into engagement with the lower surface of the record 200, by means to be later described, at which time the bristles 610 will be moved upwardly in Figure 28 and out of engagement with the peripheral edge of the record 200 and will thus permit the needle 584 to follow the conventional spiral grooves in the record 200.

As the tone arm 570 is moved in a vertical plane beside the records 200 in the selected magazine, by means to be later described, the tone arm 570 is in the lower dotted line position in Figure 29. In order to move the tone arm 570 to substantially the solid line position shown in Figure 29, or to a position where the stiff bristles will engage the peripheral edge of the selected phonograph record 200, the bar 571 of the tone arm 570 has a bar 613 fixedly secured thereto as by a screw 614 (Figures 28 and 29). The bar 613 also has an outwardly diverging portion 615 integral therewith to which is pivotally connected, as at 616, a finger 617. This finger 617 is normally urged against a stop 620 projecting from the proximate edge of the bar 613, by a torsion spring 621 surrounding the pivot bolt 616 and bearing against the projection 615 and the finger 617. The bar 613 and the finger 617 extend outwardly from the screw 614 in diverging relation to each other and straddle a vertically disposed actuating rod 625, the upper and lower ends of which are bent inwardly and are then looped at their free ends as at 626 and 628 around a vertically disposed rod 627 (Figures 3, 23 and 29). The vertically disposed rod 627 has its lower end threadably embedded in the plate 35, and slidably penetrates the loops 626 and 628 of the actuating rod 625.

Upward vertical movement is imparted to the tone arm 570 by means of a cable 630, one end of which is secured to the plate 576 (Figure 14). This cable 630 extends upwardly from the plate 576 and passes over a suitable roller 631 (Figure 14A) rotatably mounted on a bolt 632 secured to and projecting from the upper end of a standard 633, the lower end of which extends toward the observer in Figure 14 and has an upwardly projecting portion or leg 635 integral therewith. The forwardly lower portion of the standard 633 is suitably secured to the plate 35. The purpose of the upwardly extending portion 635 of the standard 633 will be later described.

The cable 630 extends downwardly, in Figure 14, from the roller 631 and passes beneath a roller 637 rotatable on a bolt 640 secured to a vertically disposed plate 641, the lower end of which is suitably secured to the plate 35. The cable 630 then extends upwardly from the roller 637 and passes over a roller 642 (Figures 2 and 14) rotatable on a bolt 643 secured to the free end of a lever arm 644.

The cable 630 extends downwardly from the roller 642 and passes beneath a roller 645, identical to the roller 637, and is rotatable on a bolt 646 secured to and projecting from the vertically disposed plate 641. The cable 630 then extends upwardly and is secured as by a bolt 647 to the lever arm 644, a substantial distance away from its right-hand end in Figure 14. The lever arm 644 is oscillatably connected, as at 650, to a standard 651, the lower end of which is secured to the base 35 and the left-hand end of the lever arm 644 is urged downwardly by a tension spring 652, the upper end of which is connected to the lever arm 644 and the lower end of which is connected to the lower portion of the standard 651.

It will be noted that the cam shaft 40 extends across and above the lever arm 644 and has a cam wheel 655 fixedly mounted thereon. The periphery of the cam wheel 655 is adapted to be engaged by a cam follower 657 (Figure 14). The cam follower 657 is integral with an upwardly projecting portion 660 of the lever arm 644. It is thus seen that the lever arm 644 will move downwardly at its right-hand end in Figure 14 as the cam wheel 655 is caused to rotate in a clockwise direction and this will release the cable 630, thereby permitting the plate 576 and the associated tone arm 570 to move downwardly by gravity. Now, as the cam wheel 655 rotates in such a manner that the cam follower 657 is brought from its engagement with the high point to the low point of the cam wheel 655, the right-hand end of the lever arm 644 will be moved upwardly by the tension spring 652 which will, in turn, cause the cable 630 to be taken up by the bolt 647 and the roller 643 and will thereby raise the bracket 577 and its associated tone arm 570.

In order that the plate 576 and the associated tone arm 570 may maintain the substantially same attitude throughout its range of vertical movement, parallel arms 661 and 662 are provided (Figure 14) the left hand ends of which are pivotally mounted on the bolts 581 which secure the bar 574 to the plate 576 and the other ends of which are pivotally connected as at 663 and 664 to a bracket 665 suitably mounted at its lower end on the base plate 35 (Figures 2 and 14).

It will be noted that the actuating rod 625 is curved from its upper to its lower end in Figure 3 and this curve in the actuating rod 625 conforms to the arcuate path that the plate 576 is forced to travel by virtue of the parallel bars 661 and 662.

Referring to Figures 1, 2, 3 and 14 it may be observed that the bracket 665 has outwardly projecting ears 670 and 671 in which a vertically disposed rod 672 is oscillatably mounted. This bar 672 has laterally bent portions 673 and 674 on the ends of which lock nuts 675 and 676 are threadably mounted and between which a vertically disposed tone arm control plate 677 is mounted.

The tone arm control plate 677 is provided with a series of inverse steps 680 cut in its edge adjacent the plate 576 any one of which may be independently engaged by the upper edge of the angularly bent portion 577 of the plate 576, as it moves upwardly in the manner heretofore described, by moving the plate 677 toward or away from the magazine carriage 55 by means to be presently described. The number of steps 680 correspond to the number of records in a magazine.

It may be observed in Figures 3 and 14 that the vertically disposed rod 672, associated with the plate 677, has a pair of spaced collars 681 integral therewith and between which the end of a forked inturned portion 682 of a lever 683 extends. The lever arm 683 is oscillatably mounted intermediate its ends as at 684 (Figure 14) in the upwardly extending leg 635 of the standard 633. The left-hand end of the lever arm 683 in Figure 14 is pivotally connected to the lower end of a link 685 the upper end of which is pivotally connected to another link 686 which extends to the left and is pivotally connected at its left-hand end to the upper end of the standard 687, the lower end of which is suitably secured to the base plate 35.

The cam shaft 40 extends over the link 686 and has a cam wheel 690 fixedly mounted thereon having a lobe 691 integral therewith.

The upper end of a tension spring 692 is connected to the right-hand portion of the lever arms 683 (Figure 14) and the lower end of the tension spring 692 is connected to a spring perch 693 projecting from the base plate 35. This tension spring 692 is provided to normally urge the link 686 into engagement with the cam wheel 690.

Now, when the tone arm control plate 677 has been moved to the selected position, by means to be later described, and the angularly disposed portion 577 of the plate 576 has moved upwardly, with the tone arm 570, in such a manner as to engage one of the steps 680 in the plate 677, the lobe 691 of the cam wheel 690 will engage the link 686 thus causing the left-hand end of the lever arm 683, integral with the forked member 682, to move downwardly and thereby moving the right-hand end of the same in Figure 14 upwardly which will, in turn, cause the tone arm control plate 677 to move upwardly and will thereby move the needle 584 of the tone arm 570 into engagement with the lower surface of the selected record.

The vertically disposed tone arm selector plate 677 is moved inwardly and outwardly with respect to the tone arm 570 by means of a forked strap iron member 695 (Figures 2, 3 and 14) which engages the laterally bent portion 674 of the vertically disposed rod 672. This strap iron member 695 extends downwardly and then has a transversely disposed portion 697 which is oscillatably secured, adjacent its left-hand end in Figures 2 and 14, to the base plate 35 on pivot point 696. The portion 697 then extends beyond its pivot point 696 and has an upwardly bent portion 700 at its left-hand end in Figure 14 which is bent at right angles at its upper end thus forming a horizontally disposed portion 701 (Figures 10 and 14). This portion 701, in Figure 12, has a finger 702 welded thereto and projecting inwardly therefrom, there being spring means, to be later described, which normally urge the finger 702 against the periphery of the record selecting cam 480.

It will be noted in Figure 12 that the record selecting cam 480 is provided with four identical groups of notches in its periphery, there being a group corresponding to each of the magazines 110 to 113, inclusive, and each group consisting of stepped notches 703 to 707, inclusive, there being a number of notches in each of the groups equivalent to the number of phonograph records 200 disposed in each of the magazines 110 to 113 inclusive. The purpose of the variable depth of the notches 703 to 707, inclusive, in each of the groups in the periphery of the record selecting cam 480, is to restrict movement of the vertically disposed tone arm control plate 677, as the notches 703 to 707, inclusive, are selectively engaged by the finger 702, to thereby present the selected steps 680 for engagement by the upper edge of the angularly disposed portion 577 of the plate 576 to thus position the tone arm 570 adjacent the selected record.

Referring to Figures 10 and 22 it may be observed that the horizontally disposed portion 701 of the forked strap iron member 695 extends past the record selecting cam 480 and has an upwardly bent ear 710 integral therewith which is fixedly connected as at 711 to one end of a horizontally disposed link 712 the other end of which is oscillatably connected as at 713 to the lower end of a link 714 the upper end of which is oscillatably connected as at 715 to the vertical leg 235 of the bracket 236. The lower end of the link 714 is connected to one end of a tension spring 716 (Figure 22) the other end of which is connected intermediate the ends of a standard 717 the lower end of which is suitably secured to the base plate 35. The tension spring 716 is provided to urge the finger 702 into engagement with the periphery of the record selector cam 480 and also urges the lower end of the link 714 in a counterclockwise direction in Figure 22.

The link 714 has an angle clip 720 welded thereto adjacent and below its pivot point 715 and which is engaged by one end of an arm 721 of a bell crank 722. The bell crank 722 has a shorter arm 724. The bell crank 722 is oscillatably mounted, as at 723, on the upper end of the standard 717 in Figure 22. The shorter arm 724 has a cam follower 725 which is adapted to engage the periphery of a cam wheel 726. The cam wheel 726 has a raised lobe 727 integral therewith which, upon engaging the cam follower 725, will cause the bell crank 722 to move in a counterclockwise direction in Figure 22 thus moving the link 714 and interconnected parts in such a manner as to cause the finger 702 on the arm 701 to move out of engagement with the periphery of the record selector cam 480. This movement of the finger 702 out of engagement with the record selector cam 480 would necessarily take place during the rotation of the cam 480, in the manner previously described.

It has already been stated how the bar 571 of the tone arm 570 has the bar 613 thereon (Figure 29) on which the resilient finger 617 is mounted and which is engageable by the actuating rod 625. The means of transmitting motion to this actuating rod in such a manner as to move the free end of the bar 571 about its pivot point comprises a link member 730 (Figures 2 and 23) which is slotted (Figure 2) at its right hand end for reception of the lower portion of the actuating rod 625 and a suitable bolt 731 is provided to adjustably close the open end of the slot through which the actuating rod 625 extends after the parts have been assembled. The link 730 is oscillatably connected at its left-hand end in Figure 23 to the lower end of a lever arm 732 oscillatably mounted as at 733 on the upper end of a standard 734. A tension spring 735 is connected to the lower end of the lever arm 732 and its other end is connected to a spring perch 736 projecting from the base 35.

The purpose of the tension spring 735 is to normally urge the lever arm 732 in a clockwise direction in Figure 23 and, in so doing to urge a cam follower 740, mounted intermediate its ends, to engage a cam 741 mounted on shaft 40. The cam wheel 741 has a lobe 742 integral therewith. It is thus seen that when the cam follower 740 is engaged by the raised portion 742 of the cam wheel 741, the vertically disposed actuating rod 625 would be moved in a clockwise direction in Figures 2 and 29 and would thereby cause the tone arm 570 to move in a counterclockwise direction in Figure 29 thus moving the bar 571 of the tone arm into a position where the needle 584 in the crystal 582 would be poised immediately below the selected record 200 and adjacent its outer edge and in position for being moved upwardly by the parts shown in Figure 14 and heretofore described.

The electric motor 44 would then be stopped, in a manner to be later described, thus stopping rotation of shaft 40. After the record has been played and the tone arm 570 has moved to the upper dotted line position in Figure 29, the cam wheel 741 will be caused to resume rotation, by means to be later described, in such a manner as to cause the lobe 742 of cam wheel 741 to move out of engagement with the cam follower 740 and, in so doing, will permit the tension spring 735 to move the link 730 (Figure 23) in such a manner as to transmit partial counterclockwise rotation to the actuating rod 625 in Figures 2 and 29 and this actuating rod will engage the bar 613 thus swinging the tone arm 570 in a clockwise direction in Figure 29, to the lower dotted line position in Figure 29.

As the tone arm 570 is moved inwardly to where the needle 584 is positioned for being moved into engagement with the lower surface of a selected record, in the manner heretofore described, it is necessary that rotation be imparted to the phonograph records in the associated magazine. Referring to Figures 2 and 3 it may be observed that the lowermost record 200, in the magazine positioned adjacent the tone arm 570 is adapted to be engaged by a resilient roller 745 rotatably mounted on a fixed upstanding shaft 746 projecting from the housing of an electric spindle motor 747. The electric motor 747 has electric wires 750 and 751 extending therefrom and connected to a part of the electrical circuit to be later described. The electric motor 747 has a spindle 752 projecting from the same which engages the edge of the resilient roller 745 to thus impart rotation to the same when the circuit is closed to the electric motor 747. The spindle motor 747 has secured to the lower surface thereof in Figure 3, as by welding, the right-hand end of a lever arm 755 which extends to the left and is then bent downwardly at an angle and then laterally thus forming a horizontal portion 756 which is pivotally mounted intermediate its ends, as at 757 on a bracket 758. The bracket 758 is secured as by screws 761 to the base plate 35 (Figure 2).

The electric motor 747 is mounted for horizontal sliding movement on a strap iron member 762 which extends downwardly in Figure 3 and is suitably secured to the base plate 35 to thus lend rigidity to the electric motor 747. Pivotally connected, as by a bolt 763, to the left-hand end of portion 756 in Figure 3 is a link 764 the left-hand end of which is connected, as by a bolt 765 (Figure 19) to the lower end of a link 766. The link 766 is oscillatably mounted at its upper end as at 768 adjacent the upper end of a standard 771 the lower end of which is suitably secured to the base plate 35.

Referring to Figure 19, it may be observed that there is a cam follower 772 projecting from the link 766 intermediate its ends and this cam follower 772 is adapted to engage an irregular groove 776 cut in the side of a face cam 773 fixedly mounted on the cam shaft 40. It will be noted that the face cam wheel 773 has a recess 770 therein which communicates with the groove 776 in the cam wheel 773.

Referring to Figure 2, it may be observed that the bolt 763 at the juncture of the bar 756 and the link 764 has the left-hand end of a tension spring 774 connected to the same the other end of which is connected to a spring perch 775 projecting from the base 35.

The purpose of the recess 770 in the cam wheel 773 in Figure 19 is to permit the tension spring 774 at the right-hand end of the link 764 in Figure 2 to resiliently urge the lever arm 756 in a counterclockwise direction about its pivot point 757 in timed relation to the positioning of the magazines, thus urging the resilient roller 775 on the motor 747 into engagement with the lowermost record 200 in the magazine 113, or which ever magazine may be disposed adjacent the same. It might be stated that this recess 770 in the cam wheel 773 is preferably large enough to permit the use of variable size records in the magazines 110 to 113, inclusive.

Referring to Figure 2, there may be observed an electric switch 780, which is secured to the base 35, as by screws 781, adjacent the juncture of the link 764 and the bar 756. This switch 780 has a lever 782 projecting therefrom which is normally urged, by conventional spring means, not shown, disposed within the housing of the switch 780, in a counterclockwise direction and the free end of the same bears against the bolt 763 which pivotally secures the link 764 to the bar 756. Now, as the cam wheel 773 rotates to substantially the position shown in Figure 19 the tension spring 774 in Figure 2 urges the bar 764 from left to right in Figure 2, permitting the cam follower 772 to move into the recess 770 of cam wheel 773. The resilient roller 745 then moves into engagement with the periphery of the lowermost record 200 in the adjacent magazine and the bolt 763 will move the finger 782 of the switch 780 in a clockwise direction simultaneously (Figure 2) thereby closing the circuit to the spindle motor 747, the wire 751 from the spindle motor 747 being connected to the switch 780, and the switch 780 having another wire 783 extending to other parts of the electrical circuit, to be later described, thus completing a circuit to the spindle motor 747 simultaneously with the roller 745 being moved into engagement with the lowermost record 200 in the associated magazine.

The various cam wheels are so timed that as the needle 584 of the tone arm 570 engages a record 200, the cam shaft 40 ceases rotation and the cam wheel 773 is in the position shown in Figure 19 and remains in this position throughout the playing of the record, after which rotation is again imparted to the shaft 40 and, of course, to the cam wheel 773.

Obviously, upon rotation of the cam wheel 773 being resumed, the cam follower 772 moves in a clockwise direction in Figure 19 and the link 764 moves from right to left, in Figures 2 and 19, thus moving the roller 745 of the spindle motor 747 out of engagement with the lowermost record 200 in the associated magazine and also permitting the conventional spring means, not shown, associated with the switch 780 to move the finger 782 in a counterclockwise direction in Figure 2 and thereby opening the switch 780 and stopping rotation of the resilient roller 745.

Referring to Figures 2, 3, and 17 it may be observed that there is a cam wheel 784 fixedly mounted on the shaft 40 adjacent the angle plate 38. The purpose of this cam wheel 784 is to control the flow of electrical current to the cam shaft motor 44 in cooperation with the control lever 340 associated with the mechanical selector unit 280, and with the bar 494 (Figures 6 and 11, respectively). This cam wheel 784 has a notch 785 (Figure 17) cut in its periphery and is adapted to be engaged by a finger 786 extending from a switch 787. The switch 787 is secured, as by screws 790, to the angle plate 38. Conventional spring means, not shown, disposed within the switch 787 tend to urge the finger 786 in a clockwise direction in Figure 17 so the free end of the same will remain in engagement with the peripheral surface of the cam wheel 784.

When the cam wheel 784 rotates to where the free end of the finger 786 will move into the notch 785 the circuit controlled by the switch 787 is thus broken as will be later described in the description of the electrical circuit. The switch 787 has one end of the electric wire 516 connected thereto and also has another electric wire 791 extending therefrom to a part of the electrical circuit to be later described.

*Coin receiving mechanism*

Referring to Figures 1, 9, and 31 to 35, inclusive, there may be observed a coin receiving mechanism, broadly designated at 795, for completing a circuit to the solenoid coil 385 associated with the mechanical selector unit 280. This coin receiving mechanism 795 comprises side walls 796 and 797 secured, as by screws 800, to the upper surface of the wall 11, the upper portion of the wall 11 having a slot 801 therein which establishes communication between the coin receiving mechanism 795 and the interior of the casing 10.

The upper ends of the side walls 796 and 797 are joined by a plate 802 secured to the walls 796 and 797 as by screws 803. The plate 802 has spaced slots 804, 805 and 806 therein which are fixedly penetrated by the lower portions of coin receiving blocks 807, 808 and 809, respectively. The coin receiving blocks 807 to 809 inclusive, are hollow and have circular openings 812 to 814 inclusive, in one side thereof which are adapted to receive checks or coins and are usually sized for reception of a nickel, a dime and a quarter, respectively.

Before the plate 802 is secured to the side walls 796 and 797, a suitable transparent front 810, which may be of glass, plastic, or any other transparent material, is inserted in suitable grooves in the proximate surfaces of the side walls 796 and 797 and the plate 802 is then secured to the side walls 796 and 797 and also has a coinciding groove in the lower surface thereof to thus rigidly secure the front 810 between the side walls 796 and 797 and the plate 802. Secured to the rear edges of the side walls 796 and 797 and the plate 802, as by screws 816, is a rear wall 817 (Figure 32) thus forming an area within which the parts of the coin receiving mechanism 795 are disposed.

Slidably mounted between the vertical side walls 796 and 797 is a vertically disposed insulation plate 820 having reinforcing bars 821 and 822 secured to opposite sides thereof as by screws 823. This insulation plate 820 may be of wood, pressed board, plastic or any other non-conducting material. Upper and lower cross bars 824 and 825, respectively, are secured, as by screws 826, to the rear surface of the plate 820, the cross bar 824 being secured to the upper edge of the plate 820 and the cross bar 825 being spaced a substantial distance upwardly from the lower edge of the vertically disposed plate 820.

The vertically disposed plate 820 is swingably secured to the horizontally disposed plate 802 as by hinges 827 secured to the upper cross bar 824 as by screws 828 and secured to the horizontally disposed bar or plate 802 as by screws 829. Bearing against the upper and lower cross bars 824 and 825 is the upper and lower portion of a vertically disposed laterally movable conductor plate 832 which is normally held against the upper and lower cross bars 824 and 825 by a conical compression spring 833. The compression spring 833 surrounds a bolt 834 and lock nuts 835 adjustably engage the right-hand end of the compression spring 833 in Figures 32 and 33. The bolt 834 loosely penetrates the plate 832 and slidably penetrates the plate 820, the head of the bolt 834 being flush with the front surface of the plate 820 and a lock nut 836 is provided to secure the bolt 834 in the plate 820.

Referring to Figure 31 it may be observed that the vertically disposed insulation plate 820 has spaced vertically disposed contact bars 840 and 841 secured thereto as by screws 842. A transverse contact bar 843 is secured as by metallic screws 844, to the rear surface of the insulation plate 820 (Figure 35), the screws 844 slidably penetrating the plate 820 and being threadably imbedded in the lower ends of the contact bars 840 and 841 to thus form an electrical connection between the lower ends of the bars 840 and 841 and the transverse bar 843. The transverse bar 843 has an electric wire 387 connected to one end thereof as by a screw 846.

It may be observed in Figure 31 that there are vertically disposed guide bars 847, 848, 849 and 850 secured to the front surface of the vertically disposed insulation plate 820 as by screws 851. A transverse contact bar 855 is mounted against the rear surface of the insulation plate 820 and is secured, as by metallic screws 856, to the guide bar 849 and to the vertically disposed contact bar 841, the screws 856 slidably penetrating the insulation plate 820. The contact bar 855 thus completes an electrical connection between the bars 841 and 849. The bar 849 (Figure 31) has an angularly disposed bar 857 engaging the same and secured to the front surface of the insulation plate 820 as by screws 860.

Angularly disposed coin supporting bars 861 to 865 inclusive, are secured as by screws 866 to the front surface of the insulation plate 820, the right-hand ends of the bars 861, 863 and 865 being in engagement with the vertically disposed contact bar 841 and the left-hand ends of the bars 862 and 864 being in engagement with the vertically disposed contact bar 840. A vertically disposed guide bar 870 is secured as by screws 871 to the front surface of the vertically disposed insulation plate 820 and serves to guide the coins after they have rolled, by gravity, along the various coin supporting bars 861 to 865 inclusive, through the slot 801 in the upper portion of the continuous wall 11 and into a coin chute 873.

Contact pins 874 to 881 inclusive, slidably penetrate the insulation plate 820 and are spaced at various points along the path of travel of the coins from the coin receiving blocks 807 to 809 inclusive, and it will be later described how these contact points complete a circuit through the medium of the coins to various other parts of the apparatus and finally to the solenoid 385 of the mechanical selector unit 280. These contact pins 874 to 881 inclusive, each has an enlarged threaded portion 882 integral therewith which threadably penetrates the vertically disposed plate 832 and has a lock nut 883 threadably mounted thereon for adjusting the pins 874 to 881, inclusive, for engagement of the left-hand end of the same against the front 810.

It will be noted in Figures 32 and 34 that the vertically disposed contact bars 840 and 841 are substantially thicker than the bars disposed there-in-between in Figures 31 and these bars 840 and 841 are normally urged against the rear surface of the front 810 by a compression spring 887 mounted between the rear panel 817 and a transverse bar 888 secured to the lower cross bar 825, as by screws 890. The transverse bar 888 is bent outwardly intermediate its ends and a headed portion 891 of a bolt 892 is disposed between the lower cross bar 825 and the transverse bar 888. The bolt 892 slidably penetrates the transverse bar 888 and also slidably penetrates the rear panel 817 and has a knob 894 threadably mounted on its free end, the purpose of which will be later described.

It will be noted in Figure 34 that each of the coin supporting bars 857, and 861 to 865 inclusive is provided with a plurality of projections 895 on their rear surfaces to thereby provide a space between their mean rear surfaces and the front surface of the vertically disposed insulation plate 820 and which will prevent any dust or foreign matter from accumulating between the front 810 and the plate 820 as such dust or foreign matter will fall, by gravity, to the bottom of the coin receiving mechanism 795 and through the slot 801 into the coin chute 873.

Referring to Figure 35 there may be observed transverse bars 896 and 897 the opposite ends of which are secured, as by screws 898, to the rear edges of the reinforcing members 821 and 822. These bars 896 and 897 are threadably penetrated by adjustment screws 900 which project forwardly and each of which has a restricted portion 901 which slidably penetrates the vertically disposed contact plate 832. These restricted portions 901 serve as guide members for the vertically disposed conductor plate 832 as the same is moved outwardly with respect to the insulation plate 820 by means to be presently described and the threaded portions of the adjustment screws 900 serve as a stop to restrict outward movement of the plate 832.

Oscillatably mounted in suitable bearing blocks 902 is a shaft 903 having an inverted U-shaped portion 904 in the center thereof which is bent forwardly at its upper end and this U-shaped portion 904 bears against the left-hand or front surface of the plate 832 in Figure 32. The bearing blocks 902 are secured to the vertically disposed insulation plate 820 as by screws 905. The right-hand end of the shaft 903 in Figure 35 is bent rearwardly and has a flattened portion 907 integral therewith (Figures 32 and 33). This flattened portion 907 has a slot 910 therein which is slidably penetrated by a bolt 911 secured to and projecting from a solenoid plunger 912. The solenoid plunger 912 extends from a solenoid coil 913 the housing of which is secured by screws 914 to the reinforcing member 822. The electric wire 437 extending from the leaf spring contact member 431 (Figures 5 and 30) is connected at its other end to the solenoid coil 913 and the solenoid coil 913 also has an electric wire 915 extending therefrom to a transformer to be later described in connection with the electrical circuit.

For purposes of description the coins used with this coin selecting apparatus, and which may be a nickel, a dime, and/or a quarter will be indicated at N, D, and Q, respectively. Obviously, this mechanism 795 may be adapted to use any size or type of coin or check as desired and the coins disclosed are merely used by way of illustration. The knob 894 and its associated pin 892 are provided in the event a warped or bent coin, which is inserted in one or the other of the openings 812 to 814, inclusive, in the coin receiving blocks 807 to 809, inclusive, respectively, becomes wedged between the plate 820 and the window 810, the knob 894 may be grasped by an operator and moved from left to right in Figure 32 thus swinging the plates 820 and 832 and connected parts outwardly at the lower ends thereof and thereby permitting the coins to fall, by gravity, past the coin supporting bars 857 and 861 to 865, inclusive, and into the coin chute 873, since the slot 801 is as broad as the distance between the vertical bars 840 and 841 and the chute 873 is broadened at its top to cover the bottom of slot 801.

The coin chute 873 is secured, as by screws 916, to the lower surface of the upper portion of the elliptical shaped wall 11 and this coin chute 873 directs the coins which pass through the coin receiving mechanism 795 to a suitable coin box 917, which is slid through the rear wall 13 of the cabinet 10 and slidably engages the lower end of the coin chute 873. An electric wire 918 is connected as at 920 to the conductor plate 832 and is a part of the electrical circuit to be presently described.

*Electrical circuit*

Referring to Figure 30 many of the parts are shown schematically and there is shown the various electrical connections between the mechanical parts of this apparatus. The amplifier 25 has electric wires 921 and 922 extending therefrom to lead wires 923 and 924 respectively. The lead wires 923 and 924 extend from a male plug 925 adapted to be plugged into a suitable source of electrical energy not shown. The lead wires 923 and 924 are connected at their other ends to opposite sides of a primary coil 926 of a transformer generally designated at 927. The transformer 927 also has a secondary coil 930 to the opposite ends of which the electric wires 436 and 915 are connected. It will be noted that the wire 45 from the cam shaft motor 44 is connected to the lead wire 923 between the male plug 925 and the transformer 927 and the wire 601 from the tone arm 570 is connected to the lead wire 924 between the male plug 925 and the transformer 927.

The wire 783 from the switch 780 is connected at its other end intermediate the ends of the wire 601. The wire 46 from the other side of the electric motor 44 extends to and is connected to the leaf spring member 591 of the tone arm 570. The wire 750 from the spindle motor 747 is connected at its other end intermediate the ends of the wire 45. The wire 751 from the other side of the spindle motor 747 is connected at its other end to the switch 780. The wire 386 from the solenoid coil 385 is connected at its other end intermediate the ends of the wire 436 which extends from the secondary coil 930 of the transformer 927 to the leaf spring contact member 430. The wire 387 from the solenoid coil 385 extends to the transverse bar 843 as heretofore described.

It will be noted that the wires 332 and 333 from the switch 330 extend to the wires 516 and 791, respectively. The wire 791 extends from the switch 787 and is connected at its other end to the wire 783. The wire 516 extends from the switch 513 and is connected at its other end to the switch 787. The wire 517 at the other side of the switch 513, extends to and is connected intermediate the ends of the wire 46 which extends from the cam shaft motor 44 to the leaf spring member 591 of the tone arm 570.

The wire 437 connects solenoid coil 913 to the leaf spring arm 431. The wire 918 leads from wire 915 to plate 832 which has electrically integral therewith pins 871 to 881, inclusive, the diagram showing it connected to one of the pins 879. The wire 464 connects metallic band 424 with one side of switch 460, while wire 465 connects the other side of switch 460 to metallic band 425.

The loudspeaker wiring associated with the amplifier has heretofore been fully described.

*Brief synopsis of operation*

Briefly stated, a coin is inserted in the coin receiving mechanism 795 thus completing a circuit to the solenoid coil 385 to thus move the safety disk (Figure 5) associated with the mechanical selector unit 280 into position for making a selection. The indicator arrow 472 in Figure 2 is then alined with the desired selection indicated by the numerals on the graduated ring 470 and the plunger 445 is moved downwardly thus moving one of the selector pins 353 in Figure 4 downwardly to where it will be in the path of the rotor 296 to which rotation will be presently imparted as will be later described.

This completes a circuit to the cam shaft motor 44 which transmits rotation to the cam shaft 40 and the cam wheels mounted thereon thus effecting operation of the various mechanical parts of the apparatus in substantially the following order, it being understood that many of these operations will take place simultaneously:

First, the fingers 254, 533 and 702 will be moved out of engagement with the corresponding cam wheels 256, 476, and 480 in Figures 11 and 12 then rotation will be resiliently imparted to the spindle 264 and the associated mechanical selector shaft 274 simultaneously. This will impart rotation to the rotor 296 (Figures 4 and 8) thus causing the same to engage the lower portion of the lowered selector pin 353 (Figure 4) at which point it will cease rotation thus positioning the cam wheel 256, 476, and 480 for establishing a desired selection with respect to the magazine carriage 55, the magazines 110 to 113, inclusive, and the tone arm 570.

The fingers 254, 533, and 702 are then moved into engagement with the peripheries of the corresponding cam wheels 256, 476, and 480 and the notches in the cam wheels cause the fingers 254, 533 and 702 to stop in a selected position for positioning the parts instrumental in effecting the position of the selected magazines 110 to 113, inclusive, with a particular side of a record 200 positioned for engagement by the tone arm 570, the magazine carriage 55 on which the magazines 110 to 113, inclusive, are mounted, and the tone arm 570, respectively.

Rotation is then imparted to the magazine carriage 55 and it is caused to stop in a selected position after which oscillation is imparted to the thus positioned magazine, which in this instance is the magazine 113, to present a particular side of a record 200 to be presently engaged by the tone arm 570, at which time the magazine 113 is locked in this position and then the tone arm 570 is moved from its lowermost position to a selected position adjacent the selected record 200. The tone arm is then swung from the lower dotted line position in Figure 29 to substantially the solid line position shown in Figure 29, at which time it is caused to move upwardly to where the needle 584 will engage the lower surface of the record 200 as shown in Figure 28. Rotation is then transmitted to the records 200. The cam shaft motor 44 is then caused to cease rotation and again starts rotation automatically, after the record has been played and the tone arm 570 has moved to the upper dotted line position in Figure 29.

After the record 200 has been played in the manner described, the records cease rotation and the cam shaft 40 resumes rotation and, in so doing, causes the tone arm 570 to move downwardly out of engagement with the phonograph record 209, after which it moves from the upper dotted line position shown in Figure 29 to the lower dotted line position shown in Figure 29. The tone arm 570 then moves downwardly to its lowermost position and, simultaneously, the various parts heretofore described are caused to move to their original positions after which the source of current to the motor 44 is automatically broken thus stopping the motor 44 and the cam shaft 40 for a repeat operation.

Detailed method of operation

Assuming that a coin N has been inserted in the opening 812 of the coin receiving block 807 (Figure 3) the coin N will fall by gravity between the vertically disposed contact bar 849 and the guide bar 847. The coin will then fall against the coin supporting bar 862 and will roll along the same and will fall between the contact pin 877 and the bar 841 but will stop in engagement with the pin 878 and the bar 841 thus providing an electrical conductor between the bar 841 and the contact pin 878.

It might be stated, at this time, that in the event that a dime D was inserted in the opening 813 in the block 808, the dime would fall by gravity between the bars 848 and 849 and would come to rest against the pin 874 and the bar 849 thus providing a conductor therebetween. Now, after the pin 874 is moved rearwardly, by means to be later described, the coin D will move, by gravity, along the bar 857 and will come to rest between the pin 875 and the bar 857 thus providing a conductor therebetween in a manner identical to that in which the conductor was provided between the bar 849 and the pin 874. Upon the pin 875 being moved out of engagement with the coin D, as will be later described, the coin will then roll, by gravity, down the bars 862 to 865, inclusive, and the remaining pins 877 to 881, being spaced apart from the associated bars 840 and 841 sufficiently to permit the coin D to pass therebetween without engaging both the pins and the associated bars at the same time, the coin D will then fall, by gravity, between the lower portion of the bar 849 and the guide bar 870 and thus into the coin chute 873.

In the event that a coin Q, which may be the size of a quarter, is inserted in the opening 814 in the coin receiving block 809, the coin Q will fall, by gravity, between the bars 850 and the bar 841 and will then roll down the bar 851 and the contact pin 876 thus providing a conductor therebetween. After the pin 876 has been moved rearwardly, as will be later described, thus permitting the coin Q to fall by gravity, against the coin support bar 862, the coin will then roll off of the end of the bar 862 and will come to rest between the contact pin 877 and the contact bar 841 thus providing a conductor therebetween and this procedure will be repeated each time the coin is successively released, by the pins 877 to 880, inclusive, being withdrawn into the plate 820 it being understood that immediately upon the coins being successively released by the various pins 874 to 880, inclusive, the pins 874 to 881 will again be projected into the path of travel of the various coins depending upon their size. It is manifest that upon the coin Q being released by the pin 881, it will fall, by gravity, down the coin chute 873 and into the coin box 917.

It is thus seen that the coin N will permit the playing of one selection, the coin D will permit the playing of two selections, and the coin Q will permit the playing of five selections in the present showing of the cam receiving mechanism.

Now, referring again to the coin N, when the coin N has rolled down the supporting bar 862 and has come to rest between the pin 878 and the contact bar 841, electrical current will flow from the secondary coil 93 (Figure 30), through the electric wires 913 and 918 to the conductor plate 832 through which current will flow to each of the contact pins 874 to 881 inclusive, simultaneously, through their threaded portions 882. Electrical current will then flow from the pin 872, through the coin N through the contact bars 841 and 843 and through electric wire 387 to one side of the solenoid coil 385 (Figures 5 and 30). Current will then flow through the solenoid coil 385, through the electric wires 386 and 436 (Figure 30) and thus to the other side of the secondary coil 930 of the transformer 927. It being assumed that the male plug 925 has been plugged into a suitable source of electrical energy, not shown, the current will be carried to the primary coil 926 of the transformer 927 through the lead wires 923 and 924, thus energizing the secondary coil 930 and completing the electrical circuit to the solenoid coil 385.

Now, when the solenoid coil 385 is energized in the manner described, the solenoid plunger 384 will move from right to left in Figure 5 and the associated parts will assume the position shown in Figure 5, that is; with the bores 367 of the safety disk 366 in alinement with the selector pins 353. The knob 422 of the mechanical selector unit 280 (Figure 4) is then grasped by an operator and rotated thus causing the selector disk 322 to rotate, and the pointer 472 (Figure 2) is then positioned in alinement with the number of the selection that the operator desires to play. In this instance, we will assume that the pointer 472 (Figure 2) is alined with the numeral "1" on the graduated ring 470.

The operator then grasps the knob 446 on the upper end of the plunger 445 (Figure 4) and pushes the same downwardly thus causing the pointed pilot 455 to engage the upper end of the associated selector pin 353 in alinement therewith and to move the same downwardly to where the selector pin 353 will assume the position as shown in the left-hand portion of Figure 4.

Before any of the selector pins 353 are moved downwardly, the disk 352 is disposed in parallel relation to the disk 320. However, upon any one or more of the pins 353 being moved downwardly, in the manner heretofore described, the portion of the disk 352 that is engaged by the annular portion 354 of the particular pin 353 that has been moved downwardly, will also be moved downwardly and will thus cause the hooked portion 351 of the control lever 340 (Figure 6) to move downwardly and this will result in the free end of the control lever 340 moving upwardly thus causing the feeler finger 337 to move in a clockwise direction in Figure 6, or a counterclockwise direction in Figure 30, to thus close the switch 330.

It is to be assumed that the finger 786 of the switch 790 is in the notch 785 of the cam wheel 784, which is the relative position of these parts while the machine is at rest. The finger 512 of the switch 513 is disposed in the solid line position shown in Figure 16 at the time the machine is at rest, thus holding the switch 513 in closed position.

When the plunger 445 is pushed downwardly by an operator, for moving the selector pin 353 in alinement therewith, in the manner heretofore described, the cotter pin 450 in the plunger 445 (Figures 4, 5, 6 and 30) will cause the arm 451 to engage the plunger of the switch 460, depressing the same and thus closing the switch 460. This will cause electrical energy to flow through the wire 915 from the secondary coil 930 of the transformer 927 to one side of the solenoid coil 913 associated with the coin receiving mechanism 795 (Figures 30, 32, 33 and 35). Electrical current will flow through the solenoid coil 913, through the wire 437 (Figure 30), through the contact member 431 and the brush 427 to the contact ring 424.

Current will then flow through the contact ring 424, through the wire 464, the switch 460, the wire 465, the contact ring 425, the brush 426, the leaf spring contact member 430 and finally through the wire 436 to the other side of the secondary coil 930. This will complete a circuit to the solenoid coil 913 which will cause the solenoid plunger 912 to move downwardly in Figures 32 and 33, thus partially rotating the rod 903 and causing the U-shaped portion 904 to move in a clockwise direction in Figure 32. The upper portion of the U-shaped member 904 will then engage and cause the vertically disposed conductor plate 832 of the coin receiving mechanism 795 to move rearwardly, or from left to right in Figures 32 and 33, and will thus move the associated contact pins 874 to 881, inclusive, to where the left-hand ends of the same in Figures 32 and 33 will be flush or below flush with the front of the vertically disposed insulation plate 820.

This will, of course, release the coin N from between the pin 878 and the vertically disposed contact bar 841 after which the plunger 445 would be manually released to stop the flow of electrical energy to the solenoid coil 913 thus permitting the contact pins 874 to 881, inclusive, to be moved outwardly to their original position by the spring 833 bearing against plate 832. However, there still being no further pins in the path of the coin N, the coin will roll, successively, along the bars 863, 864 and 865, by gravity, and will fall between the guide bar 870 and the vertically disposed contact bar 840, through the coin chute 873 and finally into the coin box 917.

Although the selector plunger 445 may be held down by the operator, after the circuit has been completed to the coil 385 associated with the mechanical selector unit 280 as soon as the coin N is released by the pin 878, as heretofore stated, the electrical circuit to the solenoid coil 385 would be broken, thus permitting the tension spring 405 to pull the plunger 384 from left to right in Figure 5.

It has already been described how movement is imparted to the solenoid plunger from right to left in Figure 5 and how its movement from left to right and movement of associated parts is retarded by means of the piston 397 in the cylinder 400. This will cause the safety disk 366 to move in a counterclockwise direction in Figure 5, the right-hand portion of the safety disk 366 in Figure 4 moving away from the observer and thus moving the lower end of the pointed pilot 455 along with the same, due to the fact that the lower portion of the plunger 455 will be engaged by the edge of the associated bore 367 in disk 366, and this will cause the pointed pilot to swivel about the lower end of the plunger 445 and will thus move the same out of the bore in which the associated and selected selector pin 353 is disposed, it being assumed that the disk 320 remains stationary during this movement of the disk 366. However, in the event that the disk 321 will have partially rotated with the disk 366, the pointed pilot 455 would necessarily move out of the bore in which the selector pin 353 is disposed. It is thus seen that an operator could not possibly make a second selection without inserting an additional coin or without having inserted a coin which would successively engage more than one of the contact pins 874 to 881 inclusive, associated with the coin receiving mechanism 795.

After the switch 330, in the upper portion of Figure 30, has been closed in the manner heretofore described, an electrical circuit will be completed from the lead wire 924, through wires 601, 783, 791 and 333, through the switch 330, through wires 332 and 516, through the electric switch 513, through wires 517 and 48 to the cam shaft electric motor 44. The current would continue through the cam shaft motor 44 through the wire 45 to the other lead wire 923, thus completing an electrical circuit to the cam shaft motor 44. The electric motor 44 will then impart rotation to the cam shaft 40 through the worm 42 and the worm gear 41 (Figures 2 and 3) and since the finger 786 in Figure 17 will be disposed in the notch 785 of the cam wheel 784, upon rotation of the shaft 40, the cam wheel 784 will rotate in a clockwise direction in Figure 17 and will thus cause the lever 786 of the switch 787 to move in a counterclockwise direction and to thus close the switch 787.

Before the electric motor 44 is started in the manner heretofore described, that is, while the machine is at rest, the fingers 254, 533, and 702 of the arms 253, 534 and 701, respectively (Figures 11 and 12) will be in engagement with the peripheries of the cog wheel 256, the cam wheel 476 and the cam wheel 480, respectively, or in substantially the position shown in Figure 12. When the cam shaft 40 starts its rotation, the raised portions 251, 554 and 727 of the respective cam wheels 250, 553 and 726 (Figures 18, 21 and 22) are caused to move in the direction indicated by the arrows on these cam wheels and are moved into engagement with the respective cam followers 243, 552 and 725. This will transmit motion through the intervening connections to where the cam wheels 250, 553 and 726 will cause the fingers 254, 533 and 702, respectively (Figure 12), to move out of the path of travel of the cam wheels 256, 476 and 480, respectively, in Figure 12.

As the fingers 254, 533 and 702 are moved out of the path of travel of the corresponding cam wheels, rotation will have been imparted to the cam wheel 506 in Figure 11. Now, immediately upon following the movement of the fingers 254, 533 and 702 out of the path of travel of the corresponding cam wheels 256, 476 and 480, the cam wheel 506 will cause the bar 509 in Figure 11 to move in a clockwise direction, thus moving the bar 494 from right to left to impart rotation to the spindle 264 through the rack 492, the pinion 487, the compression spring 485 and the collar 482 (Figure 13).

This will cause the spindle 264 and the associated cam wheels 256, 476 and 480 to rotate in a clockwise direction in Figure 12 and the spindle 264 will impart rotation to the selector shaft 274 through the tubular shaft 273 to thus cause the selector shaft 274 to rotate in a clockwise direction in Figures 5 and 8. Inasmuch as the block 293 is secured to the selector shaft 274, in Figures 4 and 8, the shaft 274 will impart rotation to the block 293 and its associated roller 296 in a clockwise direction in Figure 8.

It will be noted in Figure 4 that the upper edge of the lip portion 305 of the rotor 296 will pass beneath the lower ends of all the selector pins 353 that are not moved downwardly in Figure 4 and, of any pins 353 that have been moved downwardly, the first of these pins that happens to be in the path of the lip 305 will be engaged by the same, which will immediately stop rotation of the selector shaft 274, the associated tubular shaft 273 and spindle shaft 264 and which will result in the cam wheels 256, 476 and 480 (Figures 11, 12 and 13) stopping in a selected position. The cam wheels 250, 553 and 726 (Figures 18, 21 and 22, respectively) will have continued their rotation, and in so doing, will have moved their associated raised portions 251, 554 and 727, respectively, out of engagement with the cam followers 243, 552 and 725, respectively, which will result in the fingers 254, 534 and 702, respectively, moving into engagement with the edges of the associated cam wheels 256, 476 and 480, respectively, after rotation of the same has been arrested.

In accordance with the numeral "1" on the graduated ring 470 in Figure 2, the pin 353, which will have been moved downwardly by the plunger 445 and its associated pilot 455, will have caused the rotor 296 to stop rotation with the cog wheel 256 and the cam wheels 476 and 480 in the position shown in Figure 12. This would indicate that finger 254 will move into engagement with the selected notch, which in this instance, is one of the deep notches 258 cut in the periphery of the cog wheel 256, for presenting a particular side of a record for engagement by the tone arm 570 in the manner to be later described, and the arcuate surface 529 would be engaged by the finger 533 for stopping rotation of the magazine carriage 55 at a predetermined point to thus present the selected magazine in a position adjacent the tone arm 570, as will be later described. The finger 702 will, in this instance, engage the surface 703 in one of the groups of stepped notches, of which there are four, in the cam wheel 480, which would position the vertically disposed tone arm control plate 677 in predetermined relation to the tone arm 570, in the manner to be later described, for restricting upward movement of the tone arm 570 to where the tone arm will be positioned for engagement of the selected record as will also be later described.

Briefly stated, the various cam wheels are so timed with respect to each other that the magazine carriage 55 will oscillate until one of the pins 564 is moved into engagement with the ear 563 (Figure 24) and then the magazine which is positioned adjacent the tone arm 570 will immediately start rotation, which, in this instance, is the magazine 113, and thus one or the other of its associated fingers 210 or 211 will be moved into engagement with the upwardly extending finger 220 of the horizontally disposed lever arm 221 (Figure 3), which in this instance would be the finger 211, the position of the finger 220 having been determined by the depth of notches 257 and 258 in cam wheel 256 as has been heretofore described. Immediately upon the magazine 113 being stopped by the portion 220 of the lever arm 221, the tone arm will then be caused to move upwardly, it normally being at rest in its lowered position, in which it had stopped when the last selection had been played, and will stop at the selected height with the angularly bent portion 577 of the plate 576 (Figures 3, 14 and 14A) engaging one of the steps 680 of the tone arm control plate 677.

Immediately following the movement of the fingers 254, 533 and 702 into engagement with the corresponding cam wheels as shown in Figure 12, the cam wheel 525 in Figure 20 will have rotated to where the cam follower 527 will move into the low point of the groove 526 on the cam wheel 525.

Now, when this cam follower 527 moves to the low point in the groove 526 of the cam wheel 525, this will cause the tubular shaft 273 to move downwardly, telescoping with respect to the spindle 264, and will resultantly cause the selector shaft 274 to move downwardly, thereby moving the block 293 in Figure 4 downwardly. This will result in the rotor sliding from left to right atop the bushing 281 and will cause the flattened portion 304 of the rotor 296 to move upwardly and would thereby move the associated selector pin 353 upwardly to where the annular groove 355 would be engaged by the coiled spring 360.

This would, in fact, cancel this selector pin 353 after which the cam wheel 525 (Figure 20), which will have continued its roation, would move in such a manner as to cause the cam follower 527 to again be moved upwardly to the high point of the groove 526 in the cam wheel 525 thus moving the shaft 274 upwardly and permitting the flattened portion 304 of the rotor 296 to move downwardly to the position shown in Figure 4.

It might be stated that when the lip portion 305 of the rotor 296 is moved into engagement with the lower portion of one of the selector pins 353, the selector shaft 274 continues to rotate a very slight amount beyond this point, thus causing the lip 305 (Figure 8) to be urged against the associated selector pin 353 by the tension spring 307 which is connected to the block 293 at one end and to the rotor 296 at the other end. Now, immediately upon the lip 305 again moving downwardly and out of engagement with the lower portion of the selector pin 353, as it will be upon cancelling the selector pin 353, in the manner heretofore stated, the tension spring 307 in Figure 8 will immediately cause the rotor 296 to swing at its right-hand end in Figure 8 (although rotation is not being imparted to the selector shaft 274 at this time) and the flattened portion as well as the lip 305 will come to rest between immediately adjacent selector pins 353.

The purpose of this flattened portion 304 coming to rest between two of the pins 353, is to prevent the next operator of the plunger 445 of the selector unit 280 from playing the same selection that had previously been played in the event that another of the selector pins 353 had been moved downwardly. Obviously, if the second operator of the selector plunger 445 moved the same selector pin 353 downwardly that had previously been moved downwardly, and on other selector pins had been moved downwardly, the rotor 296 would then rotate a complete revolution until the lip 305 engaged the lower portion of this same selector pin 353.

It has already been stated how the switches 339 and 513 in Figure 30 are in a closed position when rotation of the cam shaft motor 44 is first started. Now, in the event that only one of the selector pins 353 in Figure 4 has been moved downwardly, and upon this selector pin 353 being moved upwardly or cancelled in the manner heretofore described, this would automatically open the switch 330 inasmuch as the disk 352 in Figure 6 would cause the left-hand end of the control lever 340 to move downwardly thereby opening the switch 330.

By this time, the free end of the finger 786 (Figure 30) will have been engaged by the peripheral surface of the cam wheel 784, thereby closing the switch 790. The electrical current will then flow to the electric motor 44 from the lead wire 923, and through the wire 45 and will flow from the other side of the electric motor 44 through the wires 46 and 517 and the switch 513, which will still be in a closed position inasmuch as the rack 492 in Figure 11 will not have moved all the way to where the switch 513 will be opened but will have moved to the intermediate dotted line position shown in Figures 16 and 30. Then the electrical current will flow through the wire 516, through the switch 787, through the wires 791, 783 and 601 to the other lead wire 924.

Immediately following the engagement of the cam wheels 256, 476, and 473 by the fingers 254, 533 and 702, respectively, rotation will be imparted to the magazine carriage 55 and the selected magazine rack, successively, and then vertical movement will be imparted to the tone arm 570.

Rotation is imparted to the magazine carriage 55 by the cam wheel 64 as heretofore described. The cam wheel 64 rotates in a clockwise direction in Figure 17 and, in so doing, causes vertical movement to be transmitted to the free ends of the parallel arms 72 and 83.

When the machine is at rest, the cam follower 71 will be disposed in the low point of the groove 70 in the face of the cam wheel 64. Now, as soon as rotation is imparted to the cam shaft 40, in the manner heretofore described, the cam follower will be moved away from the center of the cam wheel 64 very rapidly by the tension spring 92 (Figure 17) thus permitting the free ends of the arms 72 and 83 to move upwardly. The tension spring 90 is held taut by the cable 86 when the cam follower 71 moves towards the high point of the cam wheel 64, the tension on the tension spring 90 is relieved and thus relieves the pressure on whichever pin 564 (Figure 24) on the arms 96, 97, 100 or 101 may have been in engagement with the ear 563, thus permitting the finger 533 in Figure 12 to be moved out of engagement with the cam wheel 476 by means heretofore described.

The finger 533 is, of course, connected to and controls the position of the ear 563 through the intervening connections comprising the bar 534, the right angular portion 560, which is pivoted at 561 in Figure 2, the bar 562 and portions 567, 568 and 569 (Figures 24 and 26). Now, as this finger 533 is moved outwardly, in the manner heretofore described, the ear 563 will also be moved downwardly in Figure 2 and will thus be out of the path of any of the pins 564 in the magazine carriage 55 during its rotation.

After the fingers 254, 533 and 702 (Figures 11 and 12) have been moved into engagement with the peripheries of the cam wheels 256, 476 and 480, respectively, the cam wheel 64 (Figure 17), which will have continued rotation, will then permit the cam follower 71 to move down the groove 70 towards the center of the cam wheel 64. This will cause the arms 72 and 83 to move downwardly in Figure 17 and the cable 86 will thus impart rotation to the tubular shaft 60 in a clockwise direction in Figure 17.

Now, assuming that the ear 563 (Figure 24) has been positioned by the cam wheel 476 (Figures 11 and 12) and the intervening connections in such a manner as to engage the pin 564 of the magazine 113, as shown in Figure 24, this will immediately stop rotation of the magazine carriage and this will, in turn, cause the shaft 52, the clutch members 53 and 54 and the tubular shaft 60 to cease rotation as a result of which the tension spring 90 will allow the bars 72 and 83 to move downwardly at their free ends with their associated parts and although the cable 86 will be held in a fixed position by the immovability of the shaft 60, the tension spring 90 will permit the arm 91 of the vertically disposed bar 75 to continue its downward movement. It is thus seen how the magazine carriage 55 has positioned a selected magazine adjacent the tone arm 570.

Immediately upon the selected magazine 113 being positioned adjacent the tone arm 570, rotation or oscillation will be imparted to the magazine 113 through the cam wheel 167 in Figures 24 and 26.

It might be stated that the stub shaft 121 associated with each of the magazines 110 to 113, inclusive is resiliently locked in position, in such a manner that when the magazine carriage 55 moves the selected magazine into alinement with the flattened portion 136 of the shaft 137, as shown in Figure 27, the slotted end 135 of the stub shaft will engage the flattened portion 136 of the shaft 137. This stub shaft 121 is locked by the collar 123, which is held in fixed relation to the associated bar 97, 96, 100 or 101, by the spring pressed plunger 126 in the block 127 (Figure 25).

While the magazine carriage 55 is being rotated, in the manner heretofore described, the cam follower 171 (Figure 24) will be riding in the low portion of the groove 170 in the cam wheel 167 in Figure 24, which will leave the tension spring 160 in Figure 26 in a relaxed state. Now, shortly after the magazine carriage 55 has ceased rotation and the selected magazine 113 has been moved into position adjacent the tone arm 570, the cam follower 171 will move towards the highpoint of the cam wheel 167 in Figure 24 along the groove 170, and this will cause the vertically disposed bar 163 and its associated bars or arms 162 and 164 to move upwardly with the parallel arms 172 and 173.

As these arms 162 and 164 (Figure 26) move upwardly, they will impart rotation to the shaft 137 in a counterclockwise direction in Figure 26 through its sleeve 152 and the cable 155 secured to the same. The lower end of the cable 155 in Figure 26 will move upwardly thus rotating the shaft and likewise transmitting rotation to the magazine 113 through its stub shaft 121 (Figure 27).

Referring to Figure 25, the torsional pressure exerted on the stub shaft 121 by the shaft 137 will overcome the pressure of the spring 133 urging the plunger 126 in Figure 25 into the notch 125 of the collar 123, and the plunger 126 will thus be forced out of the notch 125 and will merely ride around the periphery of the collar 123 as rotation is imparted to the same through the stub shaft 121 and its associated shaft 137.

Now, in the event that the magazine 113 is to remain in the same position relative to the magazine carriage 55 after it has stopped moving with the magazine carriage 55 as it is held while rotation was being imparted to the magazine carriage 55, the finger 220 of the lever arm 221 (Figure 3) will be engaged by the finger 211 of the magazine 113 thus preventing oscillation of the magazine 113, but the bar 163 and its associated bars 162 and 164 in Figure 26 will continue to move upwardly, in which event, the cable 155 will remain stationary as well as the shaft 137 and the tension spring 160 would then be stretched apart thus permitting this upward movement of the arm 163 to continue inasmuch as the cam follower 171 will be raised by the groove 170 in the cam wheel 167.

In the event that it is desired that the opposite side of the magazine 113 face downwardly from that side which was facing downwardly at the time the magazine 113 was first positioned adjacent the tone arm 570, the finger 210 on the arm 116 of the magazine 113 would then be engaged by the finger 220 in Figure 3 while the finger 211 would move past the finger 220 in Figure 3 for approximately a half revolution of the magazine 113. The cable 155 would then move upwardly further than it would in the first instance, and the tension spring 160 would not be placed under tension until the cam follower 171 had been raised very nearly to the highest point of the groove 170 in the cam wheel 167. It is thus seen how the magazine 113, or whichever other magazine may be selected, is positioned for presenting the selected surface of the record for engagement by the tone arm.

The cam wheel 655 is provided for raising and lowering the tone arm 570, its function being as follows: At about the same time that rotation is being imparted to the magazine carriage 55, the cam wheel 655 will rotate with the high point of the cam wheel 655 in engagement with the cam follower 657 which will, in turn retain the lever arm 644 in a lowered position at its right-hand end in Figure 14. This will have released the pressure exerted on the cable 630 by the roller 642 and the bolt 647 and will have thus permitted the plate 576 to move downwardly, by gravity, to its lowermost position. Obviously, this will have released the tone arm control plate 677 from the pressure exerted against its previously selected step 680 (Figures 3 and 14) by the plate 576. Since the tone arm 570 is connected to the vertically disposed plate 576 and is normally at rest at the lower dotted line position indicated in Figure 9, the tone arm 570 will also have moved downwardly with the vertically disposed plate 576.

After the pressure of the plate 576 against any of the steps 680 of the tone arm control plate 677 has been released in the manner heretofore described, the finger 702 (Figure 12) will move outwardly in the manner heretofore described away from the cam wheel 480 in Figure 12 which, incidentally, takes place simultaneously with the movement of the fingers 254 and 533 in the manner heretofore described. Now, as this finger 702 is moved out of engagement with the periphery of the cam wheel 480, in the manner heretofore described, the forked member 695 will move towards the observer in Figures 2 and 14, this movement being imparted from the bar 701 on which the finger 702 is mounted, through the bent portion 700 and the laterally bent portion 697 which is pivoted at 696 in Figure 2.

After rotation has been imparted to the selector cam wheel 480 in the manner heretofore described, and the finger 702 integral with the bar 701 in Figure 1 has moved into engagement with one of the stepped notches 703 to 707, inclusive, in the cam wheel 480, the cam wheel 655, which will have been in continuous motion during this period, will then rotate to where the cam follower 657 will move towards the low point of the cam wheel 655. The tension spring 652 in Figure 14 will urge the right-hand end of the lever control arm 644 upwardly, and inasmuch as the finger 702 (Figure 12) is shown to be in engagement with the highest notch 703 in the periphery of the cam wheel 480, the tension spring 652 would cause the right-hand end of the control arm 644 to move to its highest possible position, at which point the upper edge of the angularly bent portion 577 of the vertically disposed plate 576 (Figure 14) would engage the uppermost of the steps 680 in the vertically disposed tone arm control plate 677.

Obviously, if the cam wheel 480 had been positioned, through the selecting apparatus heretofore described, to where the finger 702 would engage one or the other of the notches 704 to 707 inclusive, the forked strap iron member 695 (Figures 2 and 14) would have moved the plate 677 in Figure 3 closer to the tone arm 570 and would thus result in the upper edge of the angularly bent portion 577 of plate 576 engaging one of the steps 680 disposed below the uppermost step. In that event, the tension spring 652 (Figure 14) will have caused the control arm 644 to move upwardly at its right-hand end, but its upward movement would have been restricted by the engagement of a lower step 680 in the plate 677 by the upper edge of the angularly bent portion 577 of the plate 576 and, of course, the cam follower 657 would not have been moved into engagement with the lowermost point of the cam wheel 655 by spring 652 (Figure 14).

Up to this time when in the operation of this apparatus, the cam follower 740 on the lever arm 732 (Figure 23), which controls swinging movement of the tone arm 570 (Figure 29), will be held in engagement with the low point of the cam wheel 741 by spring 735 and in which instance the actuating rod 625 will bear against the bar 613 (Figure 29) and will hold the tone arm 570 out of the path of the record 200 or in substantially the lower dotted line position in Figure 29. Now, after the plate 576 and the associated tone arm 570 have been raised to the selected position, the cam follower 740 (Figure 23) will be engaged by the raised portion 742 of the cam wheel 741 in Figure 23, thus moving the actuating rod 625 in a clockwise direction in Figure 29 and thereby moving the free end of the bar 571 of the tone arm 570 to substantially the solid line position shown in Figure 29. It has already been stated how the bristles 610 will engage the peripheral edge of the selected record 200 in the selected magazine and a further description of this phase of operation is deemed unnecessary.

After the tone arm 570 has been moved to substantially the solid line position shown in Figure 29, the phonograph needle 584 is then raised to engage the lower surface of the record 200. The tone arm 570 is raised to move the needle 584 into engagement with the lower surface of the record 200 by the lobe 691 on the cam wheel 690 in Figure 14 engaging the link 686 and thus causing the free end of the forked member 682 to be moved upwardly through the intervening link 685 and lever arm 683.

Now, as this forked member 682 moves upwardly, it will transmit vertical movement to the vertically disposed rod 672 and its associated laterally projecting portions 673 and 674 on the free ends of which the vertically disposed tone arm control plate 677 is mounted. This, of course, will cause the plate 677 to move upwardly and will accordingly allow the plate 576 to be urged upwardly through intervening connections to the tension spring 652, resulting in the tone arm 570 being moved upwardly and moving the needle 584 into engagement with the lower surface of the record 200.

Immediately upon the needle 584 being moved into engagement with the lower surface of the record 200, in the manner previously described, the cam wheel 506 (Figure 11) will have rotated to where the cam follower 510 will be moved from the intermediate point of the groove 507 to its highest point thus moving the arm 494 slightly from right to left in Figures 11, 16 and 30 so that the finger 512 of switch 513 will move from the intermediate dotted line position to the left-hand dotted line position shown in Figure 16 or to the solid line position shown in Figure 30 thus opening the switch 513. At this instant the finger 786 will be in the position shown, relative to the cam wheel 784, in Figure 30. Although switch 787 is still closed, the motor 44 will stop due to the switch 513 being opened and, consequently, the cam shaft 40 with the cam wheels 64, 167, 741, 655, 690, 773, 506, 525, 250, 726 and 553 thereon will cease rotation simultaneously with the phonograph needle 584 (Figure 28) engaging the lower surface of the record 200.

At the same time that the tone arm 570 is swung inwardly from the lower dotted line position in Figure 29 to substantially the solid line position shown in Figure 29, rotation must be imparted to the record 200 in the magazine 113, which happens to be the magazine selected by the selector means in the manner heretofore described. During the time that the tone arm 570 is moving inwardly from the lower dotted line position in Figure 29 to the solid line position, the cam wheel 773 in Figure 19 will have rotated with the cam shaft 40 to where the cam follower 772 will be very close to its recess 770. Now, the cam wheel 773 will continue its rotation and in so doing the follower will ride into the recess 770, which will happen just before the needle 584 (Figure 28) is moved into engagement with the record 200 as heretofore stated. This will permit the tension spring 774 to urge the link 764 from left to right in Figures 2 and 19 and will thus move the resilient roller 746 of the electric motor 747 into engagement with the lowermost record 200 in the magazine 113. However, just before the roller 745 is brought into engagment with the lowermost record 200 the arm 782 of the switch 780 will move in a clockwise direction in Figure 2, thus closing the circuit to the electric motor 747 from the lead wires 923 through wires 45 and 750 to the electric motor 747, through the wires 751 and the switch 780, through wires 783 and 601 (Figure 30) to the other lead wire 924.

Therefore, upon the resilient roller 745 being brought into engagement with the lowermost record 200 in the selected magazine 113, the roller 745 will impart rotation to all of the records 200 simultaneously in the selected magazine 113. The phonograph needle 584 is then brought into engagement with the lower surface of the selected record 200 in the manner described, thus stopping the flow of current to the cam shaft motor 44 as has been previously described.

The record is then played by the needle 584 (Figures 28 and 29) and sound is then transmitted by the crystal 582 and the interconnecting wires 585 to 586 (Figure 30) to the amplifier 525 and to the dynamic speaker 16. During this time the cam shaft 40 is at rest. The needle 584 will follow the conventional spiral groove in the lower surface of the selected record 200 and will move to the dotted line position indicated at 743 in Figure 29 at which time the insulation member 598 on the leaf spring contact bar 591 will engage one of the collars 201 or 202, depending upon which record is played, and thus will cause the contact members 596 and 597 to be brought into engagement with each other to thus complete a circuit between the same. Referring to Figure 30 it may be observed that electrical current will then flow from the lead wire 924 through the wire 601 and the rigid contact bar 592, through the contact points 597 and 596, through the leaf spring contact bar 591, through the wire 46 to the electric motor 44, through the electric motor 44 and the wire 45 to the other lead wire 923.

This will cause the motor 44 to again transmit rotation to the cam shaft 40 and the lobe 691 on the cam wheel 690 in Figure 14 will move out of engagement with the link 686 thereby permitting the right-hand end of the lever arm 683 in Figure 14 to move downwardly and, in turn, causing the vertically disposed tone arm control plate 677 to move downwardly through the intervening connections. As the vertically disposed tone arm control plate 677 moves downwardly, the needle 584 of the tone arm 570 will move out of engagement with the lower surface of the record 200 and will then be in position to be swung in a clockwise direction in Figure 9 to the lower dotted line position in Figure 29.

The tone arm 570 is swung from the upper dotted line position in Figure 29 to the lower dotted line position through the medium of the actuating rod 625, the link 730 (Figure 23) and the tension spring 735. This tension spring 735 will thus be enabled to move the actuating rod 625 in a counterclockwise direction in Figure 29 due to the fact that the raised portion 742 of the cam wheel 741 would move out of engagement with the cam follower 740 thus permitting the arm 732 to move in a clockwise direction in Figure 23. This will position the tone arm 570 in the lower dotted line position in Figure 29, in which position it will be ready for moving downwardly to the bottom of its range of movement in Figure 14.

It has already been stated how the tone arm 570 is moved to its lowermost position by virtue of the cam wheel 655 (Figure 14) rotating in such a manner as to cause the cam follower 657 to engage the high point of the cam wheel 655. The cam wheel 726 in Figure 22 will then have rotated to a position to where the finger 702 will be moved out of engagement with the periphery of the cam wheel 480 in the manner heretofore described, thus moving the vertically disposed tone arm control plate 677 (Figure 16) out of the vertical plane of the vertically disposed plate 576 (Figure 14A).

At the same time that the vertically disposed tone arm selector plate 677 is moved out of the vertical plane of the plate 576, in the manner heretofore described, the cam wheel 773 in Figure 19 will have resumed rotation and will cause the follower 772 to move towards the center or towards the low point of the cam wheel 753 and, in so doing, will move the link 764 from right to left in Figures 2 and 19 and thus causing the finger 783 of the switch 780 (Figures 2 and 30) to move in a counterclockwise direction and opening the switch 780. Upon the switch 780 being thus opened, the spindle motor 747 will cease to transmit rotation to the resilient roller 745 and consequently rotation of the phonograph record 200 in the selected magazine will be stopped.

It is manifest that upon the link 764 moving from left to right in Figures 2 and 19, the switch 780 would not only be opened but the lever arm 756 would be caused to partially rotate in a clockwise direction in Figure 2, thereby moving the resilient roller 745 on the associated motor 747 out of engagement with the magazine 113.

Bearing in mind that the cam wheel 167 in Figure 24 was caused to stop in the position shown in Figure 24 when the lower surface of the phonograph record was engaged by the needle 584 as heretofore described, upon rotation again being transmitted to the shaft 40 as the tone arm 570 reaches the upper dotted line position in Figure 29, the cam wheel 167 will again start rotation in a clockwise direction in Figure 24 thus causing the selected magazine 113 to remain at rest for approximately 100 degrees of rotation of the camwheel 167. The cam follower 171 in Figure 24 then moves towards the center of or low point of the cam wheel 167 and, in so doing, causes the arms 152 and 164 (Figure 26) to move downwardly with the vertically disposed arm 163 to thus impart rotation to the shaft 137 in a clockwise direction in Figure 26 by means of the cable 175.

It has already been stated how rotation was imparted to this shaft 137 in the opposite direction when the magazine 113 was first positioned for presenting the desired side of the record 200 to be engaged by the tone arm 570, and it is thus seen that upon rotation of this shaft 137 in a clockwise direction in Figure 26, the magazine 113, or whichever magazine may be positioned in alinement with the same, will be caused to rotate approximately a half revolution in the opposite direction and this magazine will come to rest with the associated stub shaft 121 in the position shown in Figure 25, and, obviously, the spring pressed plunger 126 will engage the notch 125 as in the collar 123 and will thus hold the magazine 113 in fixed position relative to the magazine carriage 55 during rotation of the magazine carriage 55 in making the next selection.

At the instant that the magazine 113 ceases rotation and assumes the position as last described, the cam follower 510 in Figure 11 will have reached the lowermost point in the groove 507 of the cam wheel 506 inasmuch as rotation of the cam wheel 506 shall have been resumed at the moment that the cam shaft 40 resumed rotation upon the tone arm 570 reaching the upper dotted line shown in Figure 29. Now, as this cam follower 510 moves to this lowermost point in the groove 507 in the cam wheel 506 the arm 494 and its associated rack 492 will be moved from left to right in Figure 11 by the arm 500 on which the cam follower 510 is mounted. At this instant the fingers 254, 533, and 702 will not have moved out of engagement with the associated cam wheels 256, 476, and 480, respectively, Figure 12, and will thus prevent reverse rotation from being imparted to the spindle 264 through the pinion 487 as the rack 492 moves from left to right in Figure 11. Upon the arm 494 being moved from left to right in Figure 11 the finger 512 of the switch 513 will again be moved to the right-hand dotted line position in Figures 16, and 30, thus closing the switch 513, in which position it is disposed when the phonograph record selecting and playing unit has completed a cycle in its operation.

Immediately following rotation of the selected magazine, which, in this instance is the magazine 113, to where the stub shaft 121 is again positioned with the associated notch 125 of the collar 123 being engaged by the spring loaded plunger 126, the cam wheel 784 (Figure 30) will have rotated to where the free end of the finger 786 will move into the notch 785 in the cam wheel 784 thus opening the switch 187 and, due to the fact that the switch 330 will then be opened (assuming that there has not been another coin placed in the coin receiving mechanism 795) and thus the electrical circuit to the cam shaft motor 44 will be broken thus stopping rotation of the cam shaft 40.

This completes the cycle in the operation of this phonograph record selecting and playing mechanism and this cycle would be repeated each time a coin such as a nickel N (Figure 31) is inserted in the coin receiving mechanism 795. However, in the event that one of the coins D or Q were inserted in the coin receiving mechanism 795 in the manner heretofore described, it would then be possible to move two or more of the selector pins 253 in Figure 4 downwardly one after the other. In this instance, the free end of the lever arm 340 in Figures 6 and 30 would be held in engagement with the finger 337 of the switch 330 in such a manner as to cause the switch 330 to remain closed and although the cam wheel 784 will have moved to the position where the finger 786 of the switch 787 will fall into the notch 785 in the cam wheel 784, the cam shaft 40 will continue to rotate and will thus play the next succeeding selection which will have been determined by positioning the arrow 72 adjacent another one of the numerals on the graduated plate 470 (Figure 2) and having again moved the selector plunger 745 downwardly to effect another cycle in the operation of this machine.

In the drawings and specification there has been set forth a preferred embodiment of the invention, and although specific terms are employed, they are used in a generic and descriptive sense only, and not for purposes of limitation, the scope of the invention being defined in the claims.

I claim:

1. A selectively operable phonograph for playing phonograph tablet records comprising a cam shaft, an electric motor for driving the cam shaft, a magazine carriage rotatably mounted on the cam shaft, said magazine carriage having a plurality of rotatable magazines mounted on the periphery of the same, each of said rotatable magazines having a plurality of superposed tablet phonograph records therein, a manually operated selector mechanism, a coin receiving mechanism, means normally rendering the selector mechanism inoperable, means operable upon inserting a coin in the coin receiving mechanism to render the selector mechanism operable, means responsive upon manually operating the selector mechanism to release the coin in the coin receiving mechanism, a tone arm swingable about its axis and movable along its axis, electrically controlled means for driving the records in the selected magazine, cam means on the cam shaft for transmitting rotation to the magazine carriage, mechanical means controlled by the manually operated selector mechanism for arresting rotation of the magazine carriage with a selected magazine in a position adjacent the tone arm, cam means on the cam shaft for transmitting rotation to the magazine positioned adjacent the tone arm after it has been selected, a mechanical connection between the selector mechanism and the selected magazine to arrest rotation of the selected magazine to position a record for presenting a selected side for engagement by the tone arm.

2. In a structure according to claim 1, means responsive to the manual operation of the selector mechanism for completing an electrical circuit to the cam shaft motor for driving the cam shaft, cam means for moving the tone arm along its axis, means responsive to manual operation of the selector mechanism for arresting movement of the tone arm adjacent a selected record in the positioned magazine, cam means on the cam shaft for swinging said tone arm to a position between certain of the records on the positioned magazine, another cam means on the cam shaft for moving said tone arm into engagement with the lower surface of the selected phonograph record, means operable upon the tone arm engaging the lower surface of the phonograph record to open the electrical circuit to the cam shaft motor thus stopping rotation of the cam shaft while the phonograph record is played, means on the tone arm for completing an electrical circuit to the cam shaft motor upon the record being played.

3. In a structure according to claim 1, said coin receiving mechanism comprising; a housing in which a fixed vertically disposed insulation plate is mounted, a pair of spaced vertically disposed contact bars secured to said plate, angularly disposed alternately spaced support bars extending from the proximate edges of the spaced contact bars and terminating a substantial distance from the contact bars at their free ends, a floating plate disposed adjacent the side of the insulation plate remote from the contact bars and having a plurality of contact pins thereon, said contact pins slidably penetrating the insulation plate and projecting outwardly therefrom, said housing having a plurality of coin receiving slots in its upper end and communicating with the insulation plate, whereby upon a coin being inserted in any one of the coin receiving slots the coin will fall, by gravity, between the contact members and will roll along the angularly disposed support bars until the same is prevented from moving downwardly by gravity by any one of the contact pins and one or the other of the side contact bars thus providing a conductor between the contact pin and the contact bar, means for moving the pins out of the path of travel of the coin after the circuit has been completed between one of the pins and one of the contact bars and spring means moving the pins and the associated contact plate again into the path of the coin.

4. A selective automatic phonograph comprising a framework, a driven shaft mounted in the framework, a magazine carriage rotatably mounted on the driven shaft, means on the driven shaft for resiliently imparting rotation to the magazine carriage in one direction, said magazine carriage having a plurality of rotatable magazines for holding records mounted on the periphery thereof, a tone arm adapted to cooperate with said records in one of the magazines independently of the others, means for selectively restricting rotation of the magazine carriage to position a selected magazine adjacent the tone arm, mechanical means for raising and lowering said tone arm past the said records in the positioned magazine adjacent the tone arm, selective means for arresting said tone arm to determine the record to be played, each of said magazines comprising a substantially U-shaped bracket rotatably mounted at its base on the magazine carriage, a bearing slidably mounted in one of the legs of the U-shaped bracket, a threaded shaft rotatably mounted at one end in the bearing and at its other end in the arm of the U-shaped bracket, said shaft having a plurality of spacer blocks mounted thereon between each of which a disk-shaped record is mounted, a lock nut engaging the remote ends of each of the spacers and being threadably mounted on the shaft, said bearing having an annular groove therein, a spring pressed finger engaging the groove in these bearings for securing the bearing in the arm of the U-shaped bracket whereby the said finger may be moved out of engagement with the annular groove in the bearing and the bearing may be removed for removing the shaft from the magazine and to in turn remove the records therefrom.

5. A selectively automatic phonograph comprising a framework, a driven shaft, a magazine carriage rotatably mounted on the driven shaft, a resilient connection between the shaft and the carriage for imparting rotation to the carriage in one direction, said magazine carriage having a plurality of rotatable magazines mounted on the periphery thereof, a plurality of spaced superposed tablet records rotatably mounted in each magazine, selecting means for arresting rotation of the magazine carriage for positioning any one of the magazines in a predetermined position, a resilient connection between the shaft and the positioned magazine for resiliently imparting rotation to the positioned magazine in one direction, selector means engageable by the positioned magazine for arresting rotation of the same for presenting the surfaces of the records in a predetermined relation to the magazine carriage, a tone arm adapted to cooperate with said records in the positioned magazine, mechanical means for transmitting vertical movement to the said tone arm past all of said records when the magazine has established its fixed position relative to the magazine carriage and selector means for arresting said tone arm to determine the record to be played, said mechanical means for transmitting vertical movement to the said tone arm comprising; a bracket on which the tone arm is pivotally mounted for swinging movement on a horizontal plane, a cable connected to said bracket, a standard disposed adjacent said bracket and extending above the same, a second standard disposed at a lower horizontal plane than the first-named standard, a pin connected to and projecting outwardly from the upper end of the first-named standard, a plurality of pins projecting from the second-named standard in staggered relation to each other, a pivoted lever arm disposed adjacent the second-named standard, a driven cam wheel disposed above the lever arm, spring means normally urging the lever arm into engagement with the cam wheel, a cable extending from the bracket and upwardly over the pin on the first-named standard and downwardly and under and over the staggered pins on the second-named standard, the other end of said cable being connected to the free end of said lever arm, whereby the spring means will normally urge the free end of said lever arm upwardly thus moving the tone arm upwardly under spring tension and whereby upon the cam wheel engaging the lever arm it will be moved downwardly thus permitting the tone arm to move downwardly by gravity.

6. A selectively automatic phonograph comprising a framework, a driven shaft, a magazine carriage rotatably mounted on the driven shaft, a resilient connection between the shaft and the carriage for imparting rotation to the carriage in one direction, said magazine carriage having a plurality of rotatable magazines mounted on the periphery thereof, a plurality of spaced superposed tablet records rotatably mounted in each magazine, selecting means for arresting rotation of the magazine carriage for positioning any one of the magazines in a predetermined position, a resilient connection between the shaft and the positioned magazine for resiliently imparting rotation to the positioned magazine in one direction, selector means engageable by the positioned magazine for arresting rotation of the same for presenting the surfaces of the records in a predetermined relation to the magazine carriage, a tone arm adapted to cooperate with said records in the positioned magazine, mechanical means for transmitting vertical movement to the said tone arm past all of said records when the magazine has established its fixed position relative to the magazine carriage, selector means for arresting said tone arm to determine the record to be played, said mechanical means for transmitting vertical movement to the said tone arm comprising; a bracket on which the tone arm is pivotally mounted for swinging movement on a horizontal plane, a cable connected to said bracket, a standard disposed adjacent said bracket and extending above the same, a second standard disposed at a lower horizontal plane than the first-named standard, a pin connected to and projecting outwardly from the upper end of the first-named standard, a plurality of pins projecting from the second-named standard in staggered relation to each other, a pivoted lever arm disposed adjacent the second-named standard, a driven cam wheel disposed above the lever arm, spring means normally urging the lever arm into engagement with the cam wheel, a cable extending from the bracket and upwardly over the pin on the first-named standard and downwardly and under and over the staggered pins on the second-named standard, the other end of said cable being connected to the free end of said lever arm, whereby the spring means will normally urge the free end of said lever arm upwardly thus moving the tone arm upwardly under spring tension and whereby upon the cam wheel engaging the lever arm it will be moved downwardly thus permitting the tone arm to move downwardly by gravity, selector means engageable by the bracket associated with said tone arm and adapted to be moved into the path of travel of said bracket whereby upon its upward movement the bracket will engage the selector means arresting the tone arm in a selected position adjacent the phonograph records.

7. In a structure according to claim 6, said selector means comprising a vertically disposed plate having steps cut in one side thereof, means for moving said plate out of the path of travel of the bracket associated with the tone arm and selector means for moving said plate to present a particular step on the plate in the path of travel of the bracket associated with the tone arm whereby upon the bracket engaging a particular step the tone arm will be arrested in its vertical movement adjacent a particular record.

8. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movable and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arresting rotation of the positioned magazine to present the desired side of the record to be played by the tone arm, means responsive to the mechanically controlled selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, said means for transmitting rotation to the records in the magazine adjacent the tone arm comprising; an electric motor, a source of electrical energy, a lever arm on which the electric motor is mounted, a roller mounted on said motor and means for moving said lever arm in opposite directions whereby upon the lever arm being moved in one direction the roller on the electric motor will be moved into engagement with one of the records in the associated magazine thus transmitting rotation to all of the records in the magazine and whereby upon the lever arm being moved in the other direction the roller on the electric motor will be moved out of engagement with the phonograph record thus stopping rotation of the records.

9. In a structure according to claim 8, means operable as the roller on said motor is moved toward the corresponding record for completing a circuit to the electric motor to transmit rotation to the roller and means operable upon the roller moving out of engagement with the record for breaking the circuit to the electric motor associated therewith for stopping rotation of the roller.

10. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movable and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, said mechanically controlled selector means comprising a framework, a selector shaft rotatably mounted in the framework, a block secured to the framework and which is slidably and rotably penetrated by the selector shaft, said block having a plurality of pins slidably mounted in the block and disposed in parallel relation to and arranged in a circle about the selector shaft, manually operable means for projecting any one of the selector pins to where one end of said pin will be disposed at a plane different from the rest of the selector pins, cam means fixedly mounted on the shaft adjacent its end remote from said block, mechanical connections between the cam means and the means for arresting rotation of the magazine carriage and between the cam means and means for arresting rotation of the magazine adjacent the tone arm and between the cam means and the means for arresting vertical movement of the tone arm, frictional driving means for the selector shaft and means on the selector shaft for engaging the end of the projected selector pin to arrest rotation of the selector shaft, and to thus position the cam means at the opposite end of the selector shaft for positioning the arresting means for the magazine carriage, the positioned magazine and the tone arm.

11. In a structure according to claim 10, said manually operable means for projecting any one of the selector pins to where one end is disposed at a different plane than the plane of the other selector pins comprising; a selector disk rotatably mounted on the end of the shaft remote from the cam means and in spaced relation to the block in which the selector pins are mounted, a manually depressible spring loaded selector plunger slidably penetrating said disk, whereby the disk may be manually rotated to aline the plunger with the desired selector pin and then the plunger may be depressed moving the same into engagement with one end of the selector pin and thus projecting the said selector pin outwardly with respect to the block.

12. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movable and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arresting rotation of the positioned magazine to present the desired side of the record to be played by the tone arm, means responsive to the mechanically controlled selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, means for swinging said vertically movable and laterally swingable tone arm from the position it maintained while moving past the records to a position between certain of said records for engaging the lower surface of a selected record comprising; a substantially V-shaped bracket secured to the tone arm and projecting therefrom in a direction away from the records past which the tone arm travels, one of the legs of said V-shaped bracket being spring loaded, an actuating rod passing between the legs of the V-shaped bracket, means for moving said actuating rod in timed relation to vertical movement of the tone arm, said tone arm having a phonograph needle projecting upwardly therefrom, means on the tone arm adapted to engage the peripheral edge of the record as the tone arm is swung towards the record at its free end by the actuating rod, and means for moving the tone arm so that its needle will engage the lower surface of said record and means for simultaneously releasing the means engaging the peripheral edge of said record during the playing of the record.

13. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movably and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arrestiig rotation of the positioned magazine to present the desired side of the record to be played by the tone arm, means responsive to the mechanically controlled selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, said mechanically controlled selector means comprising a framework, a selector shaft rotatably mounted in the framework, a block secured to the framework and which is slidably and rotatably penetrated by the selector shaft, said block having a plurality of pins slidably mounted in the block and disposed in parallel relation to and arranged in a circle about the selector shaft, manually operable means for projecting any one of the selector pins to where one end of said pin will be disposed at a plane different from the rest of the selector pins, cam means fixedly mounted on the shaft adjacent its end remote from said block, mechanical connections between the cam means and the means for arresting rotation of the magazine carriage and between the cam means and means for arresting rotation of the magazine adjacent the tone arm and between the cam means and the means for arresting vertical movement of the tone arm, frictional driving means for the selector shaft, means on the selector shaft for engaging the end of the projected selector pin to arrest rotation of the selector shaft, and to thus position the cam means at the opposite end of the selector shaft for positioning the arresting means for the magazine carriage, the positioned magazine and the tone arm, said frictional driving means for the selector shaft comprising; a pinion rotatably mounted on said shaft, a collar secured to said shaft, a compression spring disposed between the collar and the pinion, a rack engaging said pinion, means for transmitting movement to said rack and to thereby transmit rotation to said pinion whereby upon rotation being transmitted to said pinion, rotation will be transmitted through the compression spring to the collar and finally to the shaft and whereby upon the shaft meeting ample resistance to its rotation to overcome the pressure of the compression spring against the collar on said shaft, the pinion will then merely rotate about the shaft while the shaft remains stationary.

14. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movable and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arresting rotation of the positioned magazine to present the desired side of the record to be played by the tone arm, means responsive to the mechanically controlled selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, said mechanically controlled selector means comprising a framework, a selector shaft rotatably mounted in the framework, a block secured to the framework and which is slidably and rotatably penetrated by the selector shaft, said block having a plurality of pins slidably mounted in the block and disposed in parallel relation to and arranged in a circle about the selector shaft, manually operable means for projecting any one of the selector pins to where one end of said pin will be disposed at a plane different from the rest of the selector pins, cam means fixedly mounted on the shaft adjacent its end remote from said block, mechanical connections between the cam means and the means for arresting rotation of the magazine carriage and between the cam means and means for arresting rotation of the magazine adjacent the tone arm and between the cam means and the means for arresting vertical movement of the tone arm, frictional driving means for the selector shaft, means on the selector shaft for engaging the end of the projected selector pin to arrest rotation of the selector shaft, and to thus position the cam means at the opposite end of the selector shaft for positioning the arresting means for the magazine carriage, the positioned magazine and the tone arm, said means on the selector shaft for engaging the end of the projected selector pin comprising; a rotor block fixedly mounted on the selector shaft, a rotor pivotally connected to said rotor block and being loosely penetrated by the selector shaft and extending in a direction away from its pivot point on the block and having an ear on its free end projecting towards the first-named block, a collar mounted in the framework and in which the selector shaft is slidably mounted, said collar engaging the rotor intermediate its ends, said ear being adapted to move past the ends of the selector pins which are disposed at one plane and whereby; upon a selector pin being partially projected out of its normal plane the ear will engage the projected pin thus arresting rotation of the selector shaft in a selected position.

15. In a structure according to claim 14, automatic means for moving said selector shaft longitudinally of its axis after the rotation of said shaft has been arrested, whereby upon said shaft being moved longitudinally of its axis the last-named block on which the rotor is mounted will move towards the collar thus causing the free end of the rotor to move in the opposite direction from that in which the shaft is moved and thus moving the lip portion of the rotor towards the first-named block and to move the corresponding selector pin to its original or inoperative position.

16. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movable and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arresting rotation of the positioned magazine to present the desired side of the record to be played by the tone arm, means responsive to the mechanically controlld selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, said mechanically controlled selector means comprising a framework, a selector shaft rotatably mounted in the framework, a block secured to the framework and which is slidably and rotatably penetrated by the selector shaft, said block having a plurality of pins slidably mounted in the block and disposed in parallel relation to and arranged in a circle about the selector shaft, manually operable means for projecting any one of the selector pins to where one end of said pin will be disposed at a plane different from the rest of the selector pins, cam means fixedly mounted on the shaft adjacent its end remote from said block, mechanical connections between the cam means and the means for arresting rotation of the magazine carriage and between the cam means and means for arresting rotation of the magazine adjacent the tone arm and between the cam means and the means for arresting vertical movement of the tone arm, frictional driving means for the selector shaft, means on the selector shaft for engaging the end of the projected selector pin to arrest rotation of the selector shaft, and to thus position the cam means at the opposite end of the selector shaft for positioning the arresting means for the magazine carriage, the positioned magazine and the tone arm, said means on the selector shaft for engaging the end of the projected selector pin comprising; a rotor block fixedly mounted on the selector shaft, a rotor pivotally connected to said rotor block and being loosely penetrated by the selector shaft and extending in a direction away from its pivot point on the block and having an ear on its free end projecting towards the first-named block, a collar mounted in the framework and in which the selector shaft is slidably mounted, said collar engaging the rotor intermediate its ends, said ear being adapted to move past the ends of the selector pins which are disposed at one plane and whereby; upon a selector pin being partially projected out of its normal plane the ear will engage the projected pin thus arresting rotation of the selector shaft in a selected position, means for moving said selector shaft to its original position thus moving the ear out of engagement with the formerly projected pin and spring means urging the free end of the rotor to a position on a plane substantially between the ends of adjacent selector pins upon the selector shaft moving to its original position to prevent the same pin from again being engaged by the ear if projected in the event other pins have been projected.

17. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movable and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arresting rotation of the positioned magazine to present the desired side of the record to be played by the tone arm, means responsive to the mechanically controlled selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, said mechanically controlled selector means comprising a framework, a selector shaft rotatably mounted in the framework, a block secured to the framework and which is slidably and rotatably penetrated by the selector shaft, said block having a plurality of pins slidably mounted in the block and disposed in parallel relation to and arranged in a circle about the selector shaft, manually operable means for projecting any one of the selector pins to where one end of said pin will be disposed at a plane different from the rest of the selector pins, cam means fixedly mounted on the shaft adjacent its end remote from said block, mechanical connections between the cam means and the means for arresting rotation of the magazine carriage and between the cam means and means for arresting rotation of the magazine adjacent the tone arm and between the cam means and the means for arresting vertical movement of the tone arm, frictional driving means for the selector shaft, means on the selector shaft for engaging the end of the projected selector pin to arrest rotation of the selector shaft, and to thus position the cam means at the opposite end of the selector shaft for positioning the arresting means for the magazine carriage, the positioned magazine and the tone arm, said manually operable means for projecting any one of the selector pins to where one end is disposed at a different plane than the plane of the other selector pins comprising; a selector disk rotatably mounted on the end of the shaft remote from the cam means and in spaced relation to the block in which the selector pins are mounted, a manually depressable spring loaded selector plunger slidably penetrating said disk, whereby the disk may be manually rotated to aline the plunger with the desired selector pin and then the plunger may be depressed moving the same into engagement with one end of the selector pin and thus projecting the said selector pin outwardly with respect to the block, said block having a safety disk slidably mounted thereon having a plurality of bores therein which are adapted to cooperate with the selector pins in the said block, said safety disk having imperforate areas between each of the said bores, a source of electrical energy, a coin receiving mechanism, a solenoid coil having a plunger therein connected to said safety disk, said plunger in the selector disk having a spring pressed pilot on its end adjacent said block, said imperforate areas of the safety disk normally being disposed over the selector pins whereby an operator may not cause the selector plunger to project one of the selector pins partially from the block when the plunger is depressed and whereby upon a coin being inserted in the coin receiving mechanism a circuit will be completed to the solenoid coil thus partially rotating the safety disk to where the bores in the safety disk will be in alinement with the selector pins and whereby the pilot may be permitted to engage one end of the selector pins.

18. In a structure according to claim 17, said coin receiving mechanism having a plurality of contact pins therein for arresting movement of the coin and for completing the circuit to the solenoid coil associated with the safety disk, a contact plate on which the contact pins are mounted, spring means normally urging the contact plate to where the associated pins will be disposed in the path of the coin as the coin moves by gravity through the coin receiving mechanism, a solenoid coil in the coin receiving mechanism, a connection between the solenoid coil and the contact plate, means operable upon depressing the selector plunger to complete a circuit to the last-named solenoid coils thus moving the associated contact plate and its contact pins to where the pins will be moved out of the path of the coin and to break the circuit to the first-named solenoid coil.

19. In a selectively operable automatic phonograph, a rotatable carriage having a plurality of radially spaced magazines rotatably mounted thereon, each of said magazines having a rotatable shaft therein on which a plurality of superposed disk-shaped records are fixedly mounted, a vertically movable and laterally swingable tone arm disposed adjacent the path of travel of the magazines, mechanically controlled selecting means for arresting rotation of the rotatable carriage when a selected magazine has moved into position adjacent the tone arm, automatic means for transmitting rotation to the magazine disposed adjacent the tone arm upon rotation of the magazine carriage being arrested, means responsive to the mechanically controlled selecting means for arresting rotation of the positioned magazine to present the desired side of the record to be played by the tone arm, means responsive to the mechanically controlled selecting means for arresting vertical movement of the tone arm in a selected position adjacent a selected record to be played, means for automatically transmitting rotation to the records in the magazine adjacent the tone arm upon the desired side of the record to be played being presented, means for moving the tone arm into engagement with the selected phonograph record for transcribing the same, said mechanically controlled selector means comprising a framework, a selector shaft rotatably mounted in the framework, a block secured to the framework and which is slidably and rotatably penetrated by the selector shaft, said block having a plurality of pins slidably mounted in the block and disposed in parallel relation to and arranged in a circle about the selector shaft, manually operable means for projecting any one of the selector pins to where one end of said pin will be disposed at a plane different from the rest of the selector pins, cam means fixedly mounted on the shaft adjacent its end remote from said block, mechanical connections between the cam means and the means for arresting rotation of the magazine carriage and between the cam means and means for arresting rotation of the magazine adjacent the tone arm and between the cam means and the means for arresting vertical movement of the tone arm, frictional driving means for the selector shaft, means on the selector shaft for engaging the end of the projected selector pin to arrest rotation of the selector shaft, and to thus position the cam means at the opposite end of the selector shaft for positioning the arresting means for the magazine carriage, the positioned magazine and the tone arm, said manually operable means for projecting any one of the selector pins to where one end is disposed at a different plane than the plane of the other selector pins comprising; a selector disk rotatably mounted on the end of the shaft remote from the cam means and in spaced relation to the block in which the selector pins are mounted, a manually depressible spring loaded selector plunger slidably penetrating said disk, whereby the disk may be manually rotated to aline the plunger with the desired selector pin and then the plunger may be depressed moving the same into engagement with one end of the selector pin and thus projecting the said selector pin outwardly with respect to the block, said block having a safety disk slidably mounted thereon having a plurality of bores therein which are adapted to cooperate with the selector pins in the said block, said safety disk having imperforate areas between each of the said bores, a source of electrical energy, a coin receiving mechanism, a solenoid coil having a plunger therein connected to said safety disk, said plunger in the selector disk having a spring pressed pilot on its end adjacent said block, said imperforate areas of the safety disk normally being disposed over the selector pins whereby an operator may not cause the selector plunger to project one of the selector pins partially from the block when the plunger is depressed and whereby upon a coin being inserted in the coin receiving mechanism a circuit will be completed to the solenoid coil thus partially rotating the safety disk to where the bores in the safety disk will be in alinement with the selector pins and whereby the pilot may be permitted to engage one end of the selector pins, spring means urging the safety disk to its position where the imperforate areas cover the selector pins upon the circuit to the solenoid coil being broken and whereby upon the selector plunger being held in a depressed state by the operator the spring pressed pilot on the end of the said plunger will be caused to swivel about the end of the plunger and will be forced out of the bore in which the selector pin is disposed by the movement of the safety disk from its position where its bores are in alinement with the pins to where its imperforate areas are in alinement with the selector pins.

GEORGE F. STARNES.

REFERENCES CITED

The following references are of record in the file of this patent:

UNITED STATES PATENTS

| Number | Name | Date |
|---|---|---|
| 1,046,096 | McClatchie | Dec. 3, 1912 |
| 1,148,979 | Masters | Aug. 3, 1915 |
| 1,395,035 | Briggs | Oct. 25, 1921 |
| 1,700,397 | Birket | Jan. 29, 1929 |
| 1,873,432 | Larson | Aug. 23, 1932 |
| 1,893,469 | Dahlstrom | Jan. 3, 1933 |
| 2,005,923 | Wilcox | June 25, 1935 |
| 2,425,974 | Winkler | Aug. 19, 1947 |